(12) United States Patent
Copperman

(10) Patent No.: US 10,832,549 B1
(45) Date of Patent: Nov. 10, 2020

(54) VEHICLE-MOUNTABLE CHILD PROTECTIVE DEVICE

(71) Applicant: BABY FLAG LTD., Jerusalem (IL)

(72) Inventor: Gideon Copperman, Jerusalem (IL)

(73) Assignee: BABY FLAG LTD., Jerusalem (IL)

( * ) Notice: Subject to any disclaimer, the term of this patent is extended or adjusted under 35 U.S.C. 154(b) by 0 days.

(21) Appl. No.: 16/538,101

(22) Filed: Aug. 12, 2019

(51) Int. Cl.
*G08B 21/02* (2006.01)
*B60Q 9/00* (2006.01)
*G08B 21/24* (2006.01)

(52) U.S. Cl.
CPC ............... *G08B 21/02* (2013.01); *B60Q 9/00* (2013.01); *G08B 21/24* (2013.01)

(58) Field of Classification Search
CPC ........ G08B 21/02; G08B 21/22; G08B 21/24; B60Q 1/2611; B60Q 1/2623; B60Q 1/2669; B60N 2/002; B60N 2/26
USPC ...... 340/457, 471, 425.5, 487, 539.1, 573.1, 340/667
See application file for complete search history.

(56) References Cited

U.S. PATENT DOCUMENTS

| | | |
|---|---|---|
| 3,715,821 A | 2/1973 | Hawes |
| 3,762,360 A | 10/1973 | Hawes |
| 4,565,152 A | 1/1986 | Bennett |
| 4,833,443 A | 5/1989 | Siew |
| 5,038,136 A | 8/1991 | Watson |
| 5,305,704 A | 4/1994 | Olaniyan |
| 5,382,953 A | 1/1995 | Hauptli |
| 5,635,902 A | 6/1997 | Hochstein |
| 6,276,080 B1 | 8/2001 | Brennan |
| 6,337,623 B1 * | 1/2002 | Krugh, IV ........... B60Q 1/2611 340/433 |
| 6,922,147 B1 * | 7/2005 | Viksnins ................ B60N 2/002 340/573.1 |
| 7,642,906 B1 | 1/2010 | McMurrer |
| 8,058,983 B1 * | 11/2011 | Davisson ........... G08B 21/0205 340/10.1 |

(Continued)

FOREIGN PATENT DOCUMENTS

| | | |
|---|---|---|
| FR | 2823477 | 10/2002 |
| JP | 2002-109655 A | 4/2002 |

(Continued)

OTHER PUBLICATIONS

An International Search Report and a Written Opinion both dated May 4, 2018, which issued during the prosecution of Applicant's PCT/IL2018/050079.

(Continued)

*Primary Examiner* — Hung T Nguyen
(74) *Attorney, Agent, or Firm* — Sughrue Mion, PLLC

(57) ABSTRACT

A vehicle-mountable child protective system including a vehicle door mountable device including a flag portion which is raisable to a raised position above a roof of a vehicle and a flag positioning assembly operative to selectably lock the flag portion in the raised position when the vehicle door mountable device is mounted onto a vehicle door and the vehicle door is closed, a remote controller and electronic circuitry responsive to exceedance of a separation distance between the vehicle door mountable device and the remote controller for producing a warning alert at least at the remote controller and retaining the flag portion in the raised position until the vehicle door is opened.

20 Claims, 53 Drawing Sheets

(56) References Cited

U.S. PATENT DOCUMENTS

| | | | |
|---|---|---|---|
| 8,368,560 B2* | 2/2013 | McDonald | B63B 45/04 |
| | | | 340/468 |
| 9,691,250 B2* | 6/2017 | Trang | G08B 25/08 |
| 2008/0282964 A1 | 11/2008 | Bennett | |
| 2009/0007959 A1 | 1/2009 | Wu et al. | |
| 2014/0302764 A1 | 10/2014 | Wu et al. | |
| 2016/0280126 A1 | 9/2016 | Tanaka | |

FOREIGN PATENT DOCUMENTS

| | | |
|---|---|---|
| KR | 20140132605 | 11/2014 |
| KR | 20160037385 A | 4/2016 |
| WO | 2018/163146 | 9/2018 |

OTHER PUBLICATIONS

An International Preliminary Report on Patentability dated Sep. 10, 2019, which issued during the prosecution of Applicant's PCT/IL2018/050079.

An English Translation of an Office Action dated Aug. 30, 2017, which issued during the prosecution of Israel Patent Application No. 250956. (the relevant part only).

An Office Action dated Feb. 27, 2020, which issued during the prosecution of U.S. Appl. No. 16/473,009.

European Search Report dated Jun. 26, 2020 which issued during the prosecution of Applicant's European App No. 18764494.3.

* cited by examiner

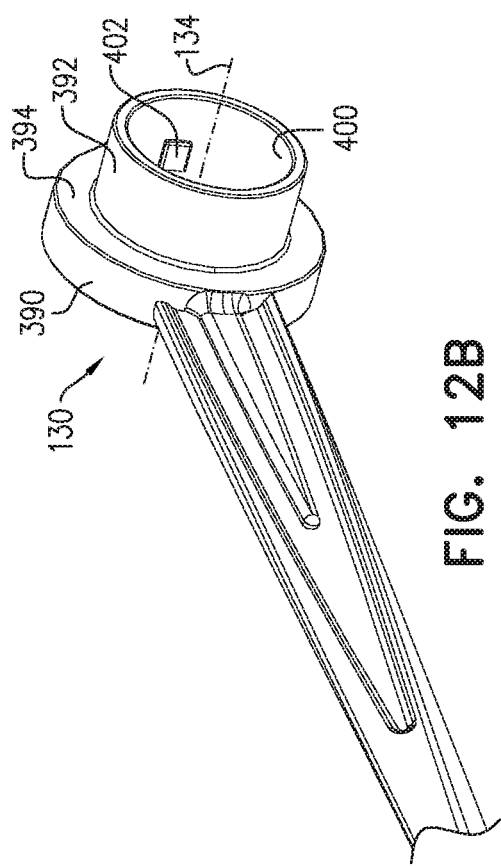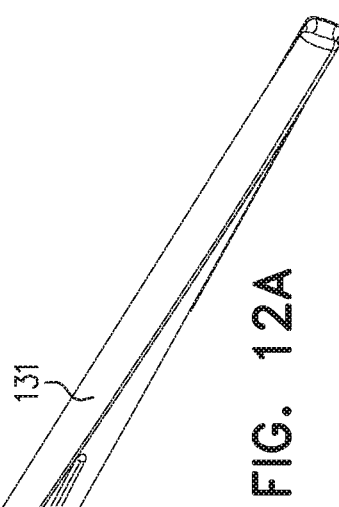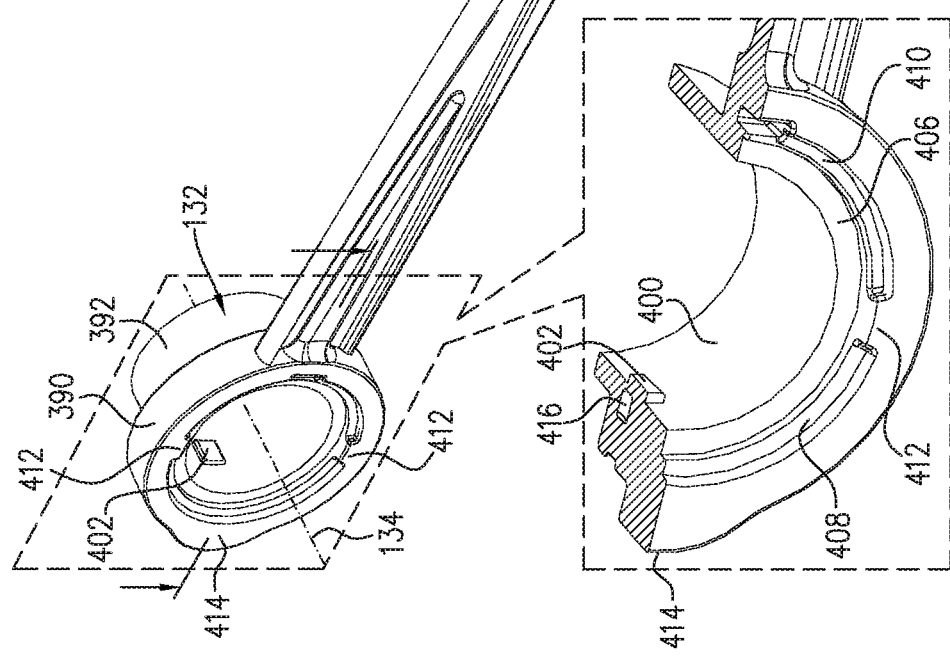
FIG. 12B
FIG. 12A

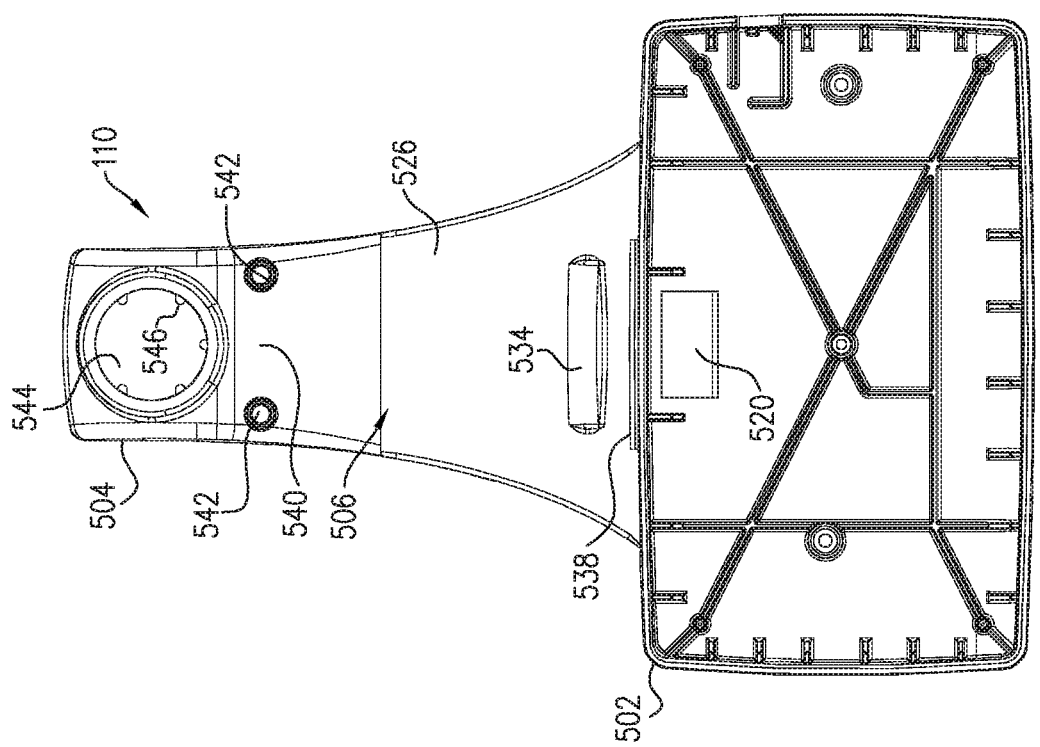
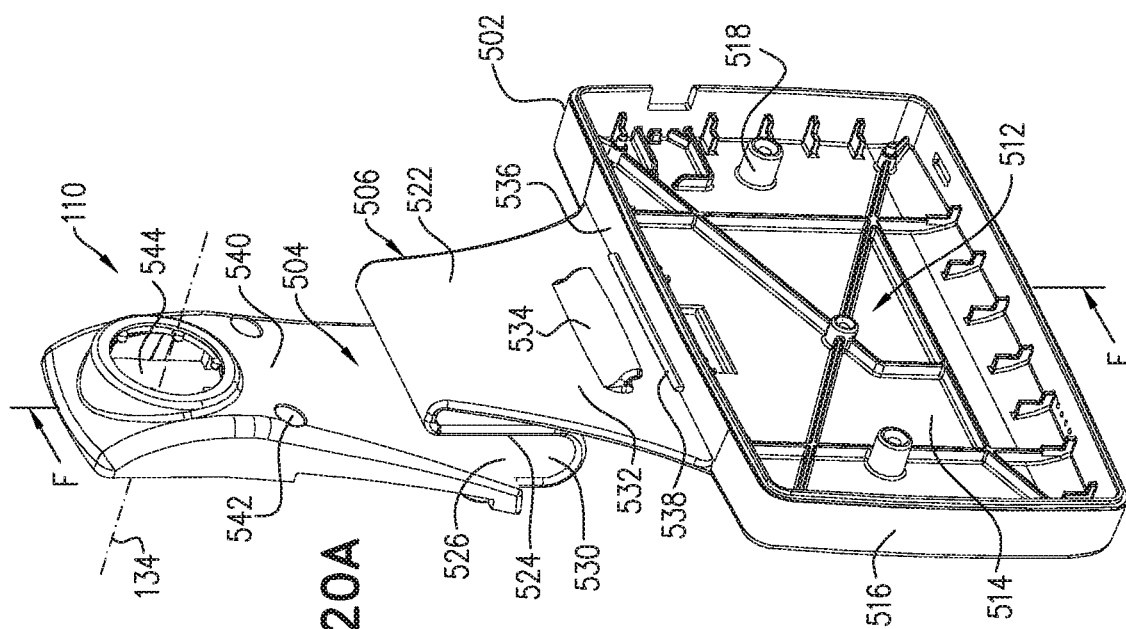

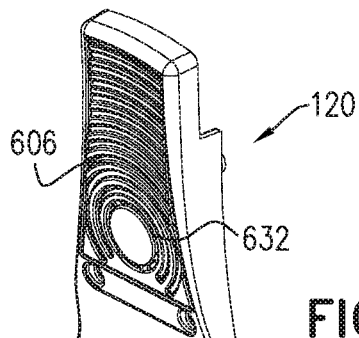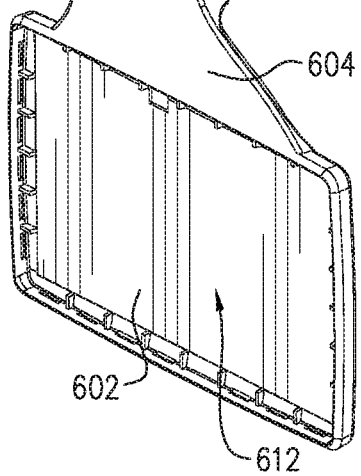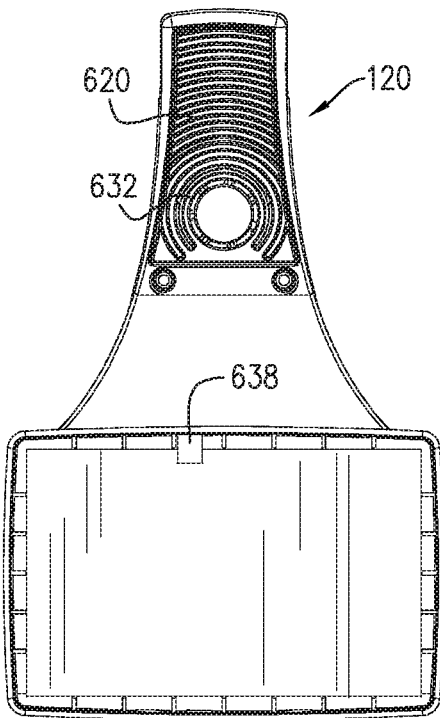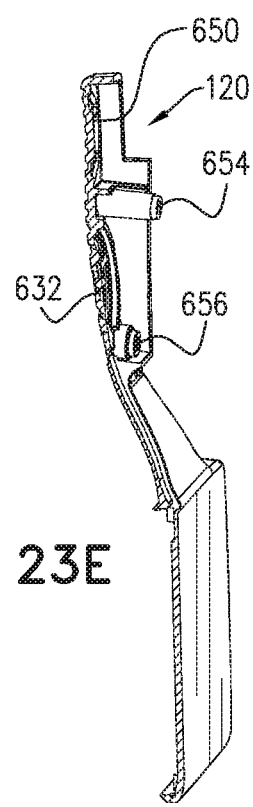
FIG. 23C
FIG. 23D
FIG. 23E

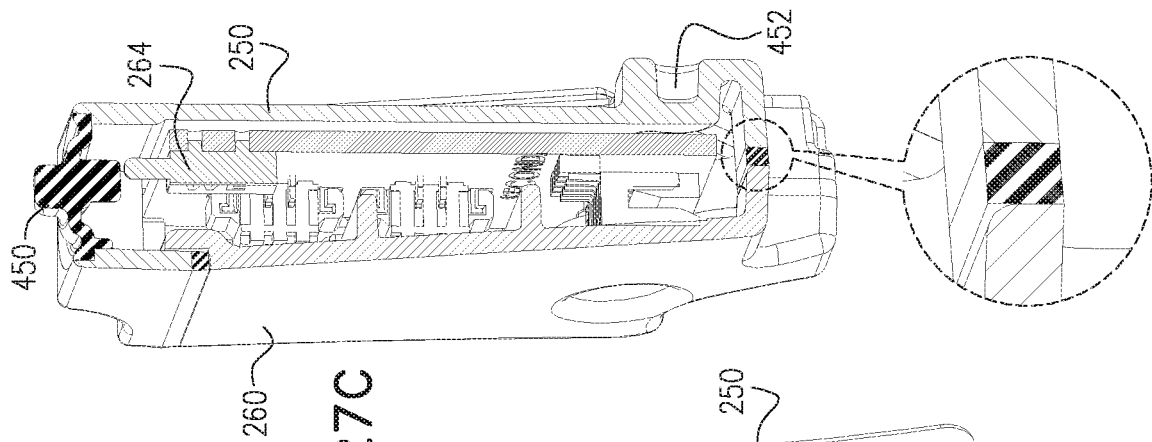
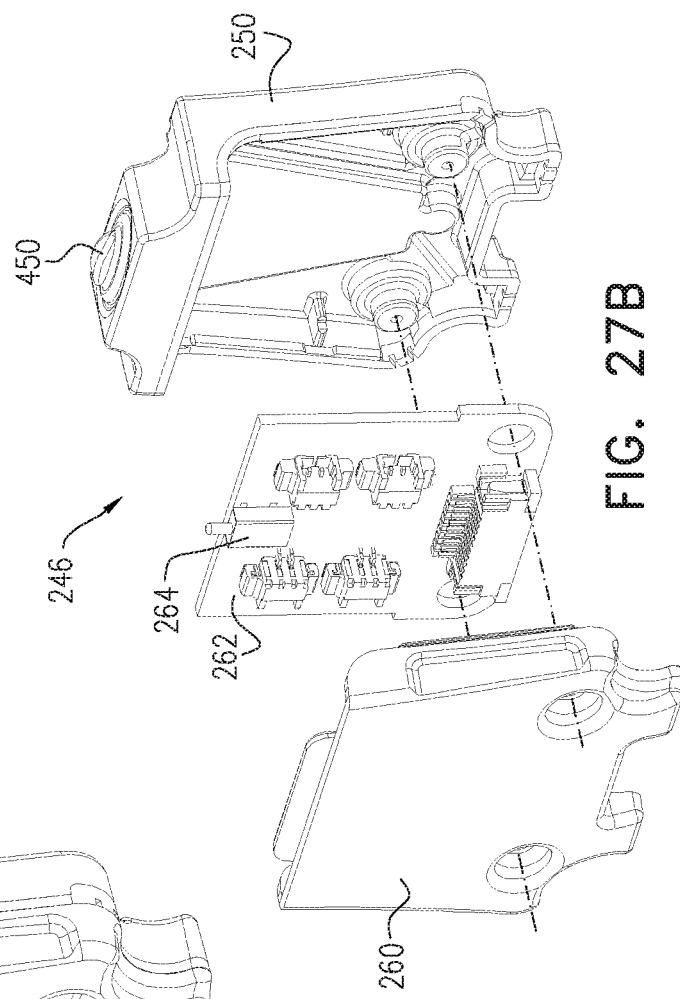
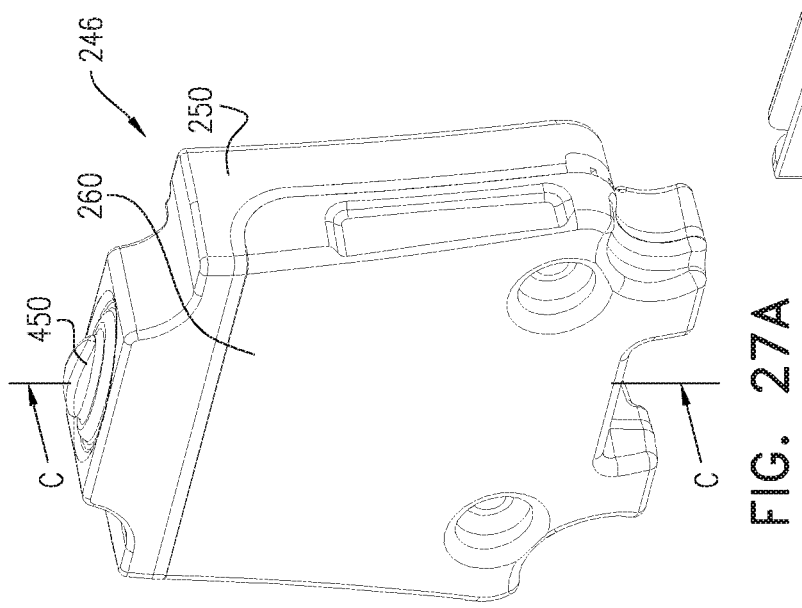
FIG. 27A
FIG. 27B
FIG. 27C

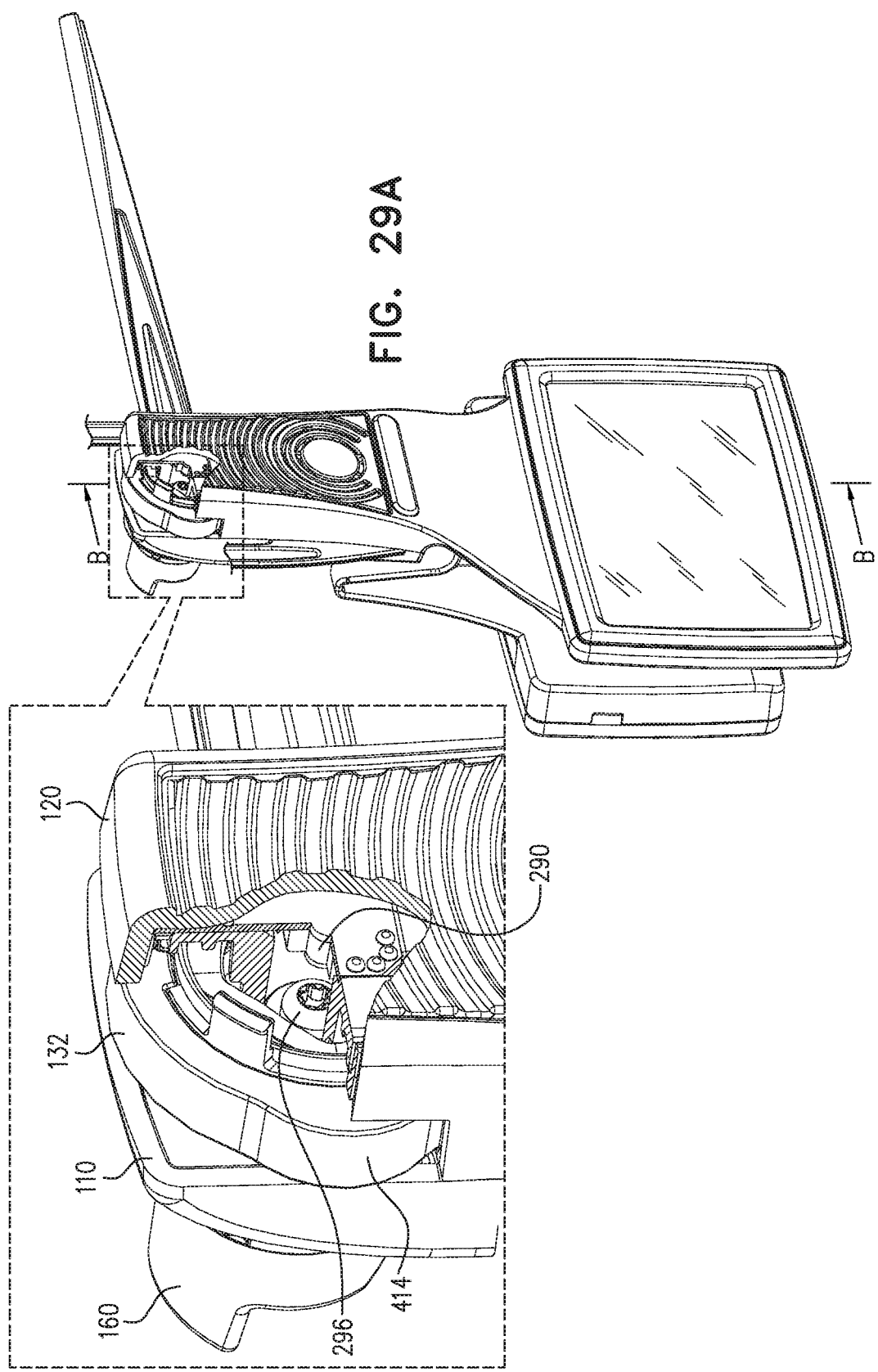

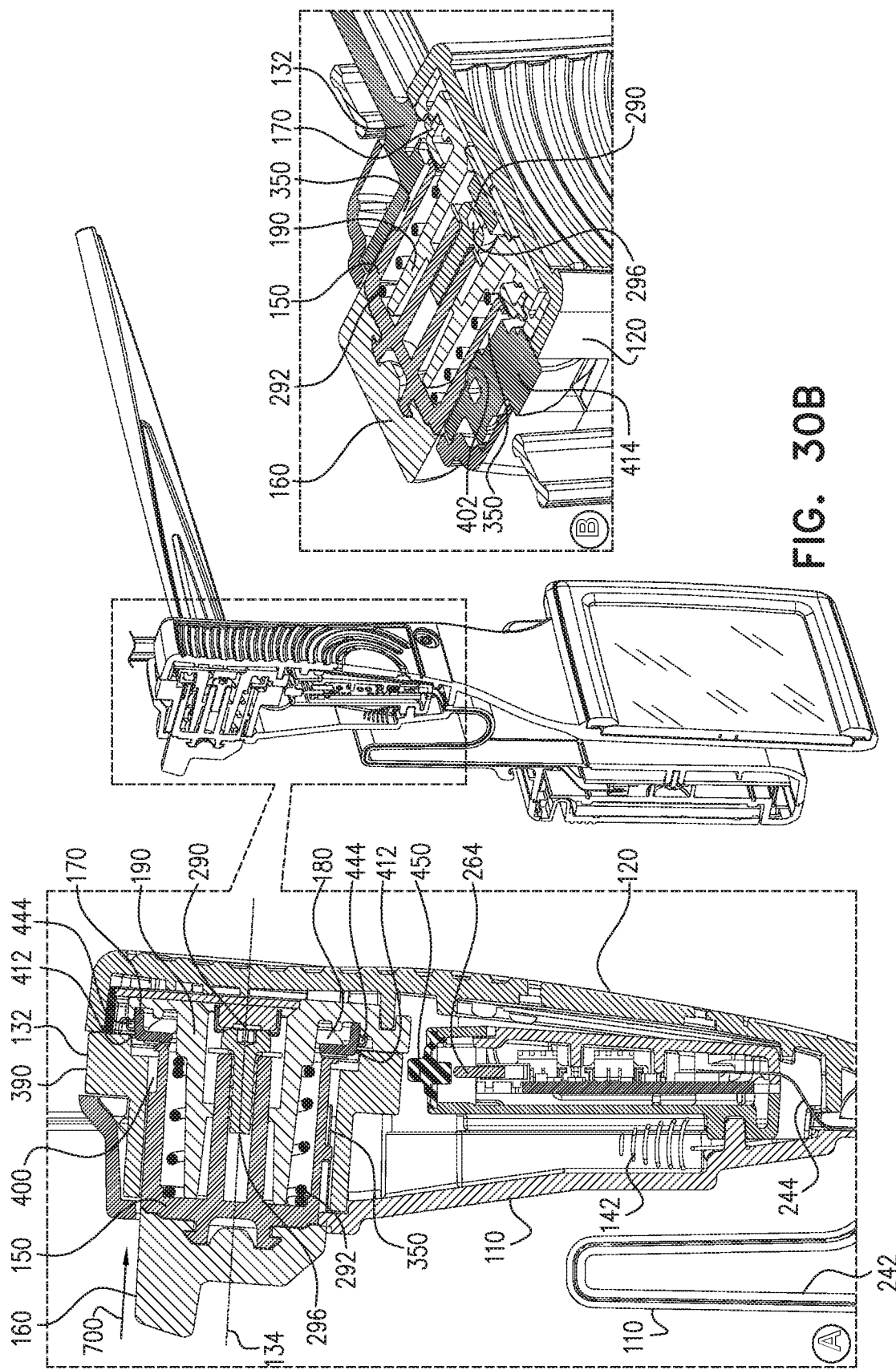

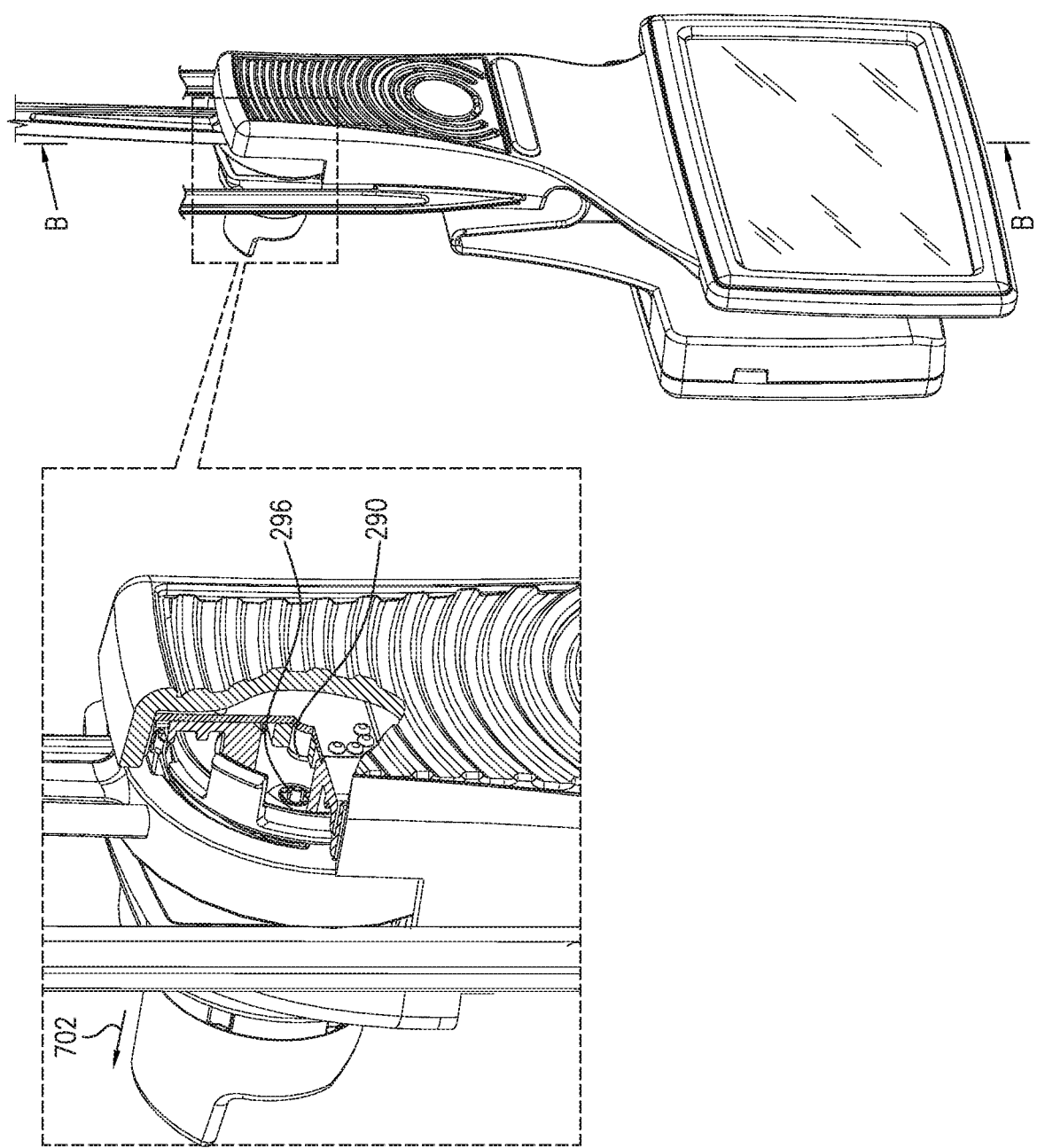

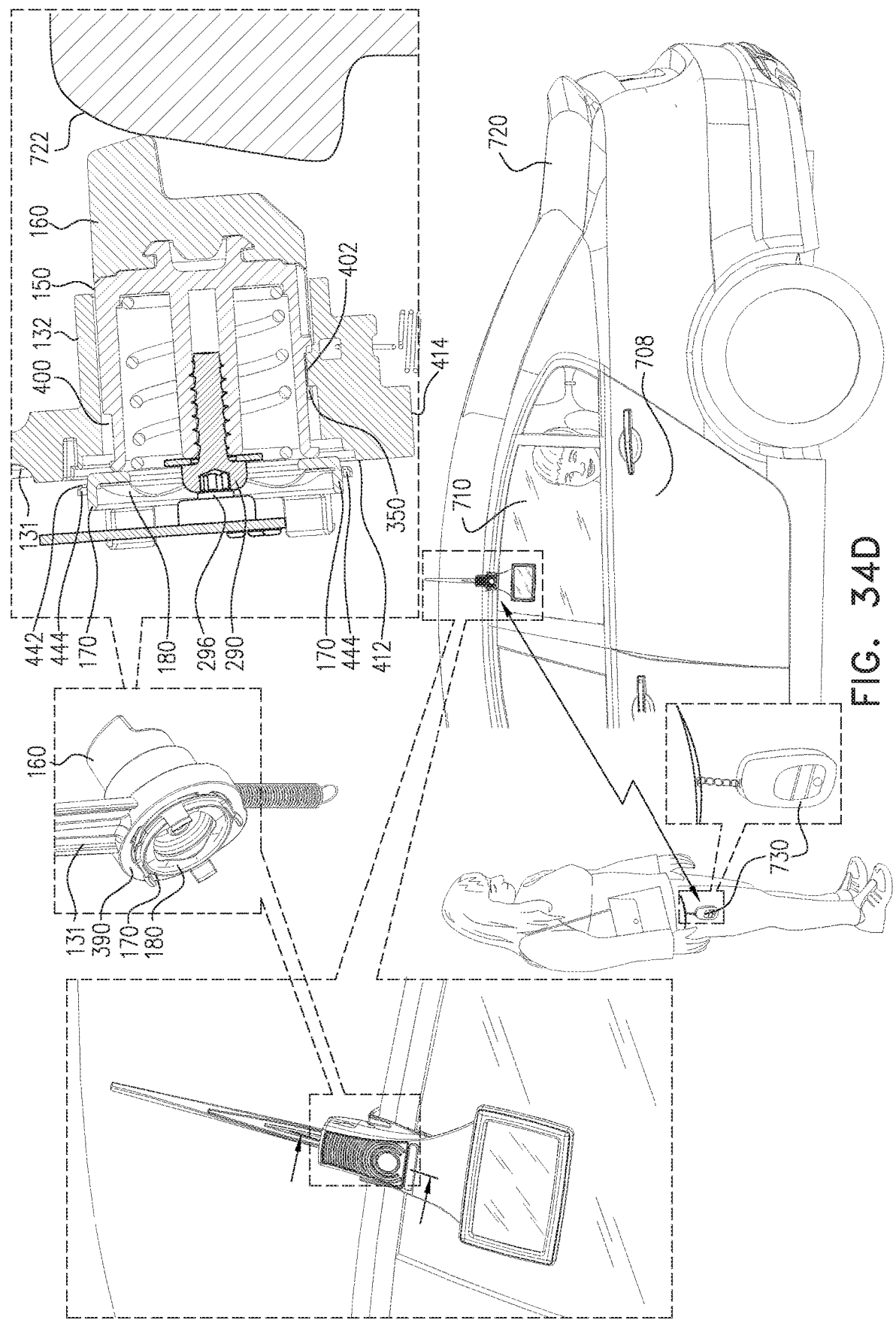

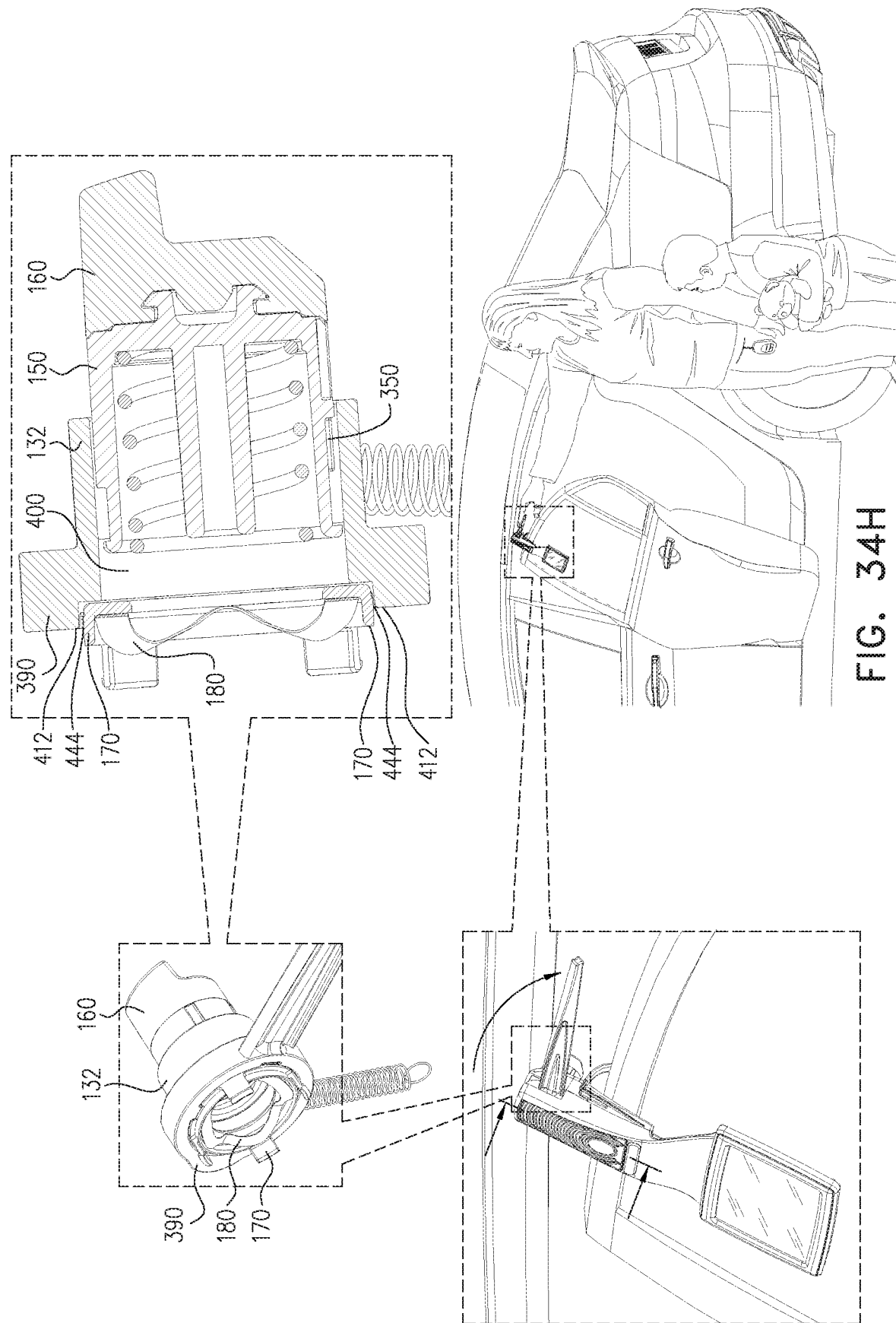

VEHICLE-MOUNTABLE CHILD PROTECTIVE DEVICE

REFERENCE TO RELATED APPLICATIONS

Reference is hereby made to applicant/assignee's PCT patent application PCT/IL2018/050079, filed Jan. 22, 2018 and entitled VEHICLE-MOUNTABLE CHILD PROTECTIVE DEVICE, the disclosure of which is hereby incorporated by reference.

FIELD OF THE INVENTION

The present invention relates generally to child safety devices and more particularly to devices for providing an alert if a child is left in a vehicle.

BACKGROUND OF THE INVENTION

Various devices are known for providing an alert if a child is left in a vehicle.

SUMMARY OF THE INVENTION

The present invention seeks to provide an improved device for providing an alert if a child is left in a vehicle.

There is thus provided in accordance with a preferred embodiment of the present invention a vehicle-mountable child protective system including a vehicle door mountable device including a flag portion which is raisable to a raised position above a roof of a vehicle and a flag positioning assembly operative to selectably lock the flag portion in the raised position when the vehicle door mountable device is mounted onto a vehicle door and the vehicle door is closed, a remote controller and electronic circuitry responsive to exceedance of a separation distance between the vehicle door mountable device and the remote controller for producing a warning alert at least at the remote controller and retaining the flag portion in the raised position until the vehicle door is opened.

In accordance with a preferred embodiment of the present invention the vehicle door mountable device also includes a vehicle interior temperature sensor and the electronic circuitry is also responsive to exceedance of a threshold vehicle interior temperature for producing a warning alert at least at the remote controller.

In accordance with a preferred embodiment of the present invention the vehicle door mountable device includes a housing which is mountable onto a vehicle door and includes a first housing element, which is at least partially located within the vehicle during operation of the device, and a second housing element, which is at least partially located outside the vehicle during operation of the device and a flag element, including the flag portion and a flag base, rotatably mounted onto the first housing element for selectable rotational positioning thereof about an axis and the flag positioning assembly is mounted onto the first housing element and located at least partially between the first and second housing elements and is operative for automatically rotating the flag base and thus the flag portion about the axis to the raised position outside of and above the vehicle upon opening of the vehicle door onto which the vehicle door mountable device is mounted.

Preferably, the flag positioning assembly includes a flag positioning coil spring, which urges the flag portion to the raised position from a lowered operative orientation. Additionally, the flag positioning assembly is operative to enable the flag base and the flag portion to have two different principal lowered operative orientations, each typically at a rotational distance approximately 90 degrees from the raised position in opposite directions about the axis.

In accordance with a preferred embodiment of the present invention the flag positioning assembly preferably includes a flag positioning element which axially engages the first housing element and the flag base along the axis and a flag positioning vehicle engagement element which engages the flag positioning element and is rotatable with respect thereto about the axis in order to conform to various vehicle configurations.

In accordance with a preferred embodiment of the present invention the flag positioning assembly preferably includes a first flag engagement element, a second flag engagement element and a third flag engagement element, which functions as a base for the flag positioning assembly.

Preferably, the vehicle door mountable device also includes a flexible retaining element, which is mounted onto the first housing element and is employed for retaining the vehicle door mountable device onto the vehicle door.

In accordance with a preferred embodiment of the present invention the vehicle door mountable device also includes a first microswitch responsive to closing of the vehicle door onto which the vehicle door mountable device is mounted and a second microswitch responsive to the flag portion being in the raised position.

Preferably, the flag positioning element is a generally cylindrical side to side symmetric element having an outer cylindrical wall formed with a plurality of elongate recesses, a circumferential recess and a plurality of recesses, which extend from the circumferential recess. Additionally or alternatively, the flag positioning vehicle engagement element is adapted for selectable rotational orientation relative to the flag positioning element, thereby to adapt the vehicle-mountable child protective device for use with various vehicle configurations.

In accordance with a preferred embodiment of the present invention the system has a plurality of operative orientations including a first operative orientation in which the vehicle-mountable child protective device is in an unmounted or flag lowered, door-opened orientation in which the flag is locked in a lowered position by a first locking mechanism and a second operative orientation in which the vehicle-mounted child protective device is in a mounted and flag lowered, door-closed orientation and the flag is locked in the lowered position by a second locking mechanism, different from the first locking mechanism. Additionally, in the second operative orientation the flag is locked in the lowered position only by the second locking mechanism.

In accordance with a preferred embodiment of the present invention the plurality of operative orientations also includes a third operative orientation in which the vehicle-mounted child protective device is in a mounted and flag raised, door-opened orientation in which the flag portion is in the raised position.

Preferably, the plurality of operative orientations also includes a fourth operative orientation in which the vehicle-mounted child protective device is in a mounted and flag raised, door-closed orientation wherein the flag is locked in the raised orientation. Additionally, in the fourth operative orientation the vehicle-mounted child protective device is in communication with a remote controller and integrity of the communication is being monitored.

In accordance with a preferred embodiment of the present invention the plurality of operative orientations also includes a fifth operative orientation in which the vehicle-mounted child protective device is no longer in communication with the remote controller due to exceedance of a maximum distance between the remote controller and the vehicle-mounted child protective device and the remote controller and the vehicle-mounted child protective device both provide a human sensible warning.

Preferably, the plurality of operative orientations also includes a temperature exceedance operative orientation in which the vehicle-mounted child protective device senses exceedance of a predetermined temperature within the vehicle and at least the vehicle-mounted child protective device provides a human sensible warning of temperature exceedance.

There is also provided in accordance with another preferred embodiment of the present invention a method for providing a warning of a child being left in a vehicle, the method including mounting onto a door of a vehicle, a vehicle door mountable device including a flag portion which is raisable to a raised position above a roof of the vehicle and a flag positioning assembly operative to selectably lock the flag in the raised position when the vehicle door mountable device is mounted onto a vehicle door and the vehicle door is closed, establishing wireless communication between the vehicle door mountable device and a remote controller and responsive to exceedance of a separation distance between the vehicle door mountable device and the remote controller, producing a warning alert at least at the remote controller and retaining the flag portion in the raised position until the door of the vehicle is opened.

In accordance with a preferred embodiment of the present invention the vehicle door mountable device also includes a vehicle interior temperature sensor and the method also includes providing a warning alert of exceedance of a threshold interior temperature in the vehicle.

BRIEF DESCRIPTION OF THE DRAWINGS

The present invention will be understood and appreciated more fully from the following detailed description in which:

FIGS. 12A and 12B are simplified pictorial illustrations, taken in mutually different directions, of a flag element forming part of the vehicle-mountable child protective device of FIGS. 1-11B;

FIGS. 20A, 20B, 20C and 20D are simplified pictorial and planar illustrations, taken in mutually different directions, of a first housing element forming part of the vehicle-mountable child protective device of FIGS. 1-22B;

FIGS. 23A, 23B, 23C, 23D and 23E are respective simplified pictorial and planar illustrations, taken in mutually different directions, and a sectional illustration of a second housing element, forming part of the vehicle-mountable child protective device of FIGS. 1-19C, FIG. 23E being taken along lines E-E in FIG. 23A;

FIGS. 27A, 27B and 27C are simplified respective pictorial assembled view, exploded view and sectional illustrations of a flag position responsive switch circuit assembly forming part of the vehicle-mountable child protective device of FIGS. 1-24, FIG. 27C being taken along lines C-C in FIG. 27A:

FIGS. 29A and 29B are respective simplified pictorial and sectional illustrations of the vehicle-mountable child protective device of FIGS. 1-28C in a first operative orientation, FIG. 29B being taken along lines B-B in FIG. 29A:

FIGS. 30A and 30B are respective simplified pictorial and sectional illustrations of the vehicle-mountable child protective device of FIGS. 1-28C in a second operative orientation, FIG. 30B being taken along lines B-B in FIG. 30A;

FIGS. 31A and 31B are respective simplified pictorial and sectional illustrations of the vehicle-mountable child protective device of FIGS. 1-28C in a third operative orientation, FIG. 31B being taken along lines B-B in FIG. 31A;

FIGS. 34A, 34B, 34C, 34D, 34E, 34F, 34G and 34H are simplified pictorial illustrations of the vehicle-mountable child protective device of FIGS. 1-28C in various operative orientations.

DETAILED DESCRIPTION OF PREFERRED EMBODIMENTS

Figure 1:
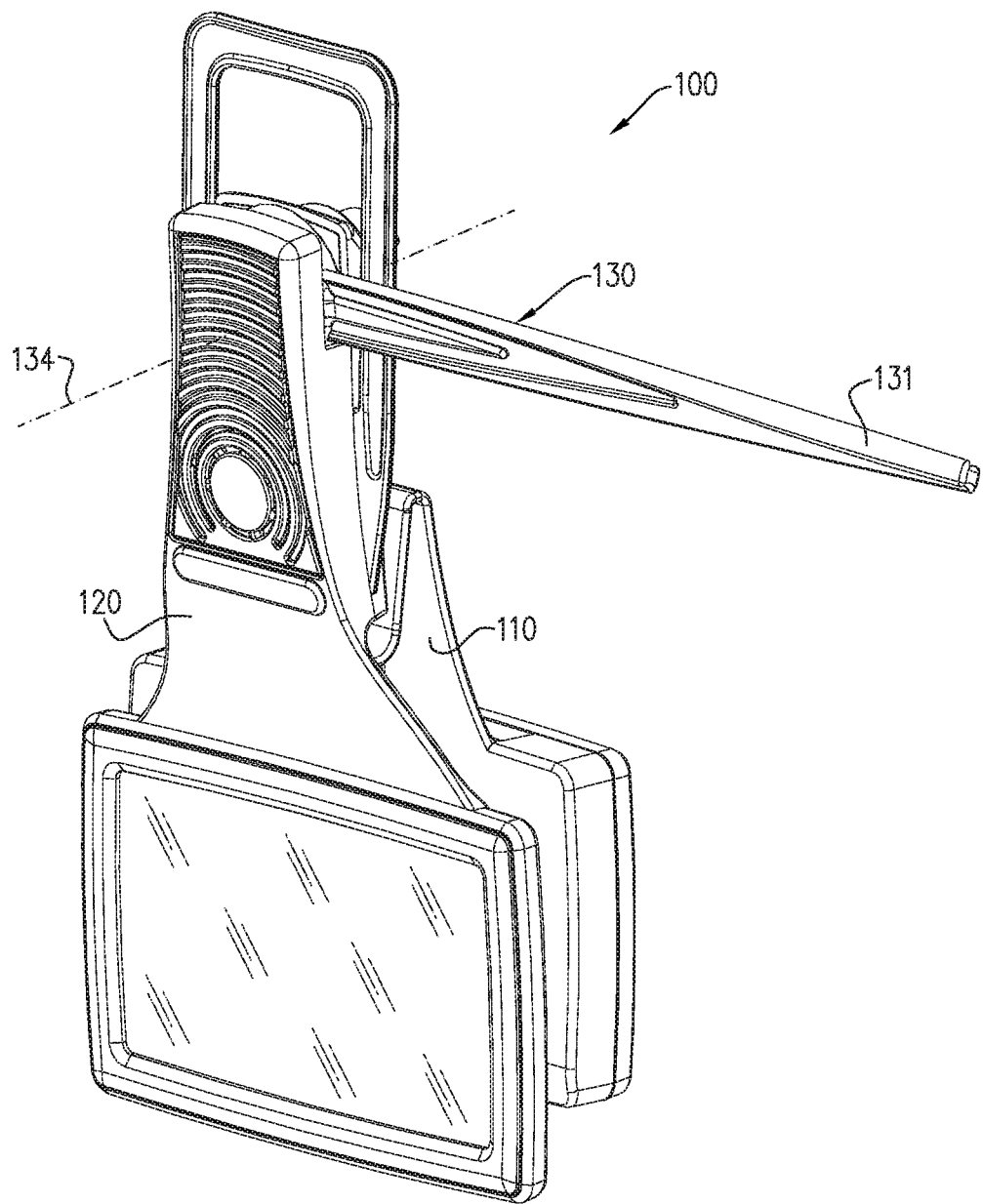
FIGS. 1 and 2 are simplified pictorial illustrations, taken in mutually different directions, of a vehicle-mountable child protective device constructed and operative in accordance with a preferred embodiment of the present invention in a first operative orientation.
Figure 2:
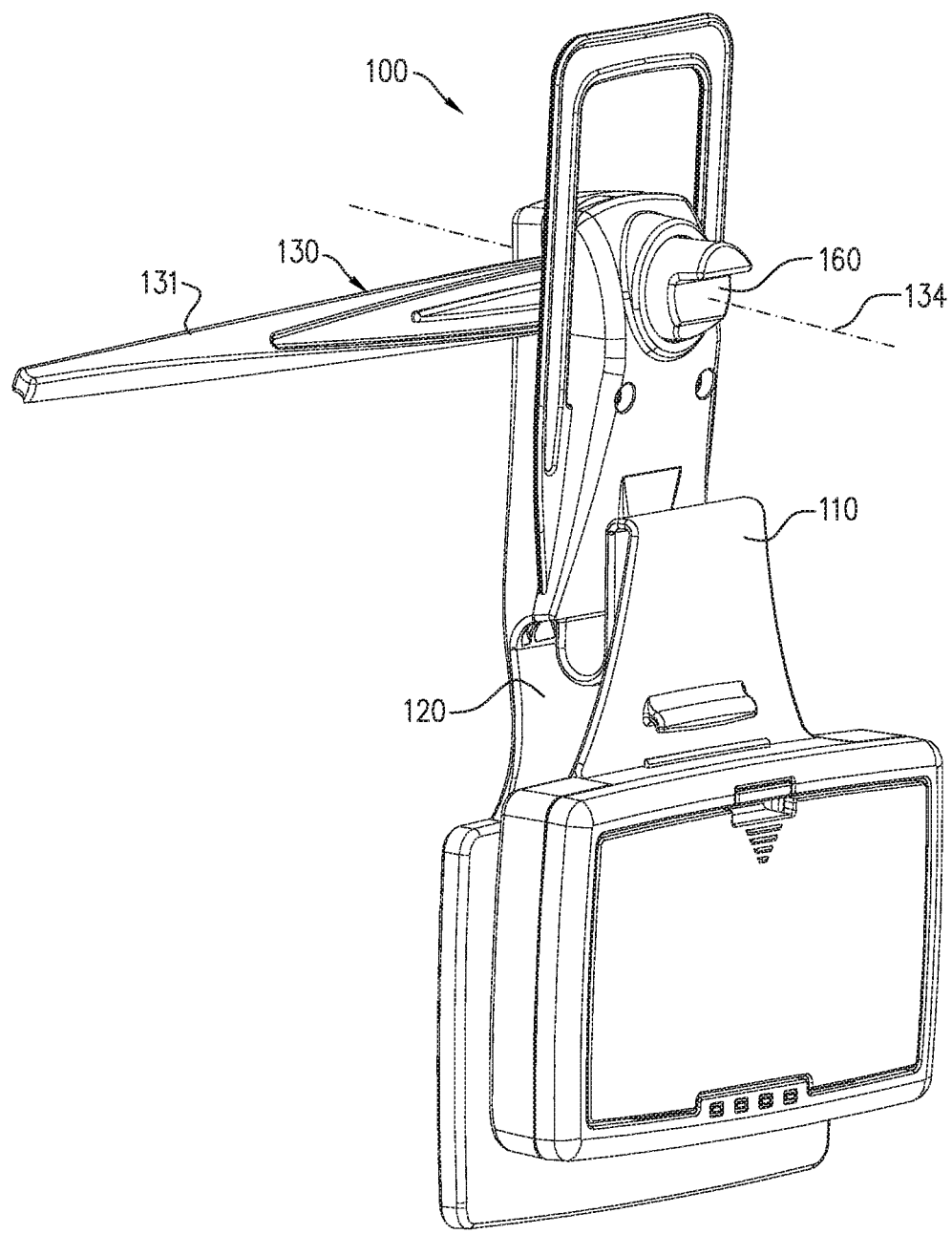
Figure 3:
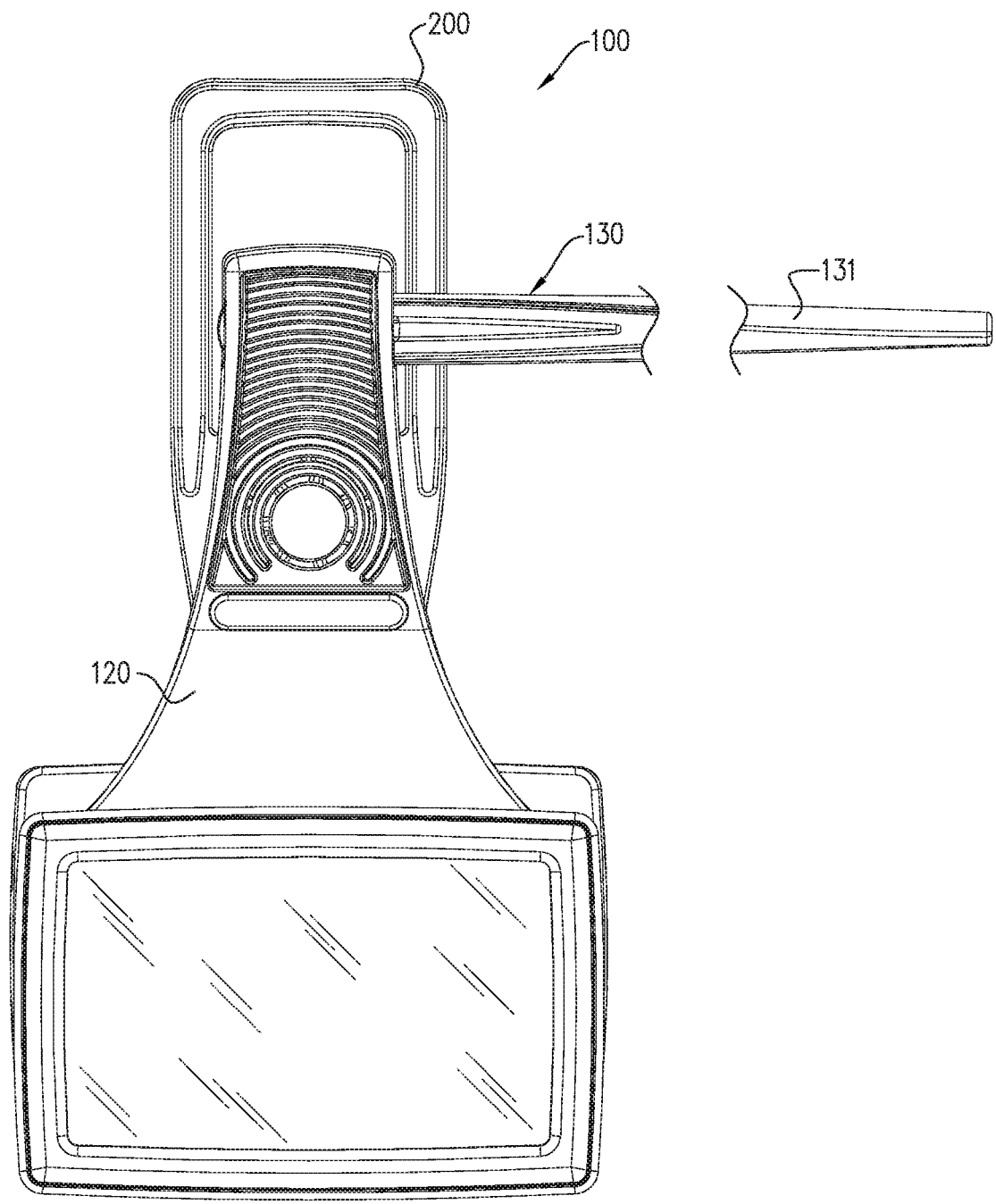
FIGS. 3 and 4 are respective simplified planar front view and side view illustrations of the vehicle-mountable child protective device of FIGS. 1 & 2 in the first operative orientation.
Figure 4:
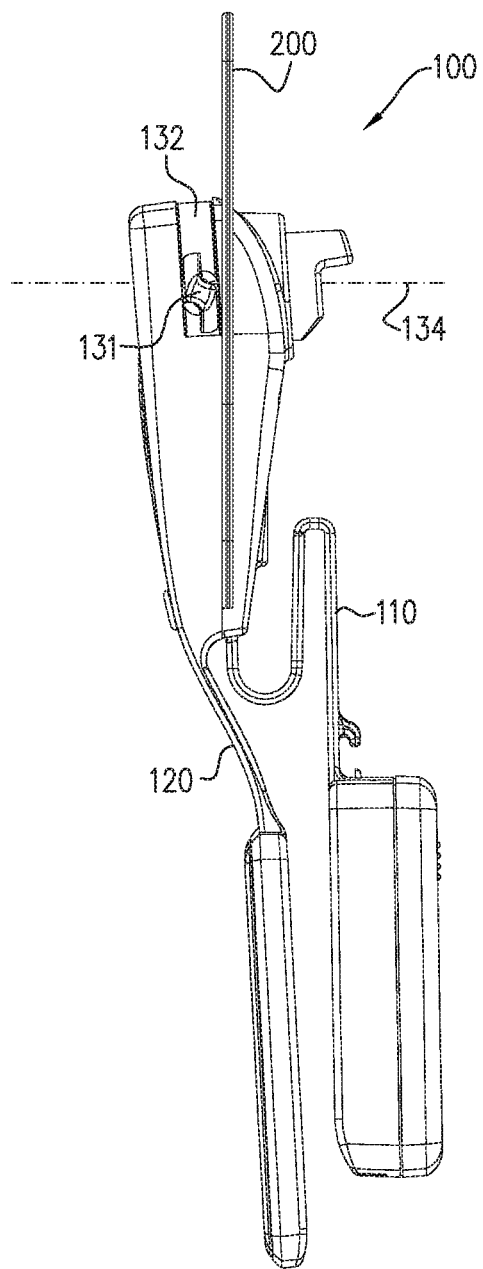
Figure 5A:
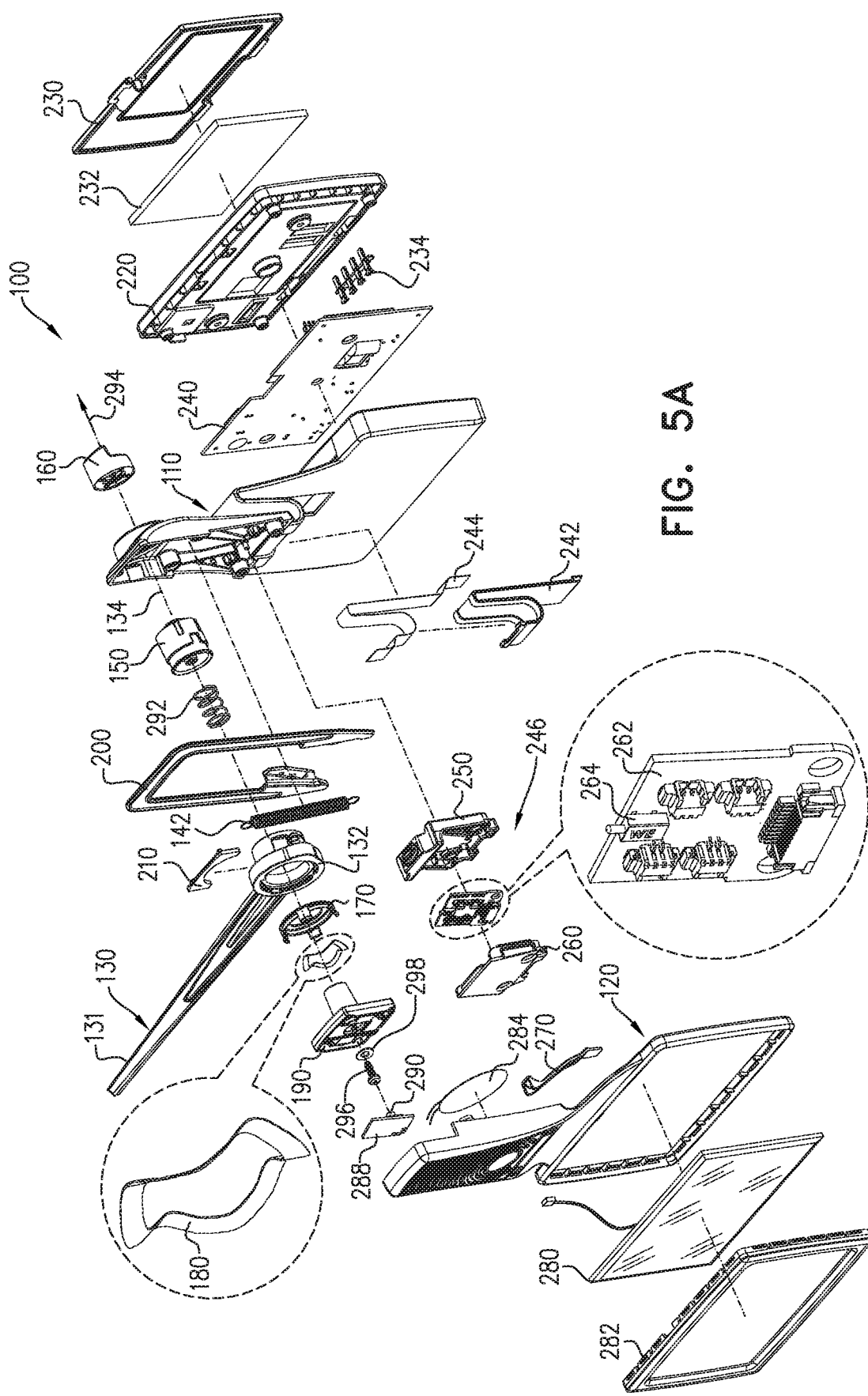
FIGS. 5A and 5B are simplified exploded view illustrations, taken in mutually different directions, of the vehicle-mountable child protective device of FIGS. 1-4.
Figure 5B:
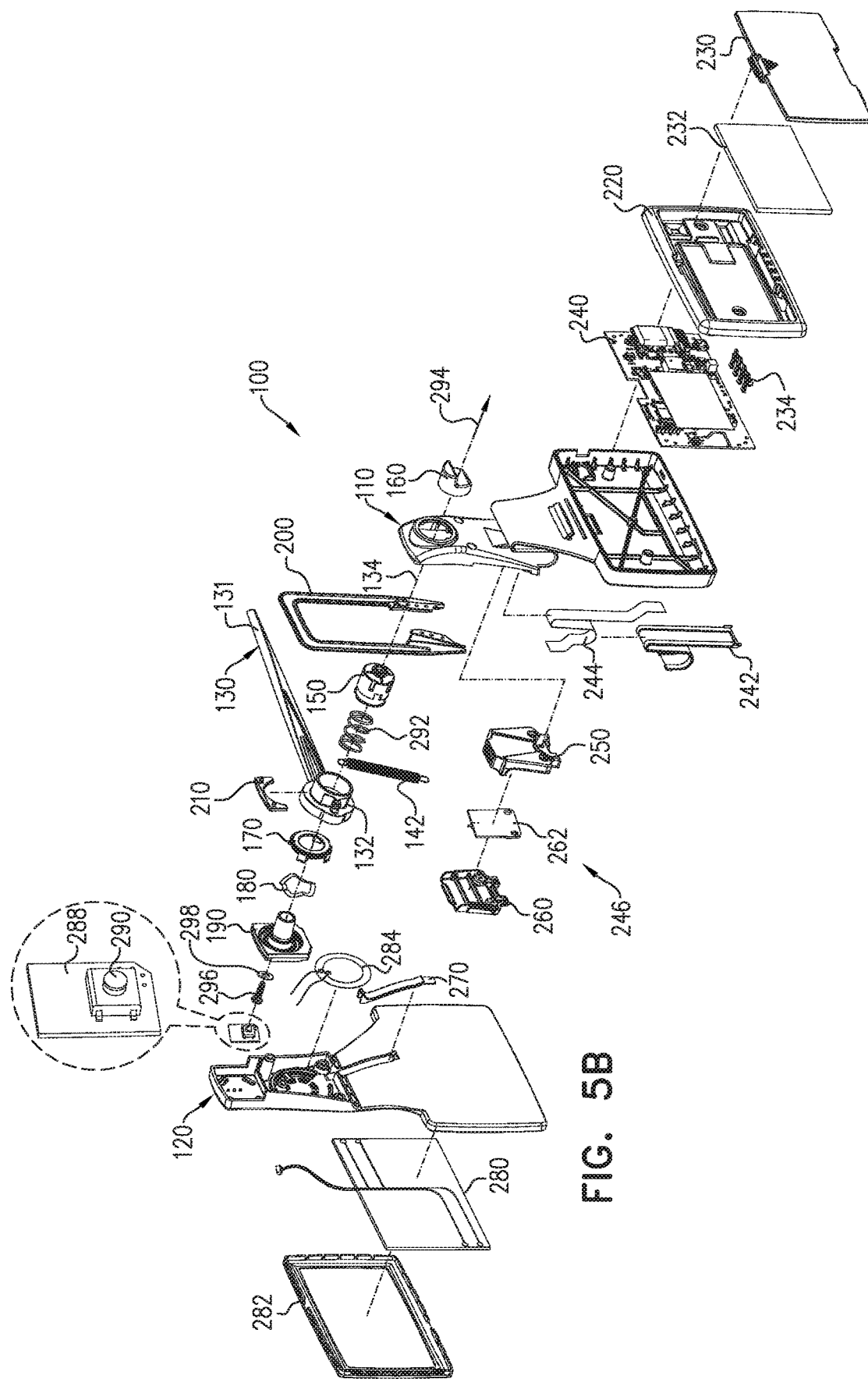

Reference is now made to FIGS. 1-5B, which are simplified illustrations of a vehicle-mountable child protective device 100, constructed and operative in accordance with a preferred embodiment of the present invention.

As seen in FIGS. 1-5B, the vehicle-mountable child protective device 100 preferably includes a housing which is mountable onto a vehicle door, preferably as described hereinbelow in detail with reference to FIGS. 33A-33D, and includes a first housing element 110, described hereinbelow with reference to FIGS. 20A-20F, which is at least partially located within the vehicle during operation of the device, and a second housing element 120, described hereinbelow with reference to FIGS. 23A-23E, which is at least partially located outside the vehicle when the device 100 is mounted onto the vehicle.

A flag element 130, described hereinbelow with reference to FIGS. 12A & 12B, includes a flag portion 131, which is preferably integrally formed, as by co-molding, with a flag base 132, and is rotatably mounted onto first housing element 110 for selectable rotational positioning thereof about an axis 134.

A flag positioning assembly, mounted onto first housing element 110 and located at least partially between first and second housing elements 110 and 120, is operative for automatically rotating the flag base 132 and thus the flag portion 131 to a raised position outside of and above the vehicle upon opening of the door onto which the device 100 is mounted.

The flag positioning assembly preferably includes a flag positioning coil spring 142, which urges the flag element 130 and the flag portion 131 to an upright, raised operative orientation from a lowered operative orientation. The flag base 132 and the flag portion 131 may have two different principal lowered operative orientations, each typically at approximately 90 degrees to the upright, raised operative orientation in mutually opposite directions about axis 134.

The flag positioning assembly preferably also comprises a flag positioning element 150, which is described hereinbelow with reference to FIGS. 9A-9D. Flag positioning element 150 axially engages first housing element 110 and flag base 132 along axis 134. The flag positioning assembly also preferably comprises a flag positioning vehicle engagement element 160, which is described hereinbelow with reference to FIGS. 10A & 10B. Flag positioning vehicle engagement element 160 engages flag positioning element 150 and is rotatable with respect thereto about axis 134 in order to conform to various vehicle configurations.

The flag positioning assembly also preferably comprises a first flag engagement element 170, which is described hereinbelow with reference to FIGS. 15A-15C, a second flag engagement element 180, which is preferably a conventional wave spring, such as a SSB-0087 spring commercially available from Smalley of Lake Zurich, Ill., USA, and a third flag engagement element 190 which functions as a base for the flag positioning assembly and which is described hereinbelow with reference to FIGS. 19A-19E.

Figure 11A:
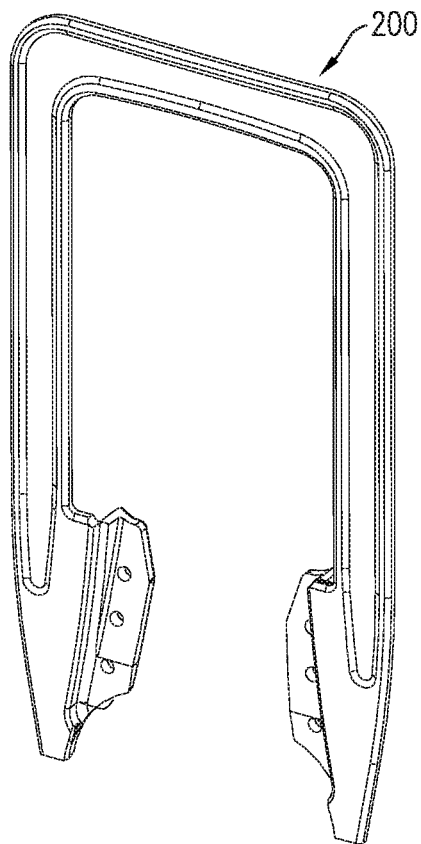
FIGS. 11A and 11B are simplified pictorial illustrations, taken in mutually different directions, of a retaining element forming part of the vehicle-mountable child protective device of FIGS. 1-10B.
Figure 11B:
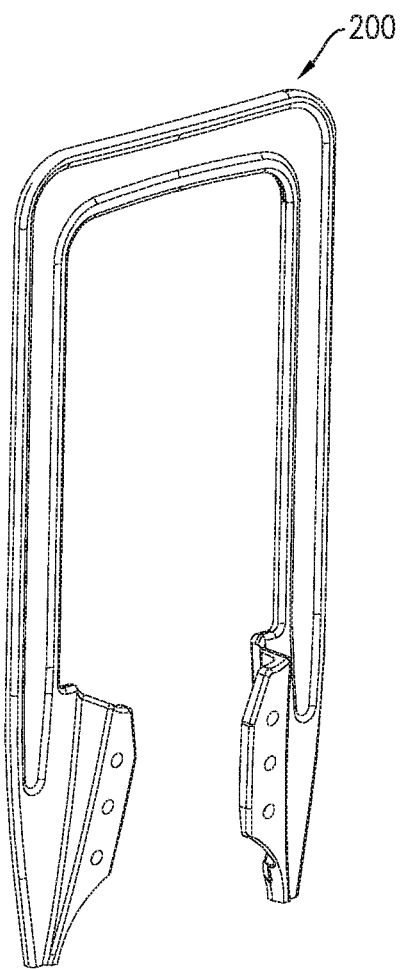

A flexible retaining element 20X), which is described hereinbelow with reference to FIGS. 11A and 11B, is mounted onto first housing element 110 and is employed for retaining the child protective device 100 onto the door of a vehicle, as described hereinbelow with reference to FIGS. 33A-33D. Also mounted onto first housing element 110 are an environmental sealing element 210, which is described hereinbelow with reference to FIGS. 13A and 13B, a first housing element cover element 220, which is described hereinbelow with reference to FIGS. 6A and 6B, and a battery cover element 230, which is described hereinbelow with reference to FIGS. 7A and 7B. A battery 232 is seated in first housing element cover element 220 and covered by battery cover element 230. Enclosed within first housing element 110 and covered by first housing element cover element 220 are battery contacts 234 and a circuit board 240, which is described hereinbelow with reference to FIGS. 8A and 8B.

Associated with first housing element 110 is a flexible conductor assembly, which is described hereinbelow with reference to FIGS. 14A-14C and includes a flexible conductor support 242 and a flexible conductor cable 244. Preferably, two or more different colored LEDs (not shown) are provided on first housing element 110.

Figure 17A:
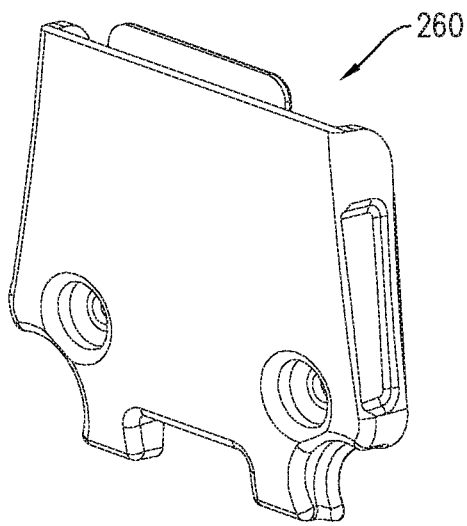
FIGS. 17A and 17B are respective simplified first and second pictorial illustrations, taken in mutually different directions, of an outdoor circuitry housing portion cover element, forming part of the vehicle-mountable child protective device of FIGS. 1-16C.
Figure 17B:
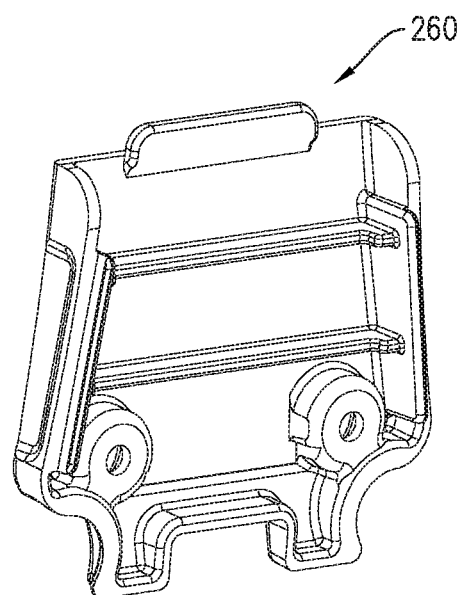
Figure 18A:
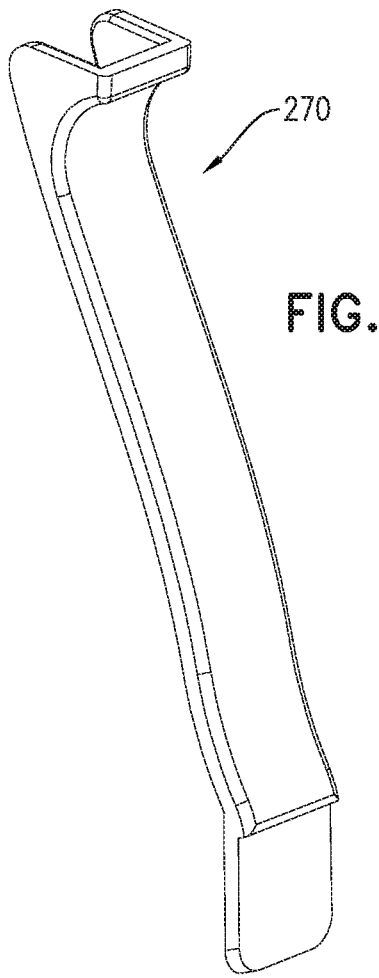
FIGS. 18A and 18B are simplified pictorial illustrations, taken in mutually different directions, of a cable cover element forming part of the vehicle-mountable child protective device of FIGS. 1-17B.
Figure 18B:
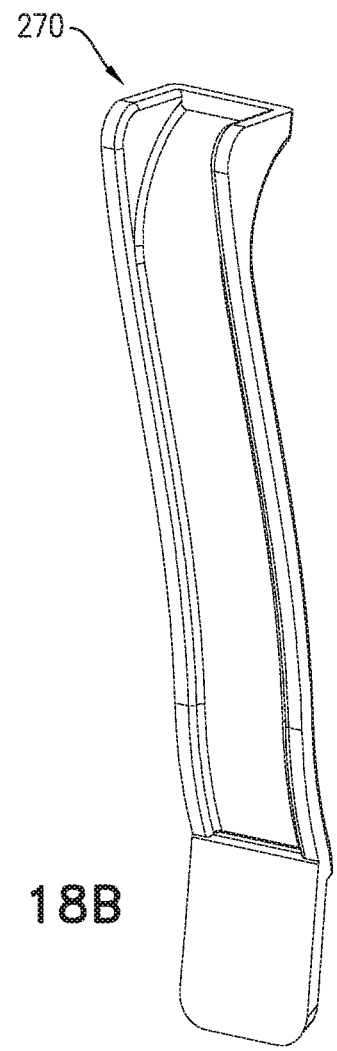
Figure 25A:
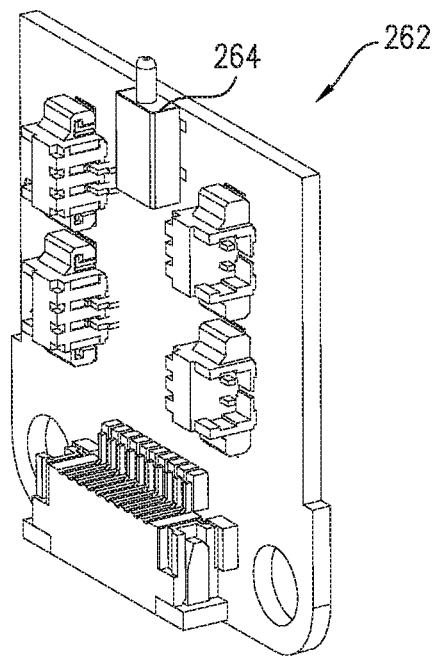
FIGS. 25A and 25B are simplified respective first and second pictorial illustrations, taken in mutually different directions, of a printed circuit board mounted in outdoor circuitry housing portion of the vehicle-mountable child protective device of FIGS. 1-24.
Figure 25B:
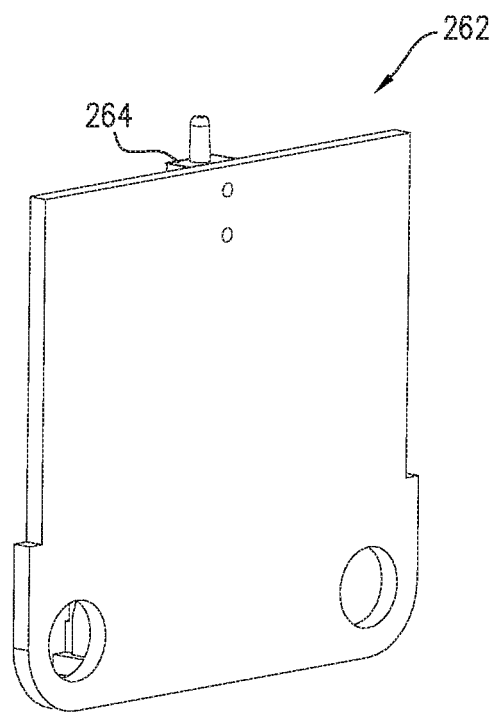

Mounted on second housing element 120 is an outdoor circuitry assembly 246, which is illustrated in FIGS. 27A-27C and includes an outdoor circuitry housing portion element 250, which is described hereinbelow with reference to FIGS. 16A-16E, and an outdoor circuitry housing portion element cover 260, which is described hereinbelow with reference to FIGS. 17A & 17B. Enclosed by elements 250 and 260 is an electrical circuit board 262 onto which is mounted a microswitch 264, both of which are illustrated in FIGS. 25A & 25B. Additionally a cable cover element 270, which is described hereinbelow with reference to FIGS. 18A & 18B, is also mounted on second housing element 120.

Also mounted onto second housing element 120 is a solar electricity generating panel 280, which is retained onto second housing element 120 by a solar panel engagement element 282, and a buzzer 284.

Figure 26A:
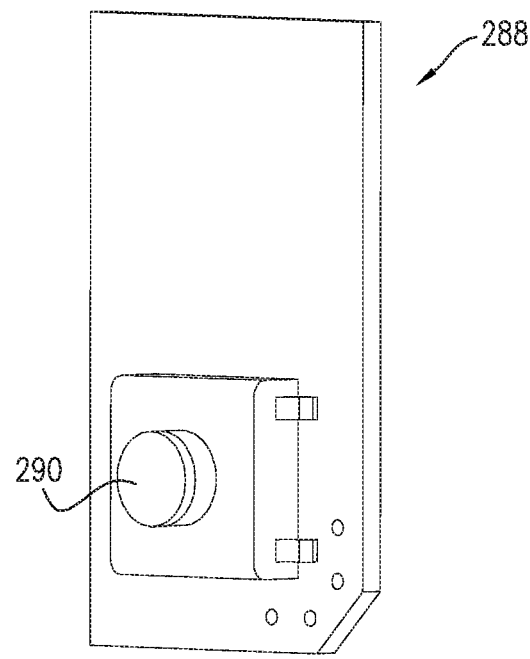
FIGS. 26A and 26B are simplified respective first and second pictorial illustrations, taken in mutually different directions, of a printed circuit board mounted onto the second housing portion of the vehicle-mountable child protective device of FIGS. 1-24.
Figure 26B:
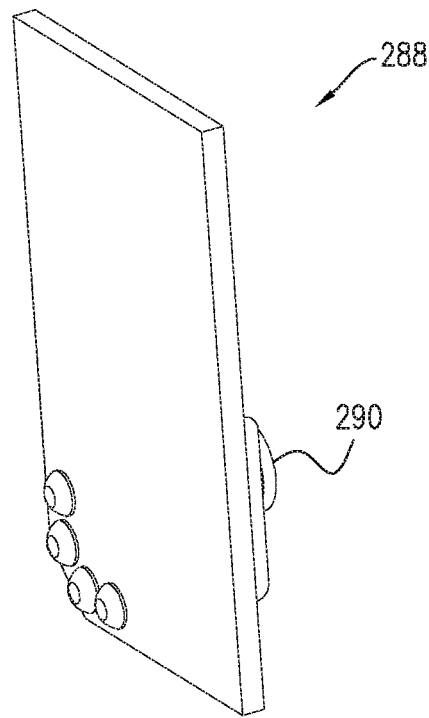

Additionally mounted onto second housing portion is a printed circuit board 288 onto which is mounted a microswitch 290, as seen in FIGS. 26A & 26B.

A compression spring 292 is provided for urging flag positioning element 150 and flag positioning vehicle engagement element 160 axially along axis 134 in a direction indicated by an arrow 294. A screw 296 retains a washer 298 in tight engagement with flag positioning element 150.

Figure 6A:
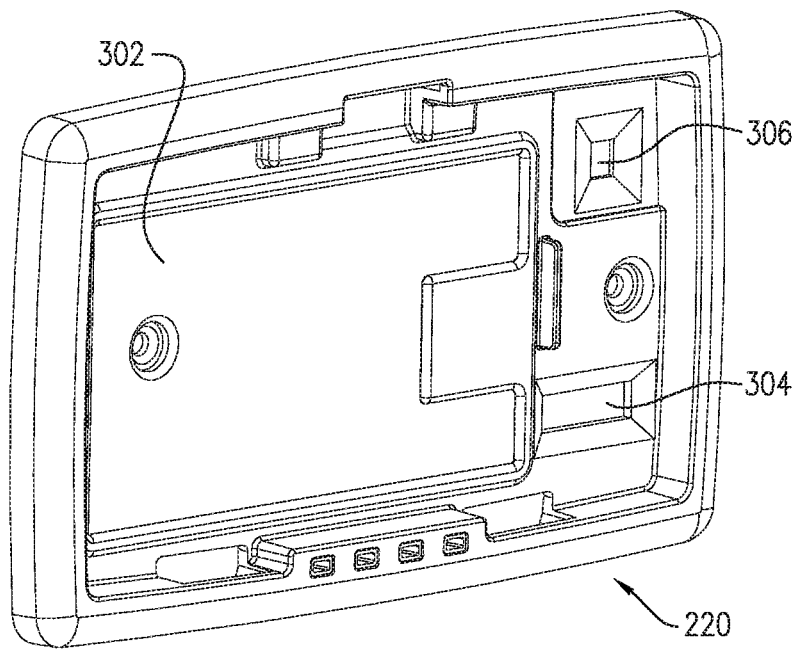
FIGS. 6A and 6B are simplified pictorial illustrations, taken in mutually different directions, of a first housing element cover element forming part of the vehicle-mountable child protective device of FIGS. 1-5B.
Figure 6B:
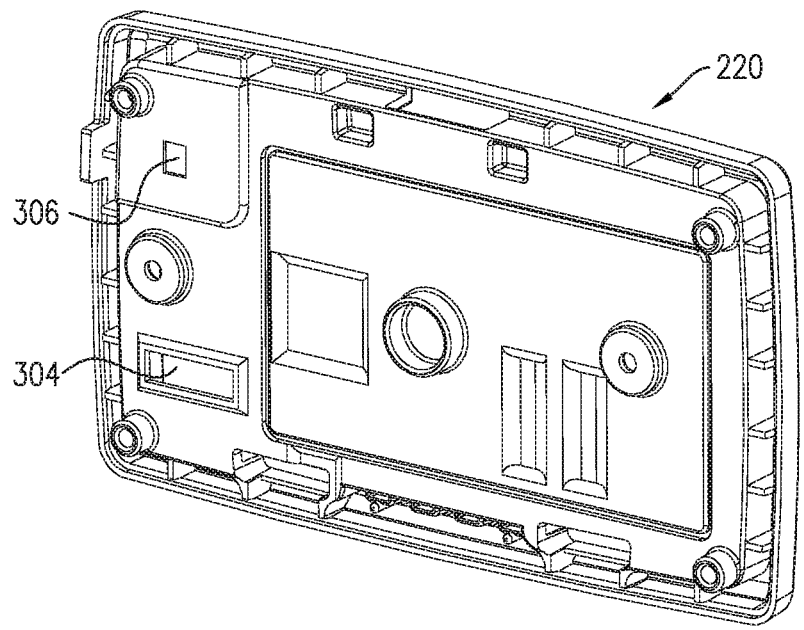

Reference is now made to FIGS. 6A and 6B, which are simplified pictorial illustrations, taken in mutually different directions, of first housing element cover element 220 forming part of the vehicle-mountable child protective device 100 of FIGS. 1-5B. As seen particularly in FIG. 6A, element 220 defines a socket 302 for receiving rechargeable battery 232, a socket 304 for receiving an optional Bluetooth connector and a socket 306 for receiving a battery connector.

Figure 7A:
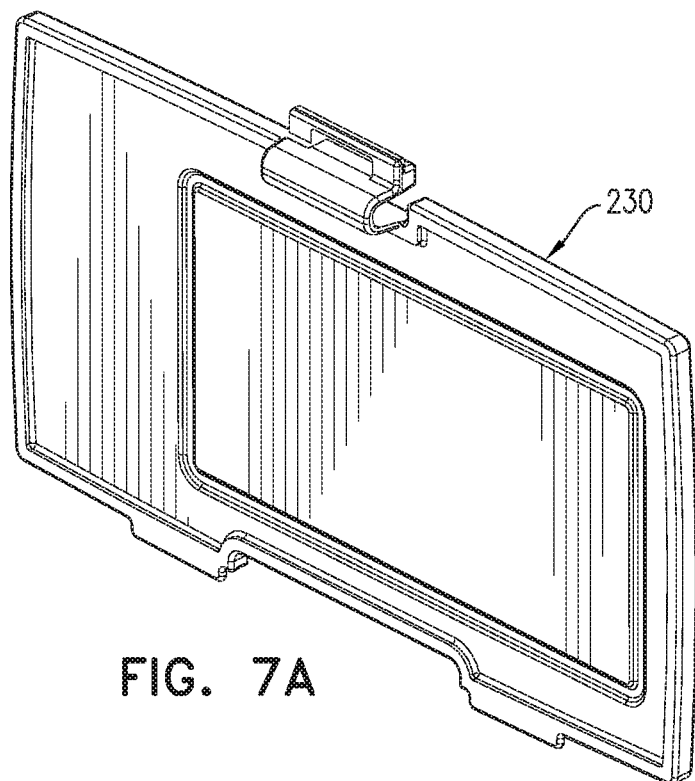
FIGS. 7A and 7B are simplified pictorial illustrations, taken in mutually different directions, of a battery cover element forming part of the vehicle-mountable child protective device of FIGS. 1-6B.
Figure 7B:
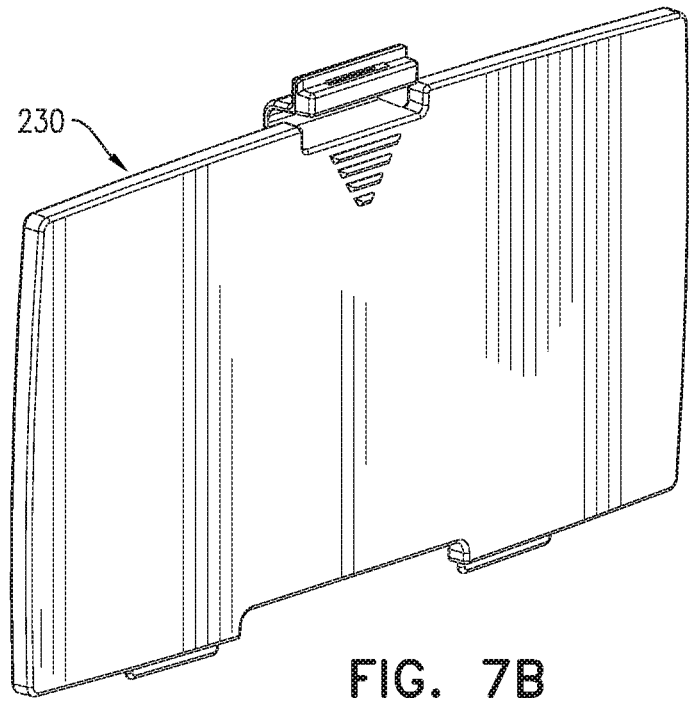

Reference is now made to FIGS. 7A and 7B, which are simplified pictorial illustrations, taken in mutually different directions, of battery cover element 230 forming part of the vehicle-mountable child protective device of FIGS. 1-6B.

Figure 8A:
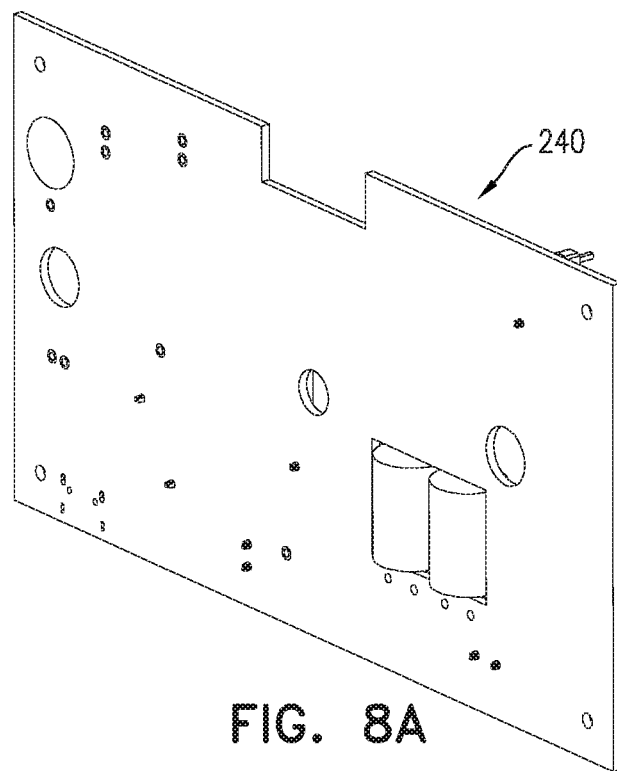
FIGS. 8A and 8B are simplified pictorial illustrations, taken in mutually different directions, of a circuit board forming part of the vehicle-mountable child protective device of FIGS. 1-7B.
Figure 8B:
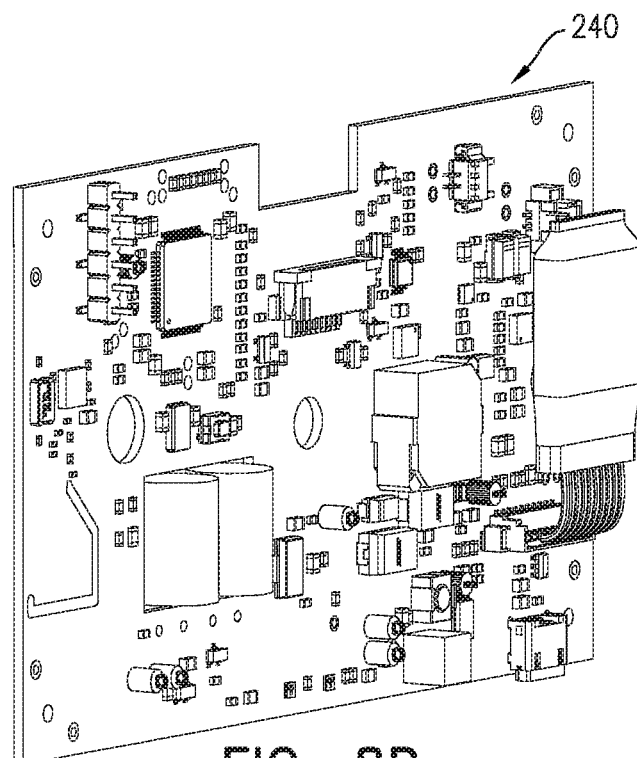

Reference is now made to FIGS. 8A and 8B, which are simplified pictorial illustrations, taken in mutually different directions, of circuit board 240, forming part of the vehicle-mountable child protective device of FIGS. 1-7B. Circuit board 240 preferably includes a temperature sensor (not shown).

Figure 9A:
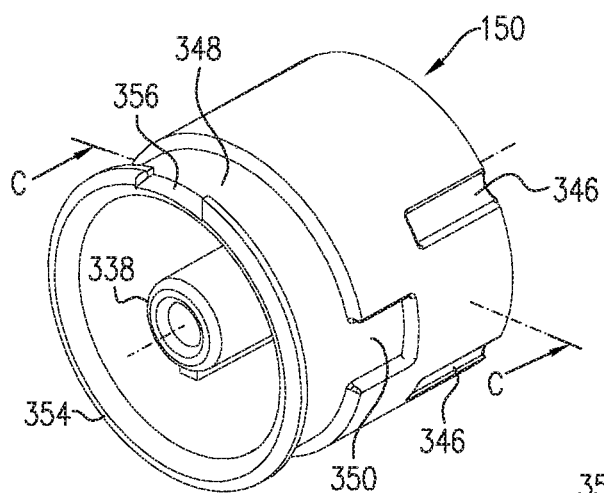
FIGS. 9A and 9B are simplified pictorial illustrations, taken in mutually different directions, of a flag positioning element forming part of the vehicle-mountable child protective device of FIGS. 1-8B.
Figure 9B:
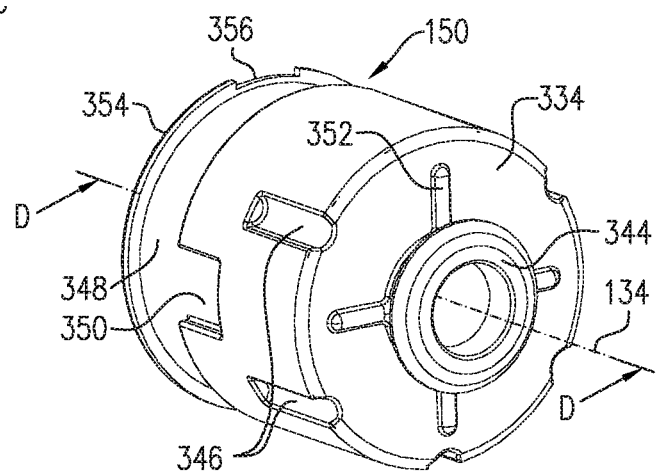
Figure 9C:
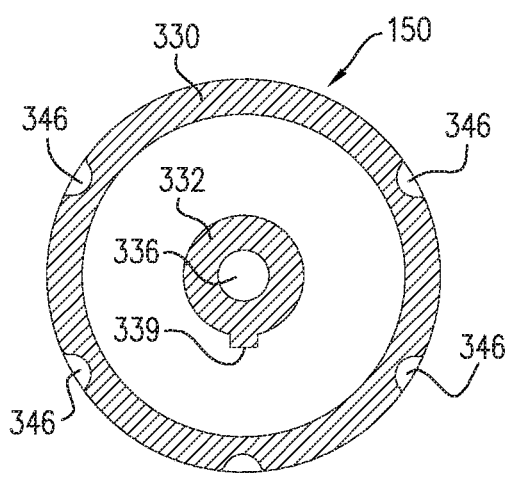
FIGS. 9C and 9D are respective simplified sectional illustrations, taken along respective lines C-C and D-D in FIGS. 9A & 9B.
Figure 9D:
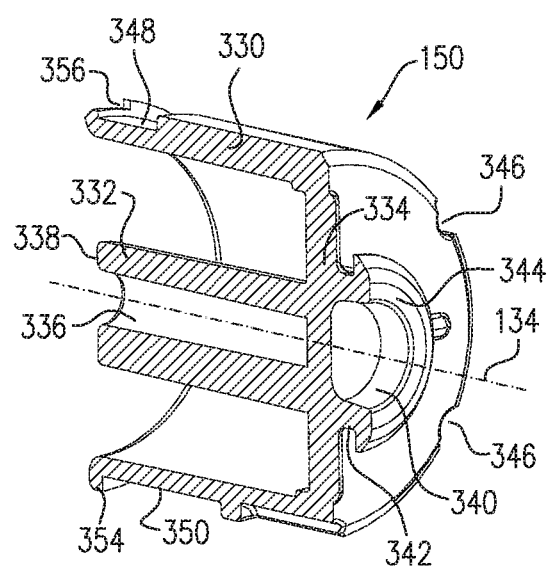

Reference is now made to FIGS. 9A and 9B, which are simplified pictorial illustrations, taken in mutually different directions, of flag positioning element 150, forming part of the vehicle-mountable child protective device of FIGS. 1-8B, and to FIGS. 9C and 9D, which are respective simplified sectional illustrations, taken respective lines C-C and D-D in FIGS. 9A & 9B.

As seen in FIGS. 9A-9D, flag positioning element 150 is a generally cylindrical side to side symmetric element having an outer cylindrical wall 330 and an inner cylindrical wall 332, which are joined at an end wall 334. Inner cylindrical wall 332 defines a threaded bore 336 and terminates at an annular surface 338. Inner cylindrical wall 332 also defines an elongate protrusion 339. Bore 336 tightly receives screw 296 and tightly retains washer 298 against annular surface 338. Bore 336 is aligned with a recess 340 surrounded by a cylindrical wall 342. Recess 340 rotatably receives flag positioning vehicle engagement element 160. Cylindrical wall 342 defines a radially outwardly extending tapered flange 344.

Outer cylindrical wall 330 is formed with a plurality of elongate recesses 346 which extend to end wall 334, a circumferential recess 348 and a plurality, typically 3, of recesses 350, which extend from circumferential recess 348 towards end wall 334.

End wall 334 is preferably formed with a plurality, typically 4, of radially extending protrusions 352, which extend outwardly from cylindrical wall portion 342.

Circumferential recess 348 terminates at a rim 354 which is formed with a slot 356.

Figure 10A:
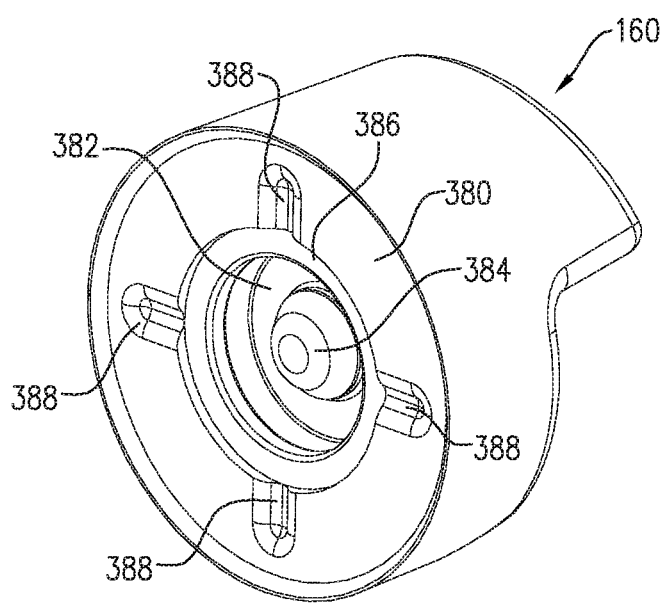
FIGS. 10A and 10B are simplified pictorial illustrations, taken in mutually different directions, of a flag positioning vehicle engagement element forming part of the vehicle-mountable child protective device of FIGS. 1-9D.
Figure 10B:
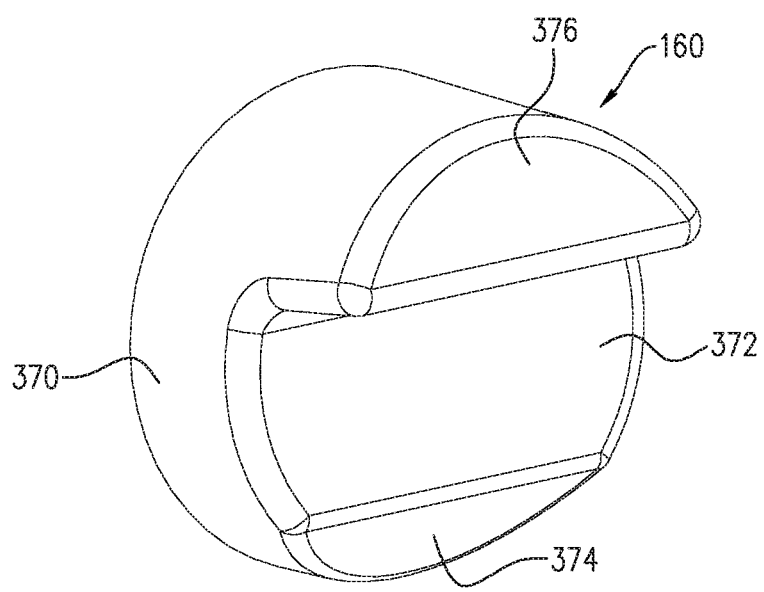

Reference is now made to FIGS. 10A and 10B, which are simplified pictorial illustrations, taken in mutually different directions, of flag positioning vehicle engagement element 160, forming part of the vehicle-mountable child protective device of FIGS. 1-9D. Flag positioning vehicle engagement element 160 is adapted for selectable rotational orientation relative to flag positioning element 150, thereby to adapt the vehicle-mountable child protective device of FIGS. 1-9D for use with various vehicle configurations.

Flag positioning vehicle engagement element 160 is a relatively resilient element and, as seen in FIGS. 10A & 10B, includes a generally cylindrical wall portion 370 and a flat end portion 372 as well as two oppositely tapered end portions 374 and 376. Flag positioning vehicle engagement element 160 also preferably includes a generally planar inner surface 380 having a central recess 382, which is formed with an undercut rim for being retained by flange 344 of flag positioning element 150 and a central rounded protrusion 384 within the central recess 382, which central protrusion seats in recess 340 of flag positioning element 150 (FIGS. 9A-9D) in a manner which absorbs impact due to closing of a vehicle door onto which the device 100 is mounted. Surrounding central recess 382 is a peripheral recess 386 and extending outwardly from peripheral recess 386 are a plurality of radially extending recesses 388 which correspond to and receive radially extending protrusions 352 of flag positioning element 150 (FIGS. 9A-9D). Radially extending recesses 388 are configured to receive protrusions 352 of flag positioning element 150 (FIGS. 9A-9D) so as to retain flag positioning vehicle engagement element 160 in a user-selected azimuthal orientation about axis 134 until changed by the user. Normally, if the device 100 is being used on a single vehicle, this azimuthal orientation will not be changed by the user after initial installation as described hereinbelow with reference to FIGS. 33A-33D.

Reference is now made to FIGS. 11A and 11B, which are simplified pictorial illustrations, taken in mutually different directions, of retaining element 200 forming part of the vehicle-mountable child protective device of FIGS. 1-10B. Retaining element 200 is a highly flexible element, which is mounted onto first housing element 110. Operation of retaining element 200 is described hereinbelow with reference to FIGS. 33A-33D.

Reference is now made to FIGS. 12A and 12B, which are simplified pictorial illustrations, taken in mutually different directions, of flag element 130, forming part of the vehicle-mountable child protective device of FIGS. 1-11B. As seen in FIGS. 12A & 12B, flag element 130 includes flag portion 131, which is preferably integrally formed, as by co-molding, with flag base 132 and is configured for rotatable mounting onto first housing element 110 for selectable rotational positioning thereof about axis 134.

Flag base 132 is a generally cylindrical portion having first and second generally circular cylindrical outer surfaces 390 and 392 separated by a shoulder 394. Flag base 132 also includes a circular cylindrical inner surface 400) having a radially inwardly extending protrusion 402 formed therein. Inner surface 400 terminates at a shoulder, which defines an annular surface 406. Annular surface 406 is surrounded by a pair of semi-circular side-by-side shoulders 408 and 410, which are separated by a pair of radially inwardly facing protrusions 412. Generally circular cylindrical outer surface 390 is formed with a tapered radially outwardly directed protrusion 414, which lies azimuthally opposite to flag portion 131. A coil spring socket 416 is aligned with protrusion 414 for connection to an end of spring 142.

Figure 13A:
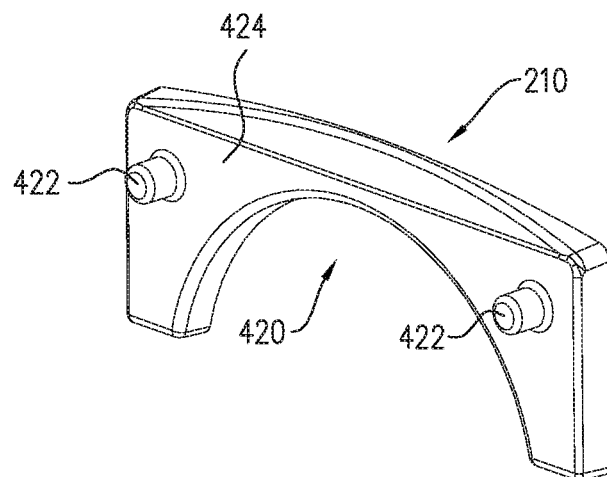
FIGS. 13A and 13B are simplified pictorial illustrations, taken in mutually different directions, of an environmental sealing element forming part of the vehicle-mountable child protective device of FIGS. 1-12B.
Figure 13B:
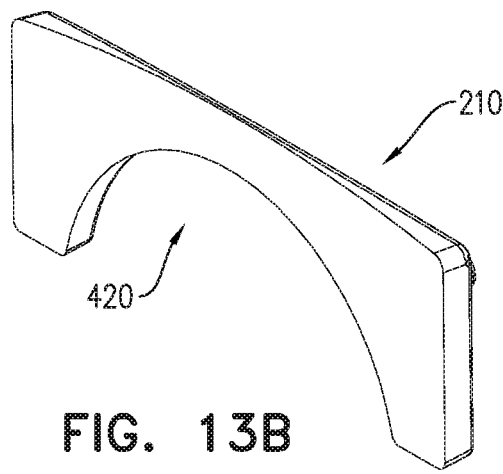

Reference is now made to FIGS. 13A and 13B, which are simplified pictorial illustrations, taken in mutually different directions, of environmental sealing element 210, forming part of the vehicle-mountable child protective device of FIGS. 1-12B. As seen in FIGS. 13A & 13B, environmental sealing element 210 is a generally planar, generally rectangular element, preferably formed of a resilient material and has a non-uniform thickness. Environmental sealing element 170 is formed with a semicircular recess 420, configured to slidably accommodate outer cylindrical surface 392 of flag base 132.

A pair of mounting protrusions 422 are provided on a surface 424 of environmental sealing element 210 for mounting of environmental sealing element 210 onto first housing element 110. Environmental sealing element 210 is configured to seal the volume defined between first and second housing elements 110 and 120 from dust and contamination.

Figure 14A:
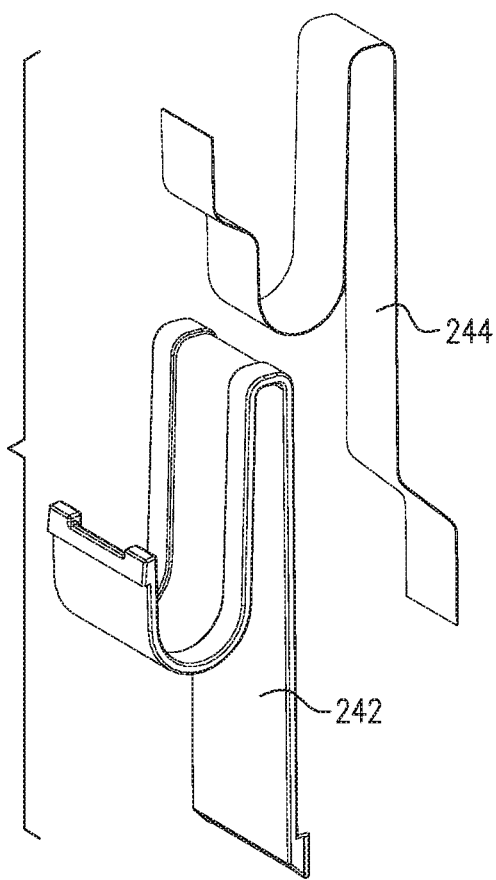
FIGS. 14A, 14B and 14C are respective simplified pictorial exploded view and first and second assembled view illustrations, taken in mutually different directions, of a flexible conductor assembly forming part of the vehicle-mountable child protective device of FIGS. 1-13B.

Reference is now made to FIGS. 14A. 14B and 14C, which are respective simplified pictorial exploded view and first and second assembled view illustrations, taken in mutually different directions, of flexible conductor assembly forming part of the vehicle-mountable child protective device of FIGS. 1-13B.

Figure 14B:
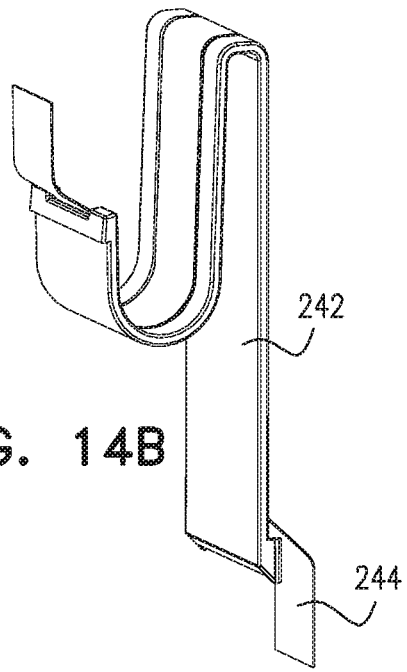
Figure 14C:
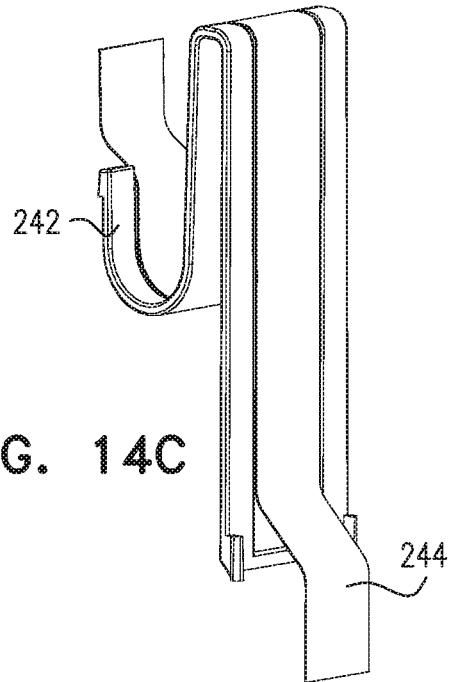

As seen in FIGS. 14A-14C, the flexible conductor assembly includes flexible conductor support 242 and flexible conductor cable 244. Flexible conductor cable 244 interconnects electrical circuit board 240 with electrical circuit board 262.

Figure 15A:
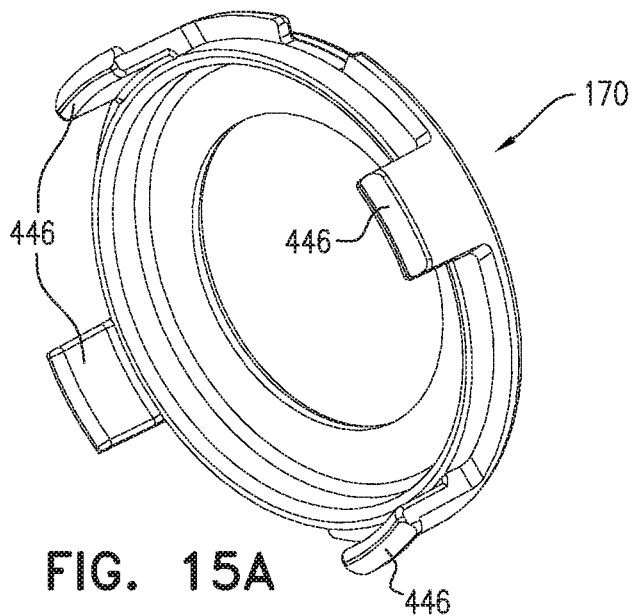
FIGS. 15A, 15B and 15C are respective simplified first and second pictorial illustrations, taken in mutually different directions, and a planar illustration of a first flag engagement element forming part of the vehicle-mountable child protective device of FIGS. 1-14C.
Figure 15B:
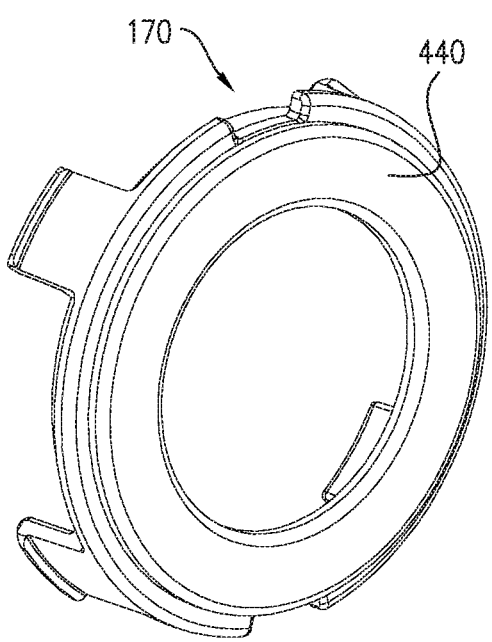
Figure 15C:
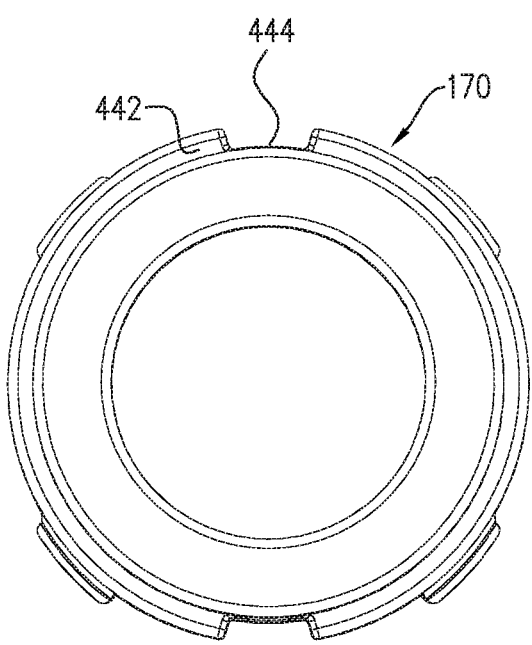
Figure 16A:
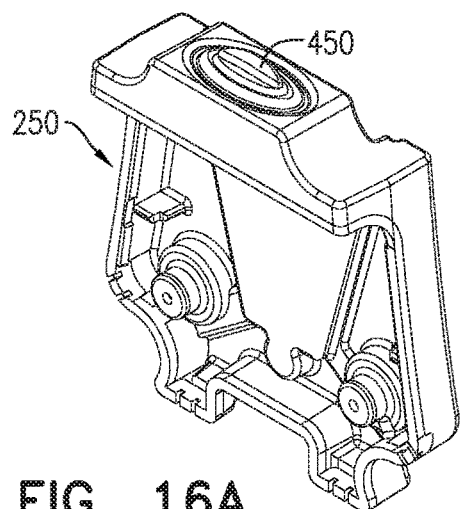
FIGS. 16A, 16B, 16C, 16D and 16E are, respectively, simplified pictorial and planar illustrations, taken in mutually different directions, and a sectional illustration of an outdoor circuitry housing portion element forming part of the vehicle-mountable child protective device of FIGS. 1-15C, FIG. 16E being taken along lines E-E in FIG. 16C.
Figure 16B:
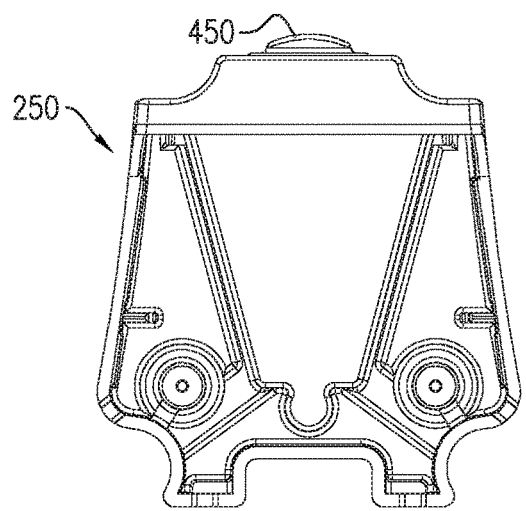
Figure 16C:
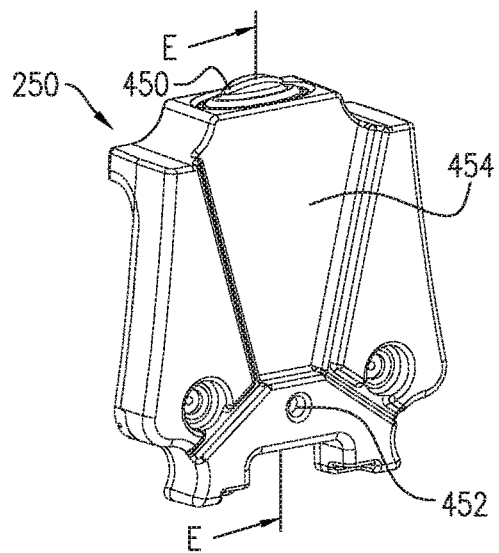
Figure 16D:
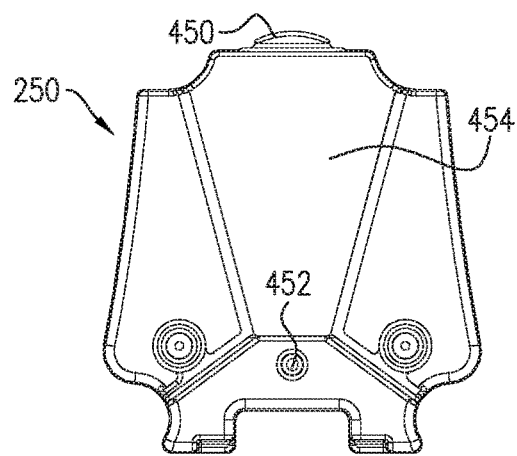
Figure 16E:
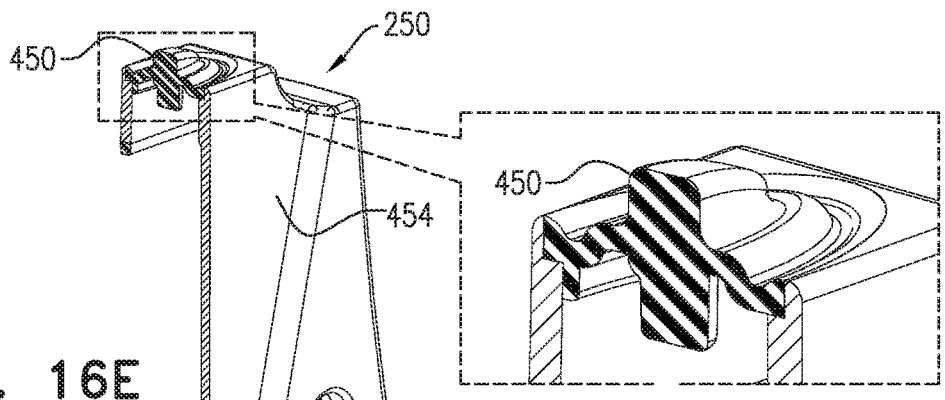

Reference is now made to FIGS. 15A, 15B and 15C, which are respective simplified first and second pictorial illustrations, taken in mutually different directions, and a planar illustration of first flag engagement element 170, forming part of the vehicle-mountable child protective device of FIGS. 1-14C.

As seen in FIGS. 15A-15C, first flag engagement element 170 is a generally circular element having a planar annular surface 440, a radially outwardly-extending flange 442 having a pair of oppositely-directed recesses 444 and preferably four mutually evenly azimuthally spaced protrusions 446, which extend radially outwardly and axially from flange 442. Recesses 444 are configured to selectably receive protrusions 412 of flag base 132 in a first flag locking operative orientation. When the device 100 is not in the first flag locking operative orientation, protrusions 412 are in rotatable sliding engagement with flange 442 for relative rotation about axis 134.

Reference is now made to FIGS. 16A-16E, which illustrate outdoor circuitry housing portion element 250. FIGS. 17A and 17B, which illustrate outdoor circuitry housing portion cover element 260, FIGS. 25A and 25B, which illustrate electrical circuit board 262, which together define outdoor circuitry assembly 246, which is illustrated in FIGS. 27A-27C and forms part of the vehicle-mountable child protective device of FIGS. 1-15C.

It is appreciated that elements 250 and 260 define an environmentally sealed enclosure for electrical circuit board 262 and that outdoor circuitry housing portion element 250 of outdoor circuitry assembly 246 includes a resilient portion 450, which overlies microswitch 264 on electrical circuit board 262 and enables actuation of microswitch 264 by protrusion 414 of flag base 132. Such actuation occurs only when the flag portion 131 is raised and protrusion 414 engages resilient portion 450, pushing it downwards, in the sense of FIGS. 27A-27C, into engagement with microswitch 264. Accordingly, microswitch 264 provides an output indication of the flag portion 131 being in a raised position.

Element 250 also defines a recess 452 and a recess 454.

Reference is now made to FIGS. 18A & 18B, which are simplified pictorial illustrations, taken in mutually different directions, of cable cover element 270, forming part of the vehicle-mountable child protective device of FIGS. 1-17B. It is appreciated that cable cover element 270 provides mechanical protection for electrical cables which interconnect the solar electricity generating panel 280 with electrical circuit board 262.

Figure 19A:
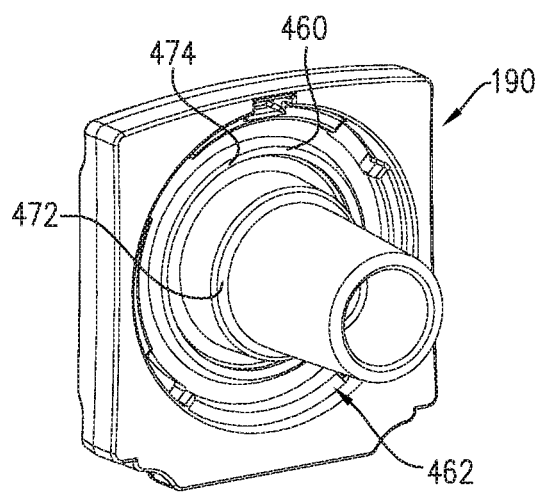
FIGS. 19A, 19B. 19C, 19D and 19E are respective simplified pictorial and planar illustrations, taken in mutually different directions, and a sectional illustration of a third flag engagement element forming part of the vehicle-mountable child protective device of FIGS. 1-18B.
Figure 19B:
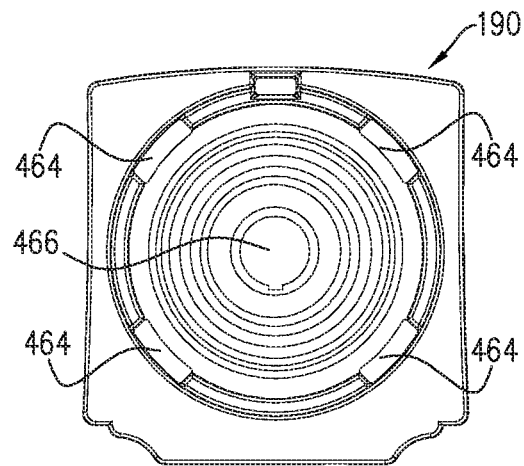
Figure 19C:
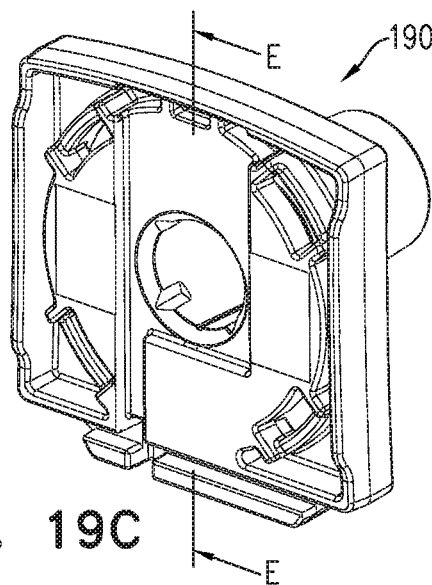
FIG. 19E being taken along lines E-E in FIG. 19C.
Figure 19D:
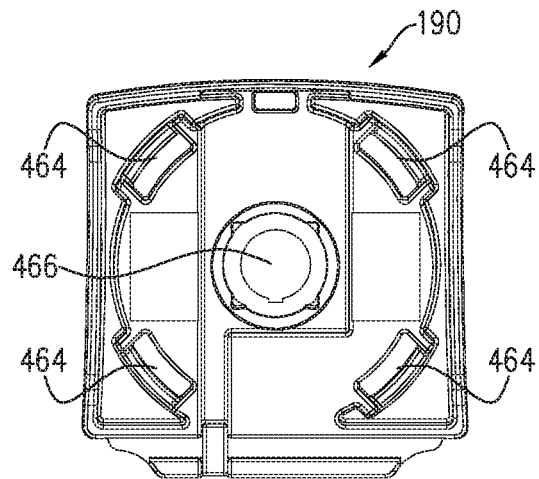
Figure 19E:
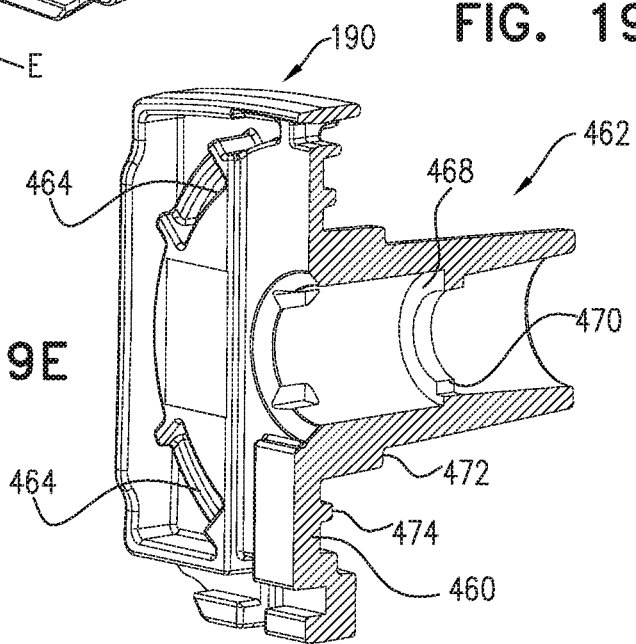

Reference is now made to FIGS. 19A, 19B. 19C. 19D and 19E, which are respective simplified pictorial and planar illustrations, taken in mutually different directions, and a sectional illustration of third flag engagement element 190 forming part of the vehicle-mountable child protective device of FIGS. 1-18B.

As seen in FIGS. 19A-19E, the third flag engagement element 190 is a generally circularly symmetric element including a base portion 460 onto which is mounted a stepped generally cylindrical portion 462. Base portion 460 includes a plurality of equally azimuthally spaced apertures 464, which are configured to receive protrusions 446 of first flag engagement element 170, such that spring 180 is retained between base portion 460 and first flag engagement element 170 about generally cylindrical portion 462 and urges first flag engagement element 170 axially along axis 134 away from base portion 460.

Cylindrical portion 462 is formed with a central bore 466 and a radially inwardly extending flange 468, which retains washer 298 and thus retains flag positioning element 150 against disengagement from the third flag engagement element 190. Rotation of flag positioning element 150 about axis 134 relative to third flag engagement element 190 is prevented by engagement of protrusion 339 of flag positioning element 150 with a cut out 470 formed in flange 468, which permits relative axial displacement between flag positioning element 150 along axis 134 relative to third flag engagement element 190.

Stepped generally cylindrical portion 462 defines a shoulder 472 along an outer surface thereof, which defines a spring seat for spring 292. Base portion 460 defines a circular protrusion 474, which defines a spring seat for spring 180.

Figure 20D:
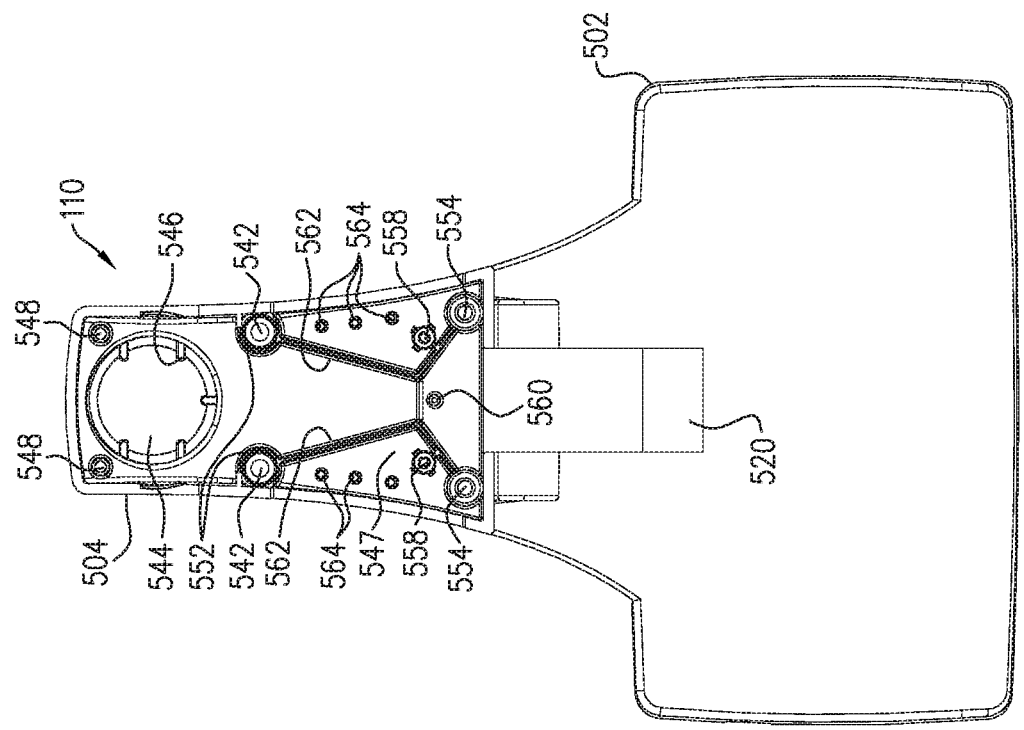
Figure 20C:
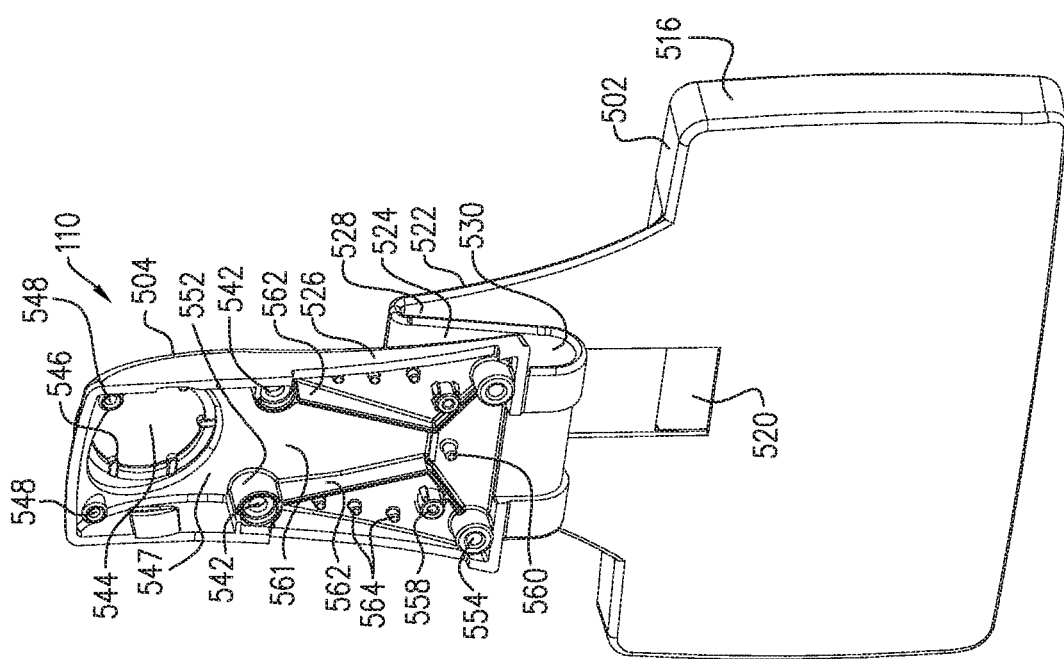
Figure 20F:
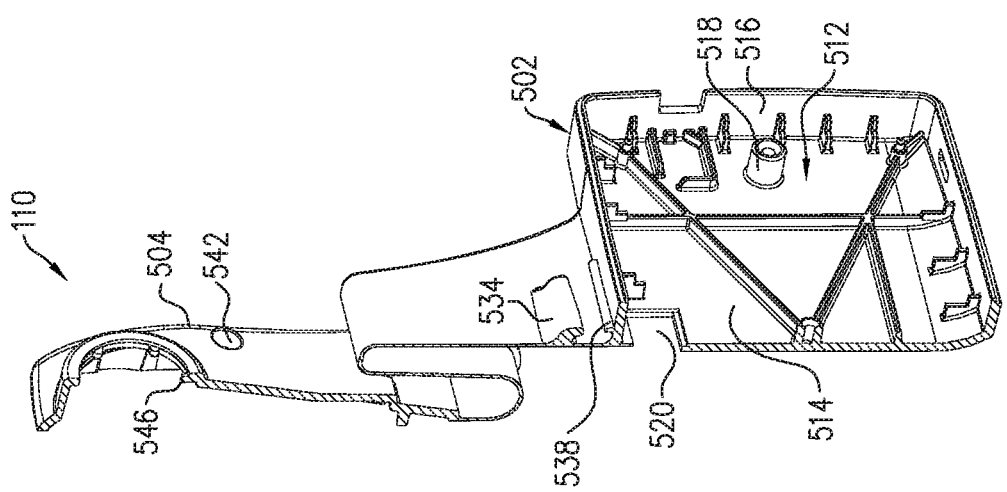
FIGS. 20E and 20F are simplified respective planar sectional and pictorial sectional illustrations of the first housing element of FIGS. 20A-20D, both taken along section lines F-F in FIG. 20A.
Figure 20E:
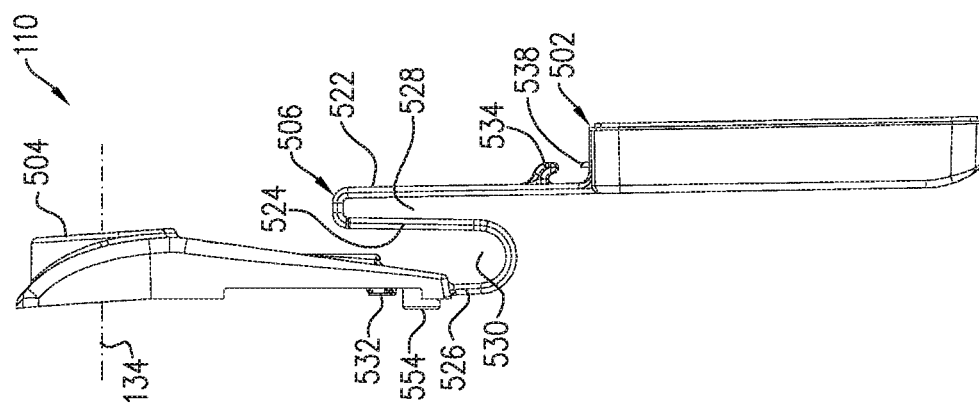

Reference is now made to FIGS. 20A, 20B, 20C and 20D, which are simplified pictorial and planar illustrations, taken in mutually different directions, of first housing element 110 forming part of the vehicle-mountable child protective device of FIGS. 1-19E, and to FIGS. 20E and 20F, which are simplified respective planar sectional and pictorial sectional illustrations of the first housing element of FIGS. 20A-20D, both taken along section lines F-F in FIG. 20A.

As seen in FIGS. 20A-20F, first housing element 110 is preferably an integrally formed injection-molded plastic element, which includes an inside vehicle portion 502 and an outside vehicle portion 504 joined by a vehicle engagement portion 506.

Inside vehicle portion 502 preferably includes a generally rectangular open box portion 512, arrange to accommodate electrical circuit board 240, including a generally planar interior-facing surface 514, surrounded by a peripheral wall 516, extending generally perpendicular thereto. A pair of screw bosses 518 are provided for receiving screws (not shown) which mount first housing element cover element 220 onto inside vehicle portion 502. Inside vehicle portion 502 is formed with an aperture 520 to accommodate passage therethrough of the flexible conductor assembly (FIGS. 14A-14C) including flexible conductor cable 244, which interconnects electrical circuit board 240 with electrical circuit board 262.

Vehicle engagement portion 506 extends upwardly and outwardly of a top portion of peripheral wall 516 and comprises three mutually folded over portions 522, 524 and 526. Portions 522 and 524 define therebetween a vehicle window edge receiving recess 528. Portions 524 and 526 define therebetween a vehicle door receiving recess 530. Formed on an interior facing surface 532 of portion 522 is an elongate undercut hook 534 for removably retaining an end of flexible retaining element 200, when the device 100 is mounted on a vehicle door, with the vehicle window closed, as illustrated in FIG. 33D. Formed on an upper-facing surface 536 of peripheral wall 516 is an elongate protrusion 538, which cooperates with hook 534 for retaining flexible retaining element 200 thereat.

It is appreciated that vehicle engagement portion 506 provides bendability and flexibility to the first housing element 110 to accommodate mutual displacement of inside vehicle portion 502 and outside vehicle portion 504 when the vehicle door is opened and closed.

Outside vehicle portion 504 extends upwardly from portion 526 and defines a generally rectangular interior-facing surface 540 having a pair of apertures 542 for accommodating screws (not shown) which attach first housing element 110 to second housing element 120. Surface 540 also defines a generally circular aperture 544 having a plurality, typically five, of non-uniformly azimuthally distributed protrusions 546 extending radially inwardly thereof for slidably engaging flag positioning element 150 at elongate recesses 346 thereof but not permitting rotational movement thereof about axis 134.

On an interior surface 547 of outside vehicle portion 504, opposite to surface 540, there are formed a pair of press fit bosses 548 for receiving corresponding protrusions 424 of environmental sealing element 210 (FIGS. 13A & 13B). Also formed on interior surface 547 of outside vehicle portion 504 are a pair of screw bosses 552, which correspond to apertures 542 and a pair of screw bosses 554, which receive screws (not shown) which also attach first housing element 110 to second housing element 120.

Additionally formed on interior surface 547 of outside vehicle portion 504 are a pair of screw bosses 558, which are configured to receive a pair of screws (not shown) which mount outdoor circuitry assembly 246 (FIGS. 27A-27C) onto first housing portion 110. A pin 560 is also formed on interior surface 547 and defines a spring seat for one end of spring 142, the other end of which is mounted onto protrusion 414 of flag base 132 (FIG. 12A). Pin 560 also is seated in recess 452 formed on element 250 for securely seating of outdoor circuitry assembly 246 onto first housing element 110, thereby to define therebetween a spring displacement region 561 therebetween which is delimited by outwardly facing mutually angled adjacent ribs 562 and by recess 454 of outdoor circuitry assembly 246.

A plurality of mounting protrusions 564 are defined alongside ribs 562 and outwardly of the spring displacement region 561. Protrusions 564 preferably engage corresponding apertures in flexible retaining element 200 for mounting of flexible retaining element 200 onto the first housing element 110.

Figure 21A:
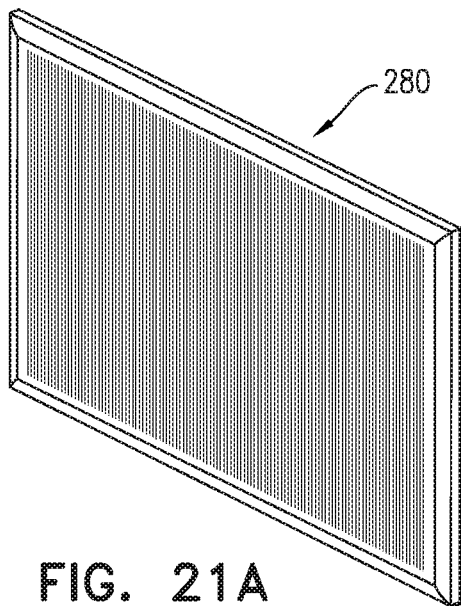
FIGS. 21A and 21B are simplified pictorial illustrations, taken in mutually different directions, of a solar electricity generating panel forming part of the vehicle-mountable child protective device of FIGS. 1-20C.
Figure 21B:
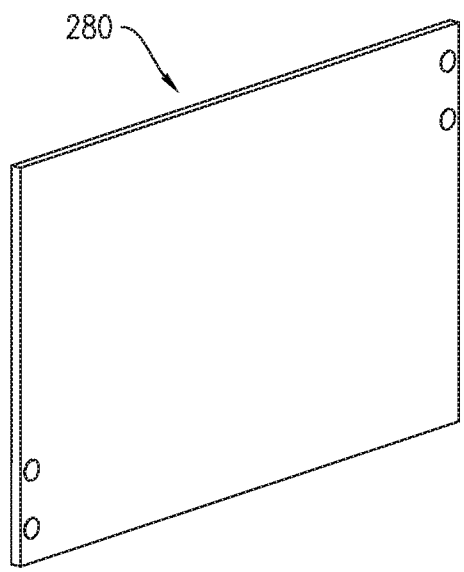

Reference is now made to FIGS. 21A and 21B, which are simplified pictorial illustrations, taken in mutually different directions, of solar electricity generating panel 280, forming part of the vehicle-mountable child protective device of FIGS. 1-20C. Solar electricity generating panel 280 may be any suitable solar electricity generating panel.

Figure 22A:
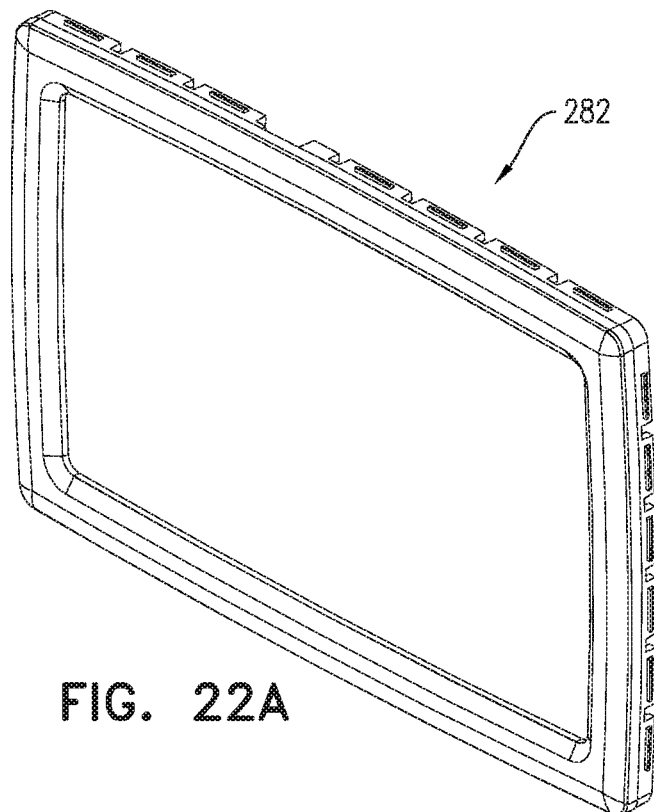
FIGS. 22A and 22B are simplified pictorial illustrations, taken in mutually different directions, of a solar panel engagement element forming part of the vehicle-mountable child protective device of FIGS. 1-21B.
Figure 22B:
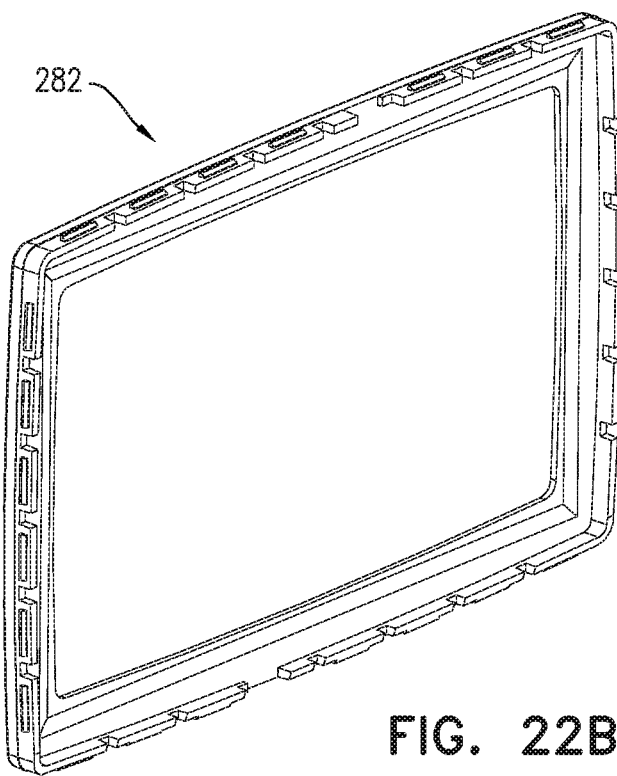

Reference is now made to FIGS. 22A and 22B, which are simplified pictorial illustrations, taken in mutually different directions, of solar panel engagement element 282, which retains solar electricity generating panel 280 onto second housing element 120.

Reference is now made to FIGS. 23A, 23B, 23C, 23D and 23E, which are respective simplified pictorial and planar illustrations, taken in mutually different directions, and a sectional illustration of second housing element 120, forming part of the vehicle-mountable child protective device of FIGS. 1-19C.

As seen in FIGS. 23A-23E, the second housing element 120 comprises a lower portion 602, a flexible intermediate portion 604 and an upper portion 606. Lower portion 602 defines a recess 612 for receiving solar electricity generating panel 280 (FIGS. 21A & 21B), which is snap-fit retained in recess 612 by solar panel engagement element 282 (FIGS. 22A & 22B).

Figure 23A:
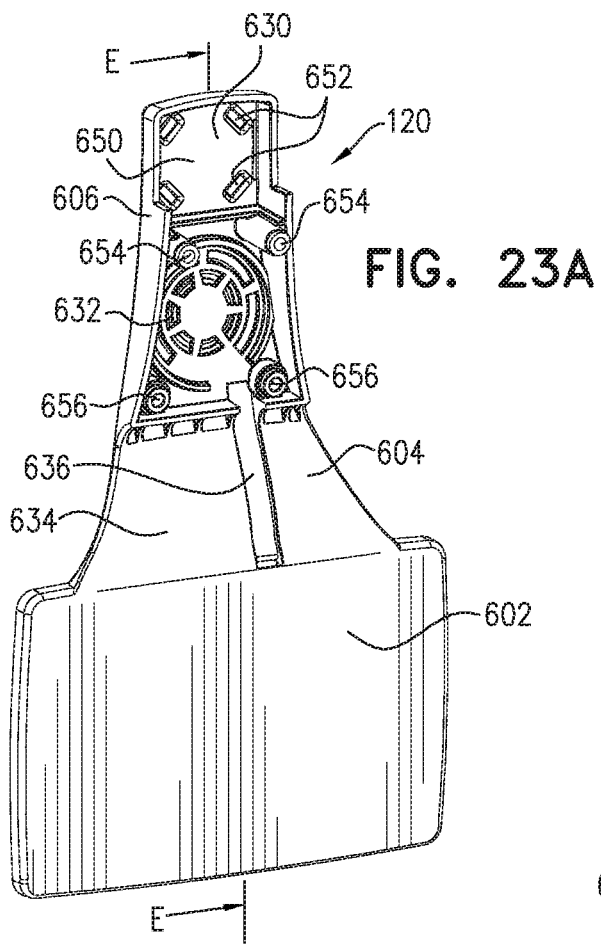
Figure 23B:
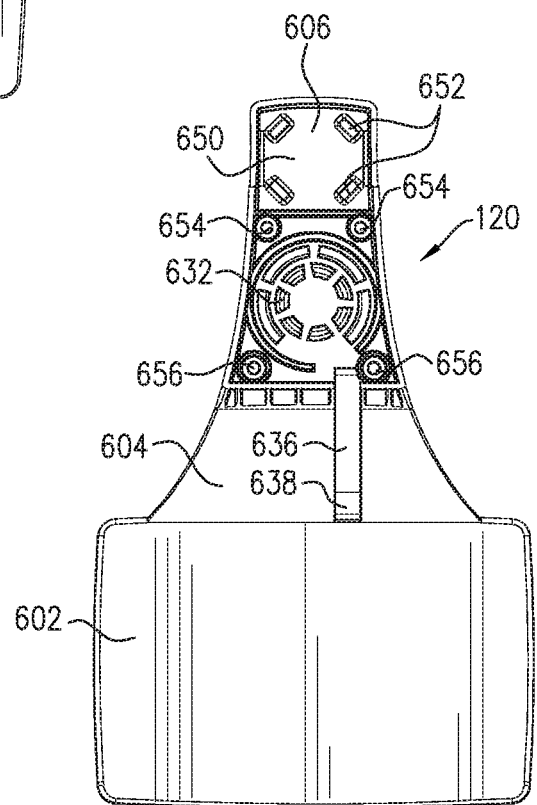
Figure 24:
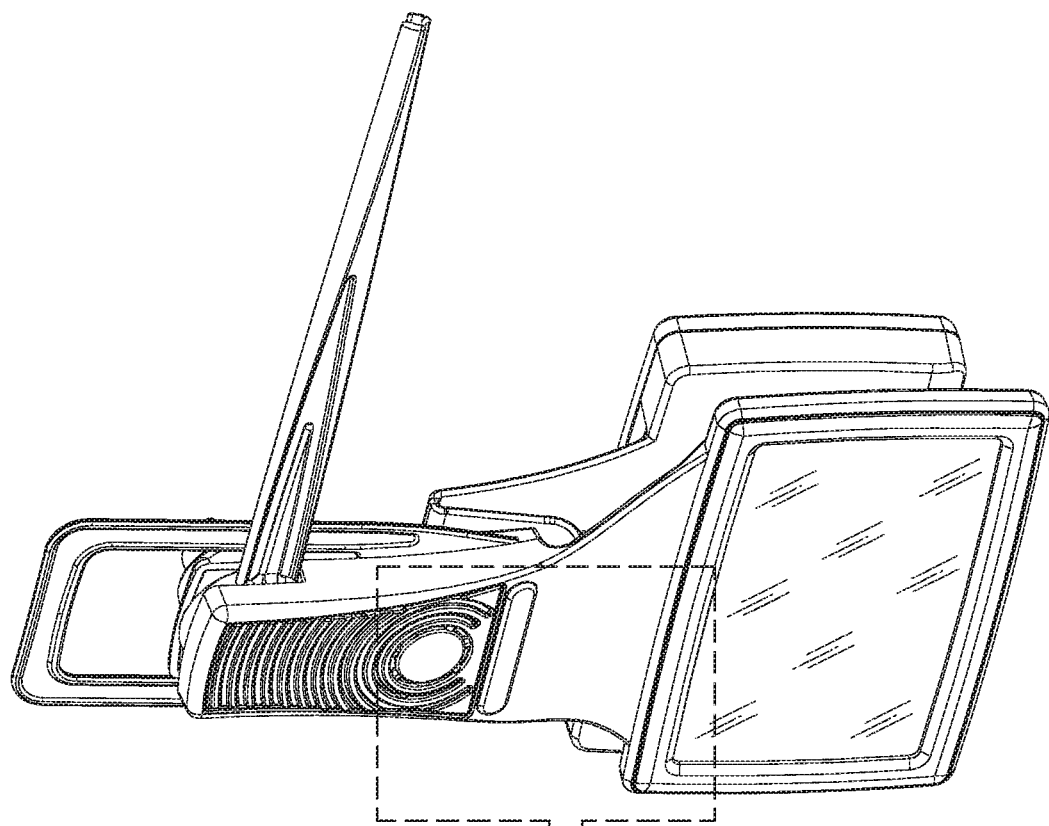
FIG. 24 is a simplified, partially cut-away illustration of the vehicle-mountable child protective device of FIGS. 1-23D illustrating a cable connection to the solar electricity generating panel of FIGS. 21A & 21B.
Figure 24:
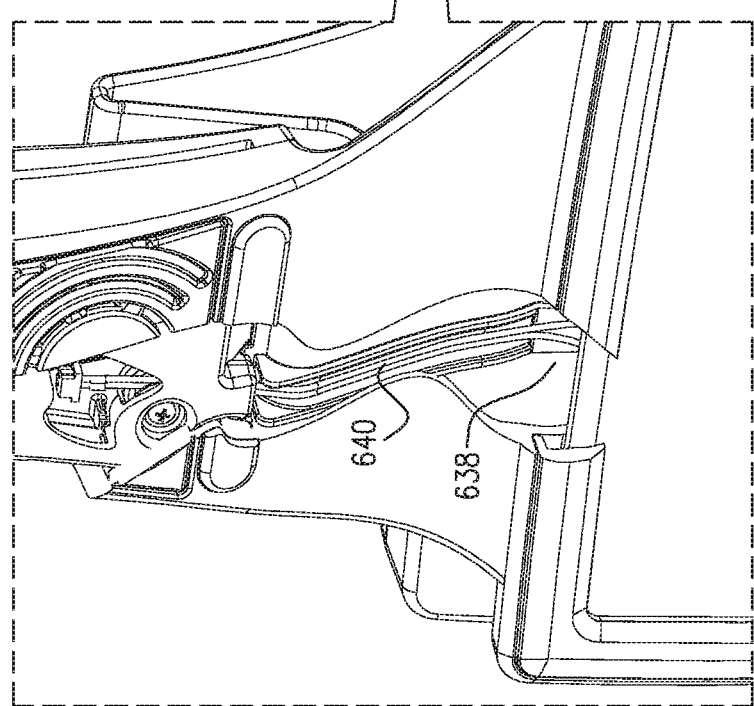

Upper portion 606 defines an outer-facing surface 620 having an apertured grill portion 622 for permitting sound from buzzer 284 (FIGS. 5A & 5B) to emanate therethough. Referring particularly to FIGS. 23A & 23B and additionally to FIG. 24, it is seen that an inner-facing surface 630 of upper portion 606 defines a socket 632, opposite grill portion 622, for accommodating buzzer 284 and that an inner-facing surface 634 of flexible intermediate portion 604 defines a narrow recess 636 and an aperture 638 for accommodating an electrical cable 640 (FIG. 5B) connecting buzzer 284 to electrical circuit board 262. Cable cover element 270, which is described hereinabove with reference to FIGS. 18A & 18B, is seated in recess 636 over cable 640 and protects cable 640 against the environment.

Disposed above socket 632 on inner-facing surface 630 of upper portion 606 is a socket 650 for retaining third flag engagement element 190 and electrical circuit board 288 (FIGS. 26A & 26B). Socket 650 is formed with a plurality of, preferably four, recesses 652 for accommodating mutually evenly azimuthally spaced protrusions 446 of first flag engagement element 170 (FIGS. 15A-15C).

Inner-facing surface 630 is additionally formed with a pair of screw bosses 654, which correspond to screw bosses 552, and a pair of screw bosses 656, which correspond to screw bosses 554 of first housing element 110 (FIGS. 20A-20E)

Reference is now made to FIGS. 25A and 25B, which are simplified respective first and second pictorial illustrations, taken in mutually different directions, of printed circuit board 262 forming part of outdoor circuitry assembly 246, as seen in FIGS. 27A-27C.

Reference is now made to FIGS. 26A and 26B, which are simplified respective first and second pictorial illustrations, taken in mutually different directions, of printed circuit board 288, onto which is mounted microswitch 290, both of which are mounted onto socket 650 in the second housing portion 120.

Figure 28C:
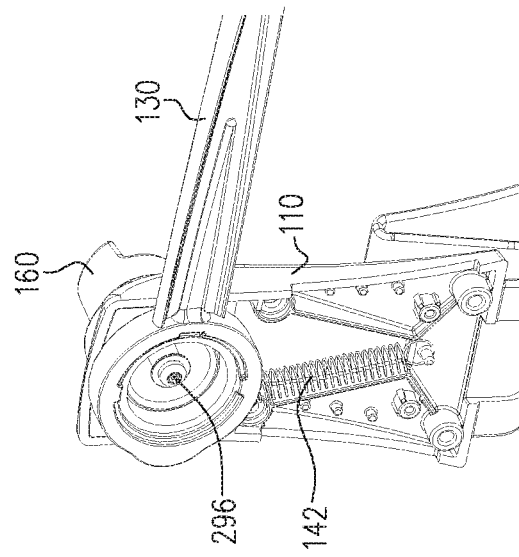
FIGS. 28A, 28B and 28C are simplified illustrations of the flag positioning assembly forming part of the vehicle-mountable child protective device of FIGS. 1-27C in three alternative flag positions.
Figure 28B:
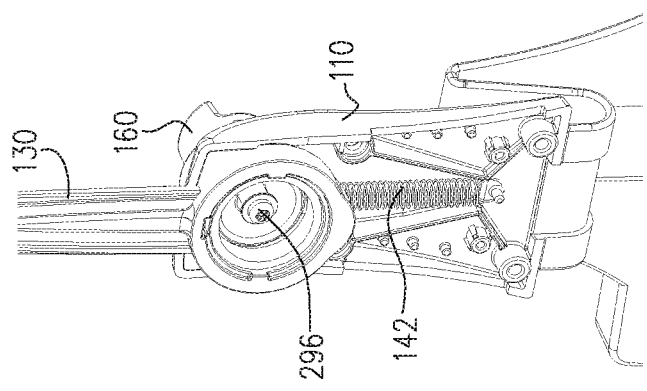
Figure 28A:
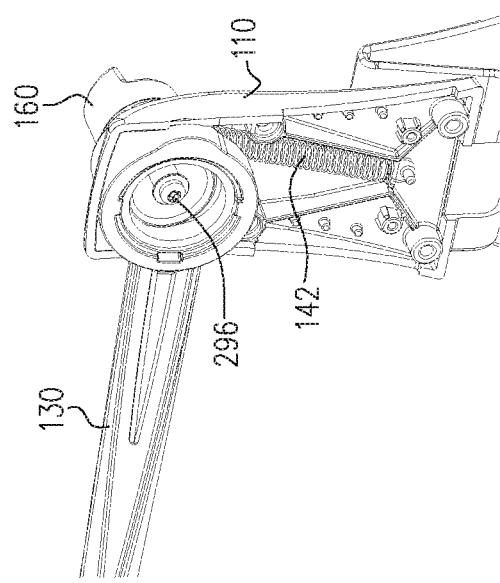

Reference is now made to FIGS. 28A, 28B and 28C, which are simplified illustrations of the flag positioning assembly forming part of the vehicle-mountable child protective device of FIGS. 1-27C in three alternative flag positions. As seen in FIGS. 28A-28C, the flag element 130 has two inactivated lowered positions, seen in FIGS. 28A and 28C, and one activated raised position, seen in FIG. 28B. It is appreciated that spring 142 is a tension spring that normally urges the flag element 130 to the raised position shown in FIG. 28B unless it is locked by one of two locking mechanisms described herein in one of the inactivated lowered positions shown in FIGS. 28A and 28C. It is further appreciated that the flag element 130 can only be lowered from the raised activated position shown in FIG. 28B by rotation about axis 134 by manual action of a user and only when not locked in the raised position.

Figure 29B:
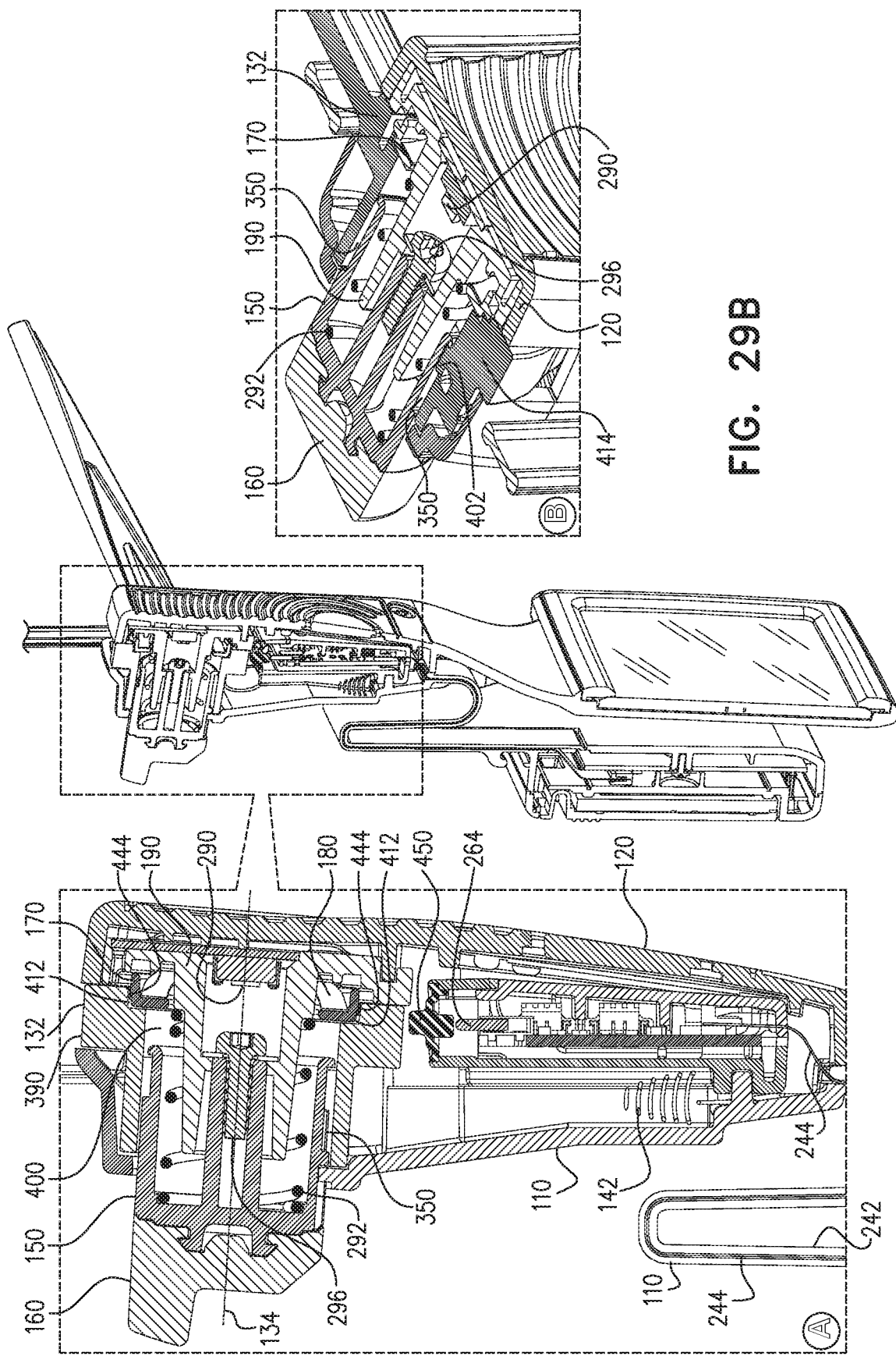

Reference is now made to FIGS. 29A and 29B, which are respective simplified pictorial and sectional illustrations of part of the vehicle-mountable child protective device of FIGS. 1-28C in a first operative orientation, FIG. 29B being taken along lines B-B in FIG. 29A.

It is seen that in the operative orientation of FIGS. 29A and 29B, the vehicle-mountable child protective device of FIGS. 1-28C is in an unmounted orientation or in a flag lowered, door-opened orientation. Accordingly, flag positioning element 150 and flag positioning vehicle engagement element 160 are spaced from third flag engagement element 190 under the urging of compression spring 292 along axis 134.

In this operative orientation, the flag portion 131 is locked in one of the two inactivated lowered positions shown in FIGS. 28A and 28C. This locking is provided by locking engagement between first flag engagement element 170 and flag base 132, by virtue of engagement between radially inwardly facing protrusions 412 of flag base 132 and recesses 444 formed in first flag engagement element 170 under the urging of second flag engagement element 180 along axis 134 and against the urging of spring 142.

It is also seen that screw 296 is not in contact with microswitch 290, indicating that the device is not mounted on a vehicle door or that the vehicle door is open, and that resilient portion 450 is not engaged by tapered radially outwardly directed protrusion 414 and thus microswitch 264 is not engaged, indicating that flag portion 131 is not in the raised position. In this operative orientation, electronic circuitry of the vehicle-mountable child protective device 100 is not actuated.

Figure 30A:
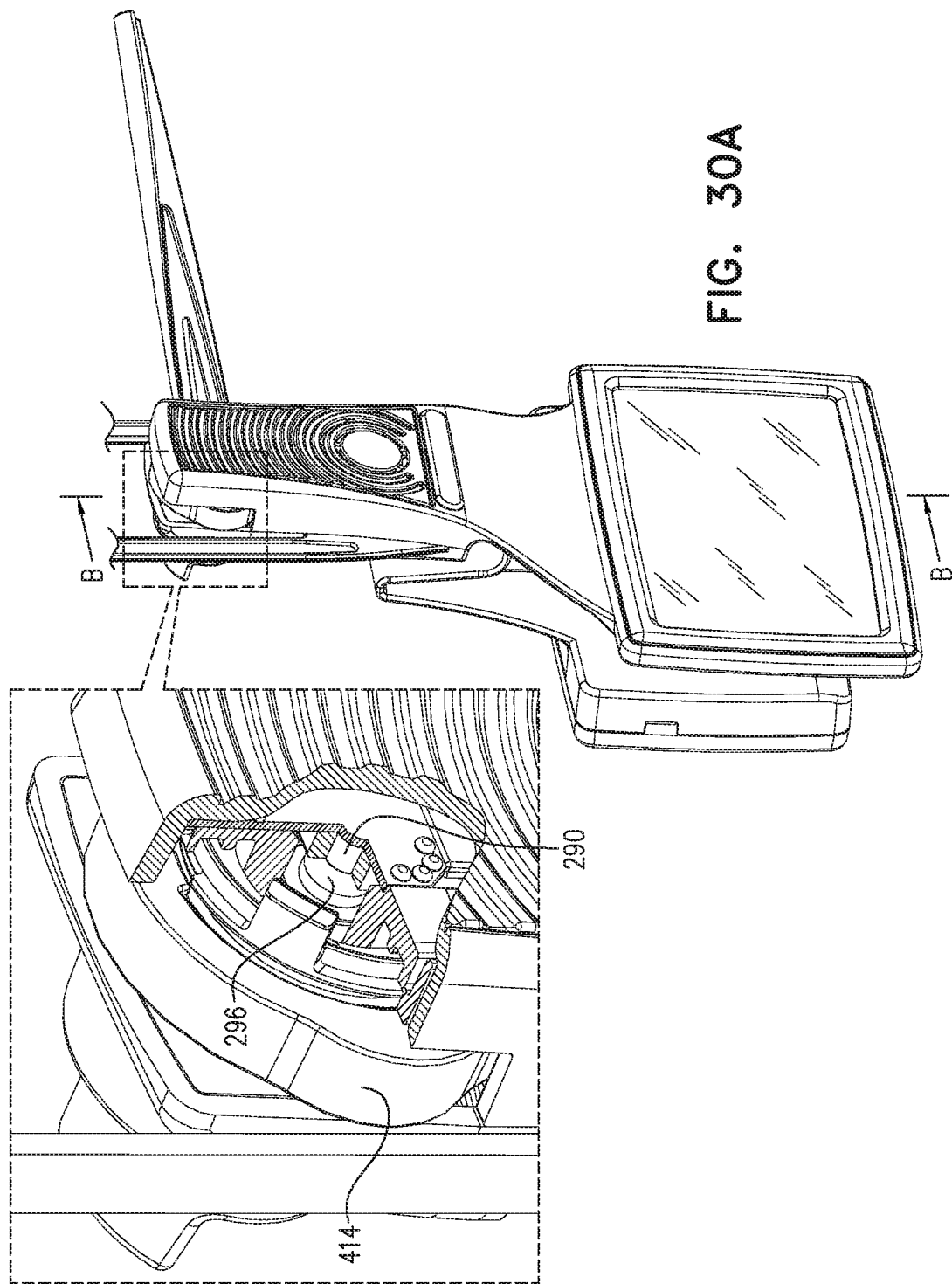

Reference is now made to FIGS. 30A and 30B, which are respective simplified pictorial and sectional illustrations of the vehicle-mountable child protective device of FIGS. 1-28C in a second operative orientation, FIG. 30B being taken along lines B-B in FIG. 30A.

It is seen that in the operative orientation of FIGS. 30A and 30B, the vehicle-mountable child protective device of FIGS. 1-28C is in a mounted and flag lowered, door-closed orientation. Accordingly, flag positioning vehicle engagement element 160 is engaged by a vehicle wall, as seen hereinbelow in FIG. 34B, thereby displacing vehicle engagement element 160 and flag positioning element 150 against the urging of compression spring 292 along axis 134 in a direction indicated by an arrow 700, such that flag positioning element 150 lockingly engages flag base 132 and once this locking has been realized eliminates the previous locking engagement between first flag engagement element 170 and flag base 132. In this operative orientation, the flag portion 131 remains locked in one of the two inactivated lowered positions shown in FIGS. 28A and 28C.

The locking between flag positioning element 150 and flag base 132 is realized by engagement between radially inwardly extending protrusion 402 formed on circular cylindrical inner surface 400 of flag base 132 and recess 350 of outer cylindrical wall 330 of flag positioning element 150, against the urging of second flag engagement element 180.

It is also seen that due to displacement of flag positioning element 150, against the urging of compression spring 292, along axis 134, in the direction indicated by arrow 700, screw 296 is in contact with microswitch 290, indicating that the vehicle door is closed. It is further seen that resilient portion 450 is still not engaged by tapered radially outwardly directed protrusion 414 and thus microswitch 264 is not engaged, indicating that flag portion 131 is not in the raised position. In this operative orientation, electronic circuitry of the vehicle-mountable child protective device 100 is not actuated.

It is appreciated that elimination of the previous locking engagement between first flag engagement element 170 and flag base 132 enables flag base 132 to rotate very slightly about axis 134 under the urging of spring 142, such that protrusions 412 of flag base 132 lie against radially outwardly-extending flange 442 of first flag engagement element 170 and cannot lockingly engage recess 444 thereof.

Figure 31B:
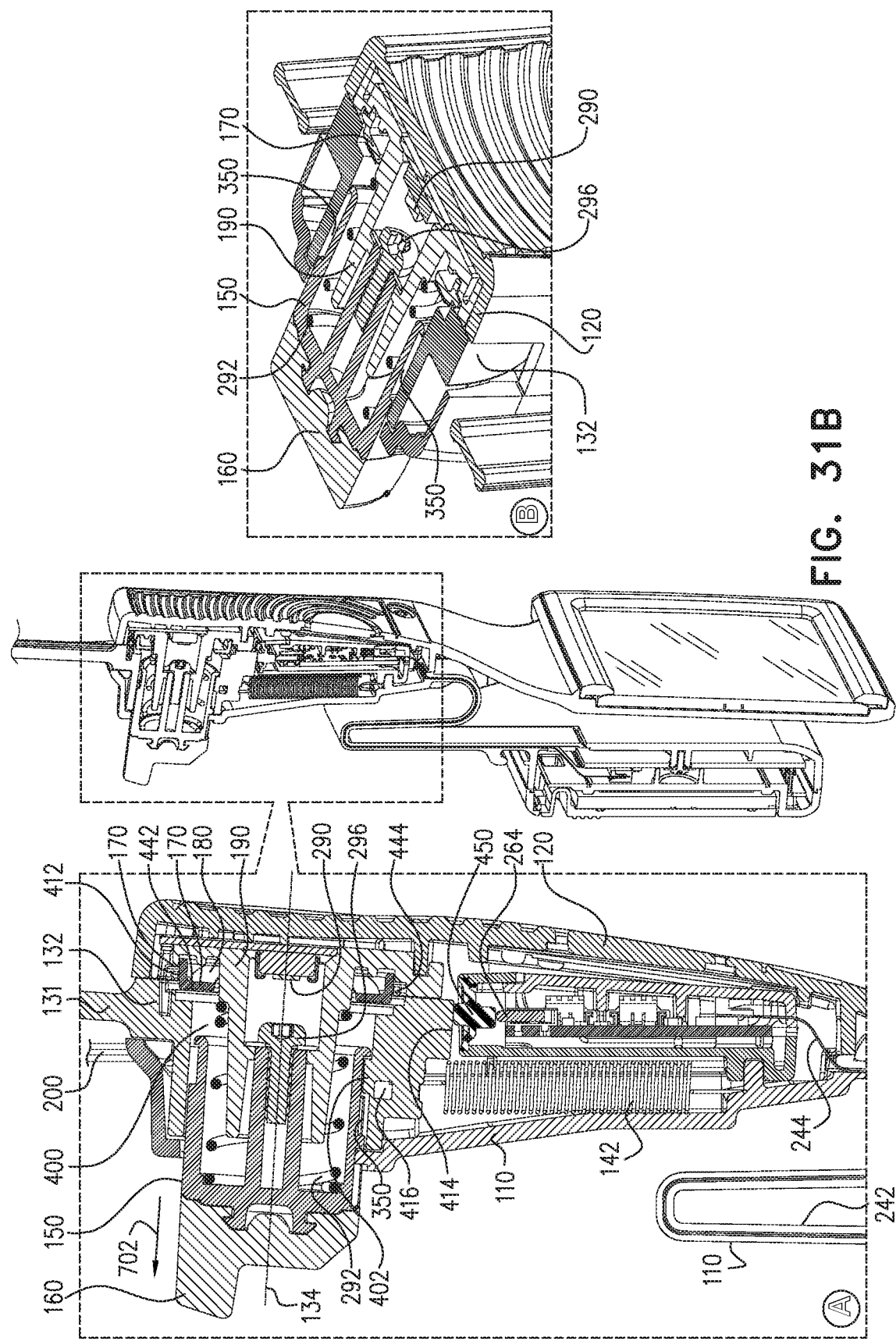

Reference is now made to FIGS. 31A and 31B, which are respective simplified pictorial and sectional illustrations of the vehicle-mountable child protective device of FIGS. 1-28C in a third operative orientation, FIG. 31B being taken along lines B-B in FIG. 31A.

It is seen that in the operative orientation of FIGS. 31A and 31B, the vehicle-mountable child protective device of FIGS. 1-28C is in a mounted and flag raised, door-opened orientation. It is in this operative orientation that it is expected that a child will be placed within the vehicle. Accordingly, flag positioning vehicle engagement element 160 is no longer engaged by a vehicle wall, as seen in FIG. 34C, thereby displacing vehicle engagement element 160 and flag positioning element 150 under the urging of compression spring 292 along axis 134 in a direction indicated by an arrow 702, opposite to the direction indicated by arrow 700, such that flag positioning element 150 no longer lockingly engages flag base 132. This enables flag element 130 to assume the activated raised position, seen in FIG. 28B, under the urging of spring 142.

The unlocking of flag positioning element 150 from flag base 132 is realized by disengagement between radially inwardly extending protrusion 402 formed on circular cylindrical inner surface 400 of flag base 132 and recess 350 of outer cylindrical wall 330 of flag positioning element 150.

It is also seen that due to displacement of flag positioning element 150, under the urging of compression spring 292, along axis 134, in the direction of arrow 702, screw 296 is no longer in contact with microswitch 290, indicating that the vehicle door is open. It is further seen that resilient portion 450 is engaged by tapered radially outwardly directed protrusion 414 due to rotation of the flag element to a raised position and thus microswitch 264 is engaged, indicating that flag portion 131 is in the raised position. In this operative orientation, the electronic circuitry of the vehicle-mountable child protective device 100 is ready to be actuated by closing the vehicle door, whereby screw 296 comes in contact with microswitch 290, as described hereinbelow with reference to FIGS. 32A and 32B. If, however, a child is not placed in the vehicle at this stage, the user may manually lower the flag portion 131 to one of the two lowered positions shown in FIGS. 28A and 28C, thereby deactuating the system by returning the vehicle-mountable child protective device to the operative orientation shown in FIGS. 29A and 29B.

Figure 32A:
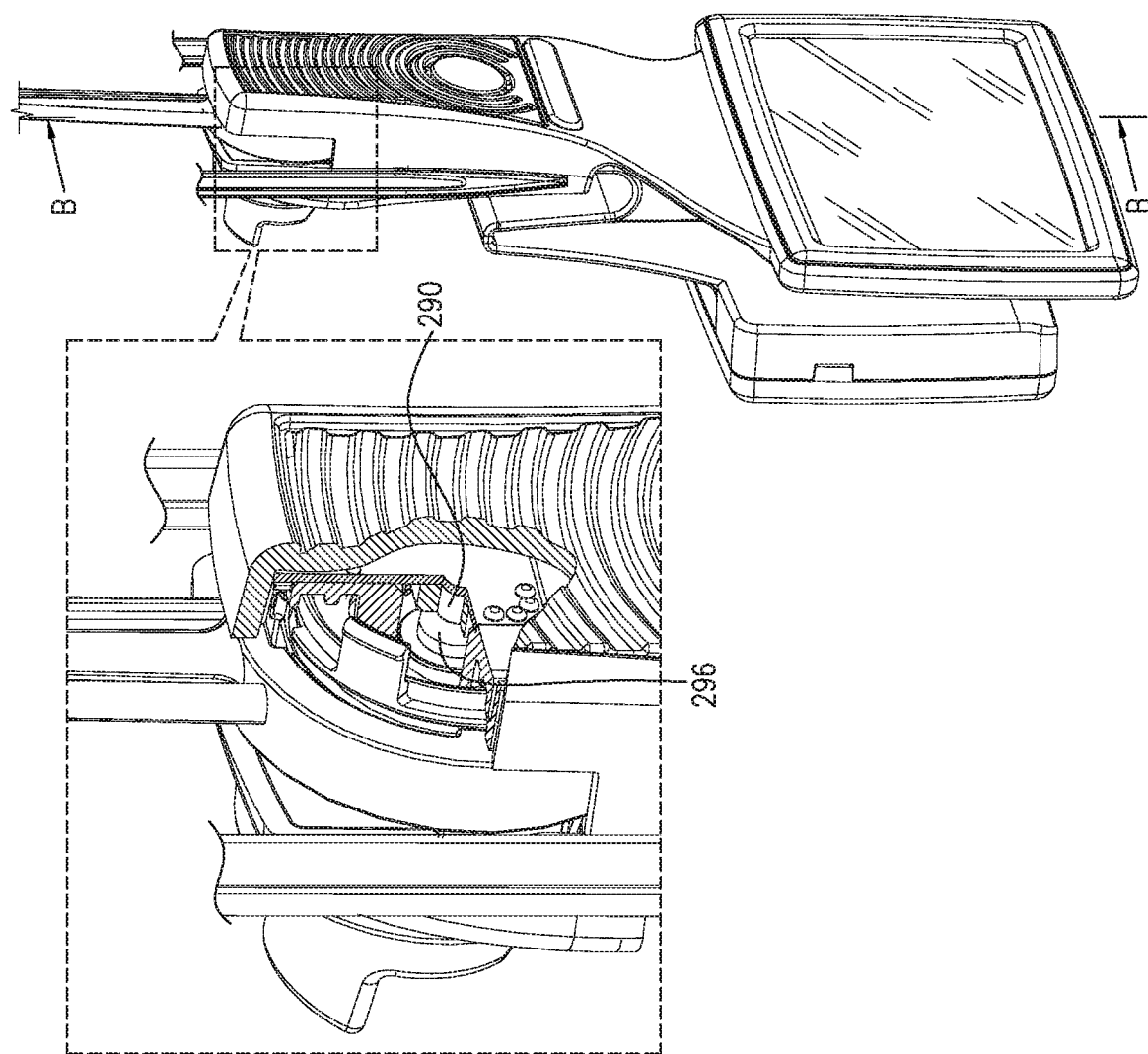
FIGS. 32A and 32B are respective simplified pictorial and sectional illustrations of the vehicle-mountable child protective device of FIGS. 1-28C in a fourth operative orientation, FIG. 32B being taken along lines B-B in FIG. 33A.
Figure 32B:
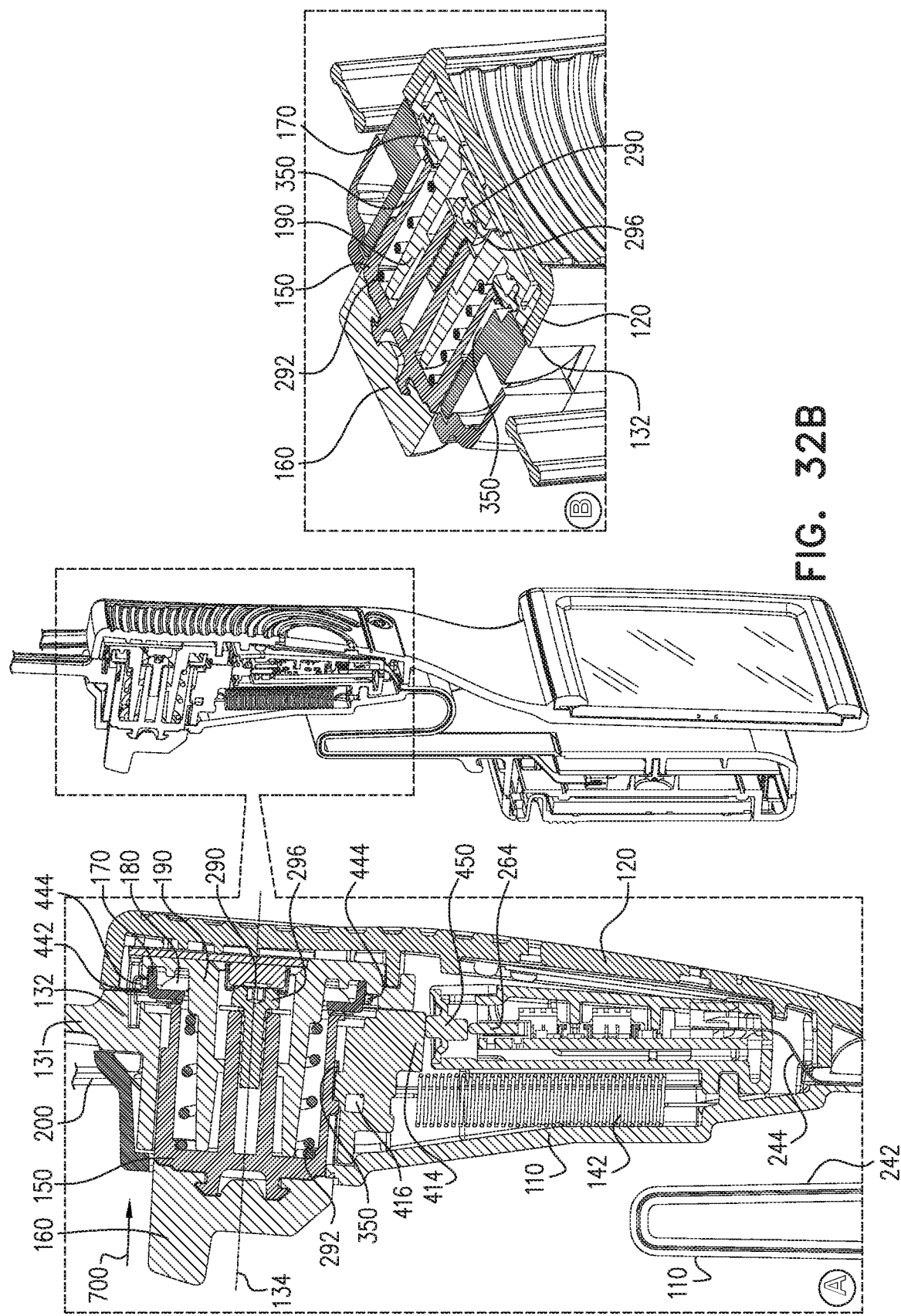

Reference is now made to FIGS. 32A and 32B, which are respective simplified pictorial and sectional illustrations of the vehicle-mountable child protective device of FIGS. 1-28C in a fourth operative orientation, FIG. 32B being taken along lines B-B in FIG. 32A.

It is seen that in the operative orientation of FIGS. 32A and 32B, the vehicle-mountable child protective device of FIGS. 1-28C is in a mounted and flag raised, door-closed orientation. It is expected that in this operative orientation, a child is located within the vehicle. Flag positioning vehicle engagement element 160 is engaged by a vehicle wall, as seen in FIG. 34D, thereby displacing vehicle engagement element 160 and flag positioning element 150 against the urging of compression spring 292 along axis 134 in the direction of arrow 700. Flag portion 131 of flag element 130 is locked in the raised position by locking engagement between radially inwardly extending protrusion 402 formed on circular cylindrical inner surface 400 of flag base 132 and recess 350 of outer cylindrical wall 330 of flag positioning element 150.

It is also seen that due to displacement of flag positioning element 150 against the urging of compression spring 292 along axis 134 in the direction of arrow 700, screw 296 is in contact with microswitch 290, indicating that the vehicle door is closed. It is further seen that resilient portion 450 remains engaged by tapered radially outwardly directed protrusion 414 due to the flag element 130 being in a raised position and thus microswitch 264 is engaged, indicating that flag portion 131 is in the raised position. It is appreciated that in this operative orientation, the electronic circuitry of the vehicle-mountable child protective device 100 is actuated and operative to generate one or more alerts, as necessary, as described hereinbelow with reference to FIGS. 34E & 34F.

Reference is now made to FIGS. 33A, 33B, 33C and 33D, which are simplified pictorial illustrations of mounting of the vehicle-mountable child protective device of FIGS. 1-32B on a vehicle door.

Figure 33A:
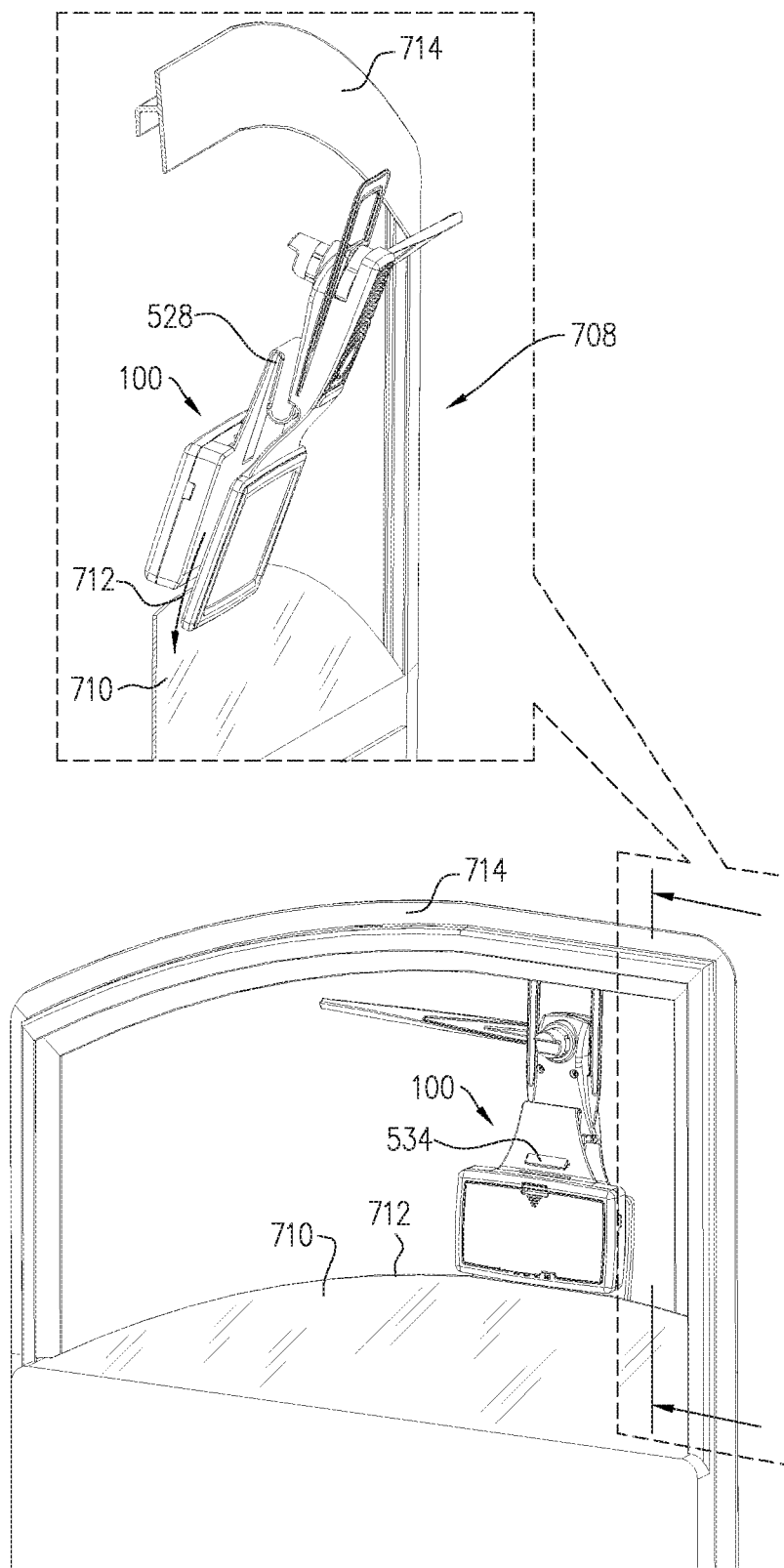
FIGS. 33A, 33B, 33C and 33D are simplified pictorial illustrations of mounting of the vehicle-mountable child protective device of FIGS. 1-28C on a vehicle door.
Figure 33B:
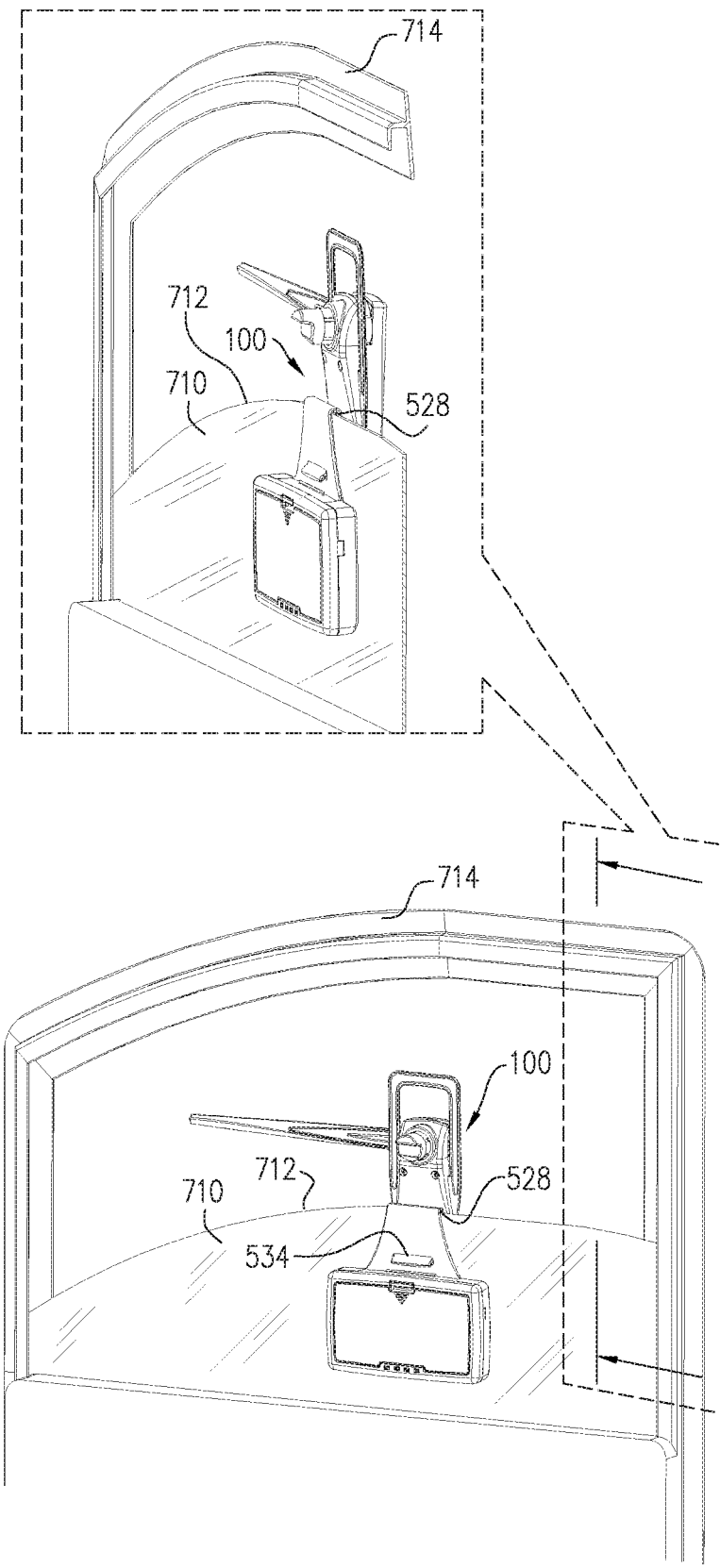

Turning initially to FIGS. 33A and 33B, it is seen that the child protective device 100 of FIGS. 1-32B is mounted onto a vehicle door 708, when the door 708 is open and the window, here indicated by reference numeral 710, is partially lowered. The child protective device 100 is mounted onto the partially lowered window 710 such that a top edge portion 712 of the window 710 is seated in vehicle window edge receiving recess 528 (FIG. 20C) of vehicle engagement portion 506 of first housing element 110.

Figure 33C:
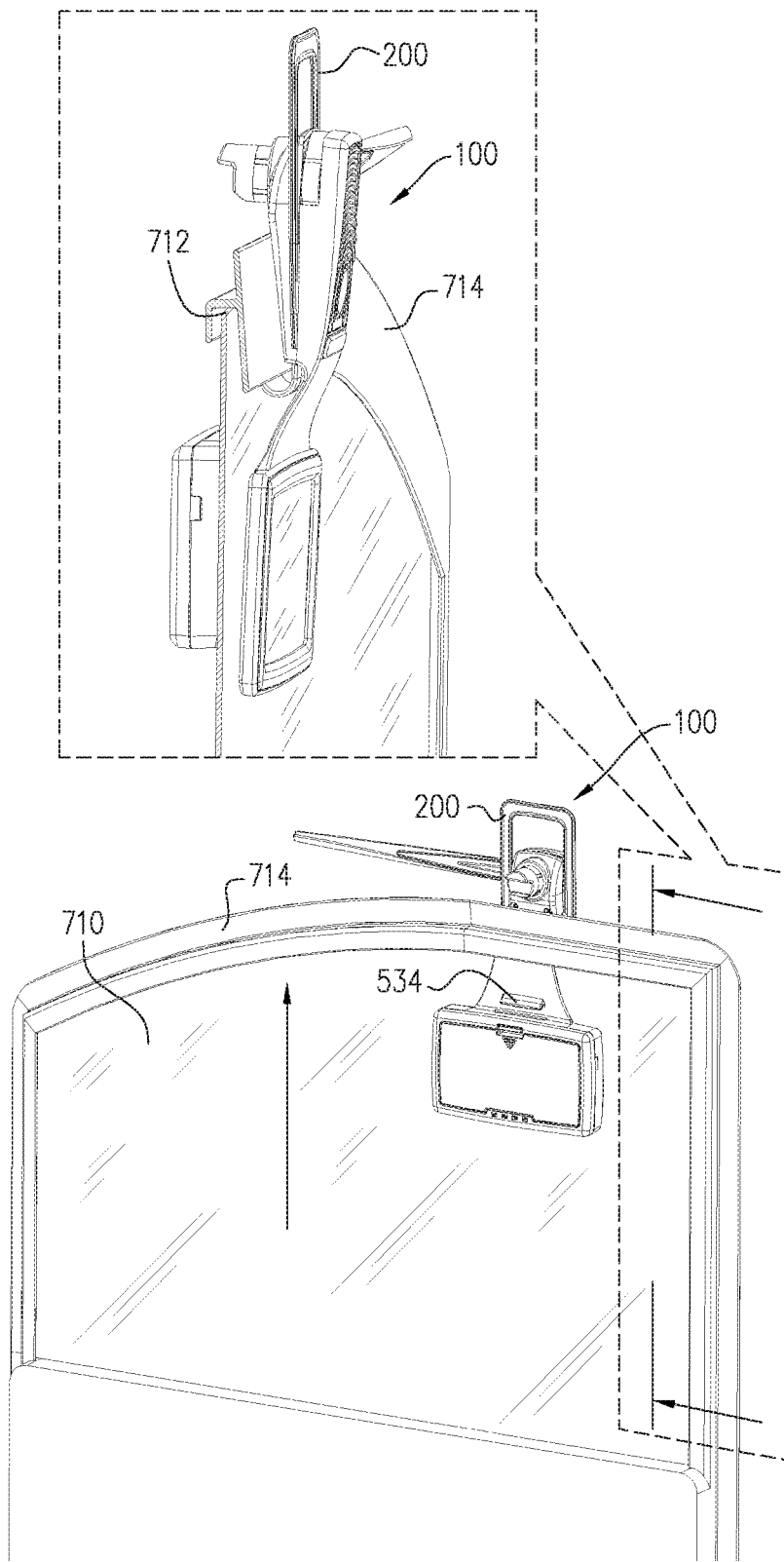
Figure 33D:
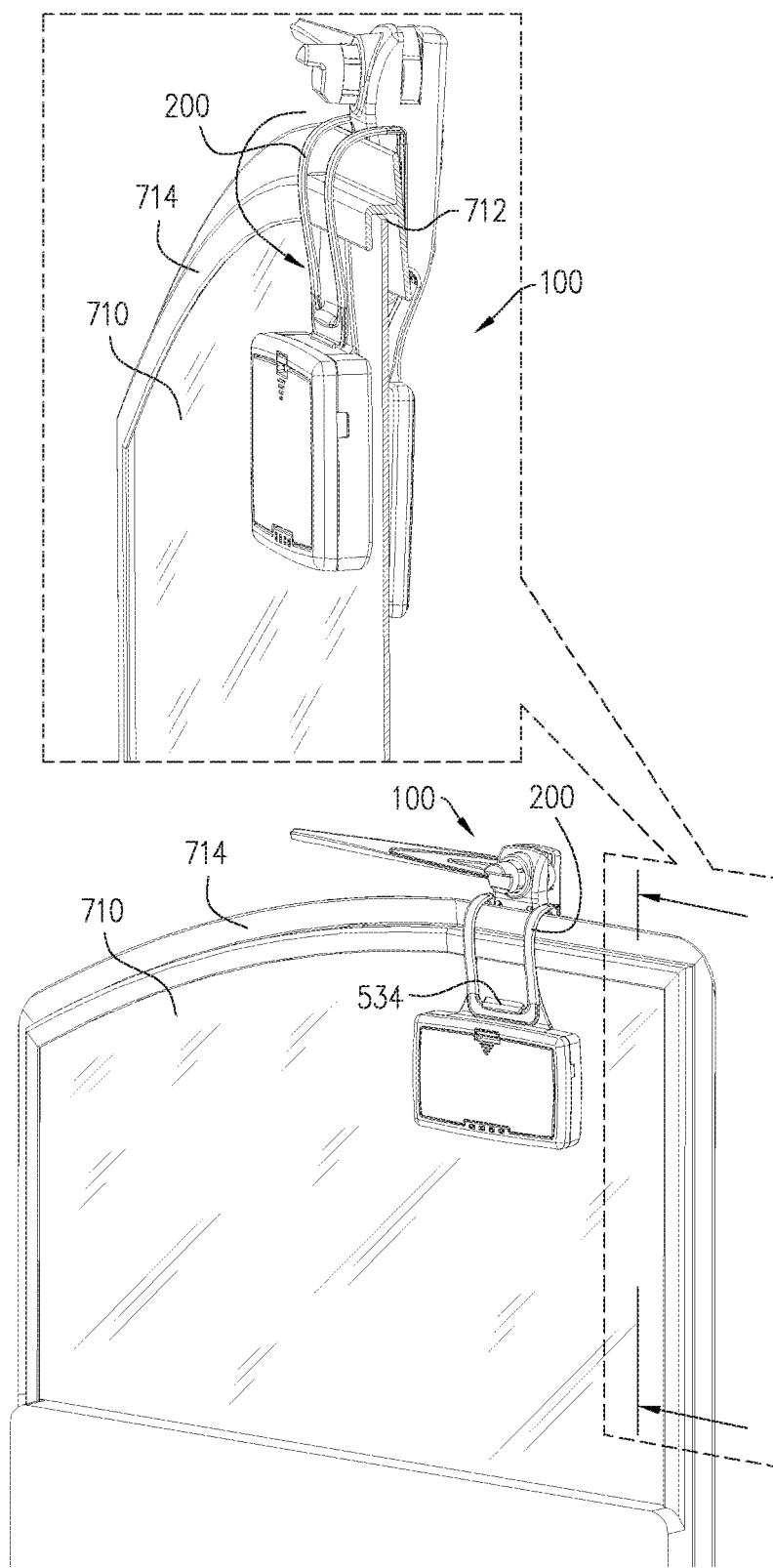

The vehicle window 710 is then fully closed, as seen in FIG. 33C. Thereafter, as seen in FIG. 33C, flexible retaining element 200 is folded over the door frame, here designated by reference numeral 714, and retained by engagement with undercut hook 534, as seen in FIG. 33D.

Figure 34A:
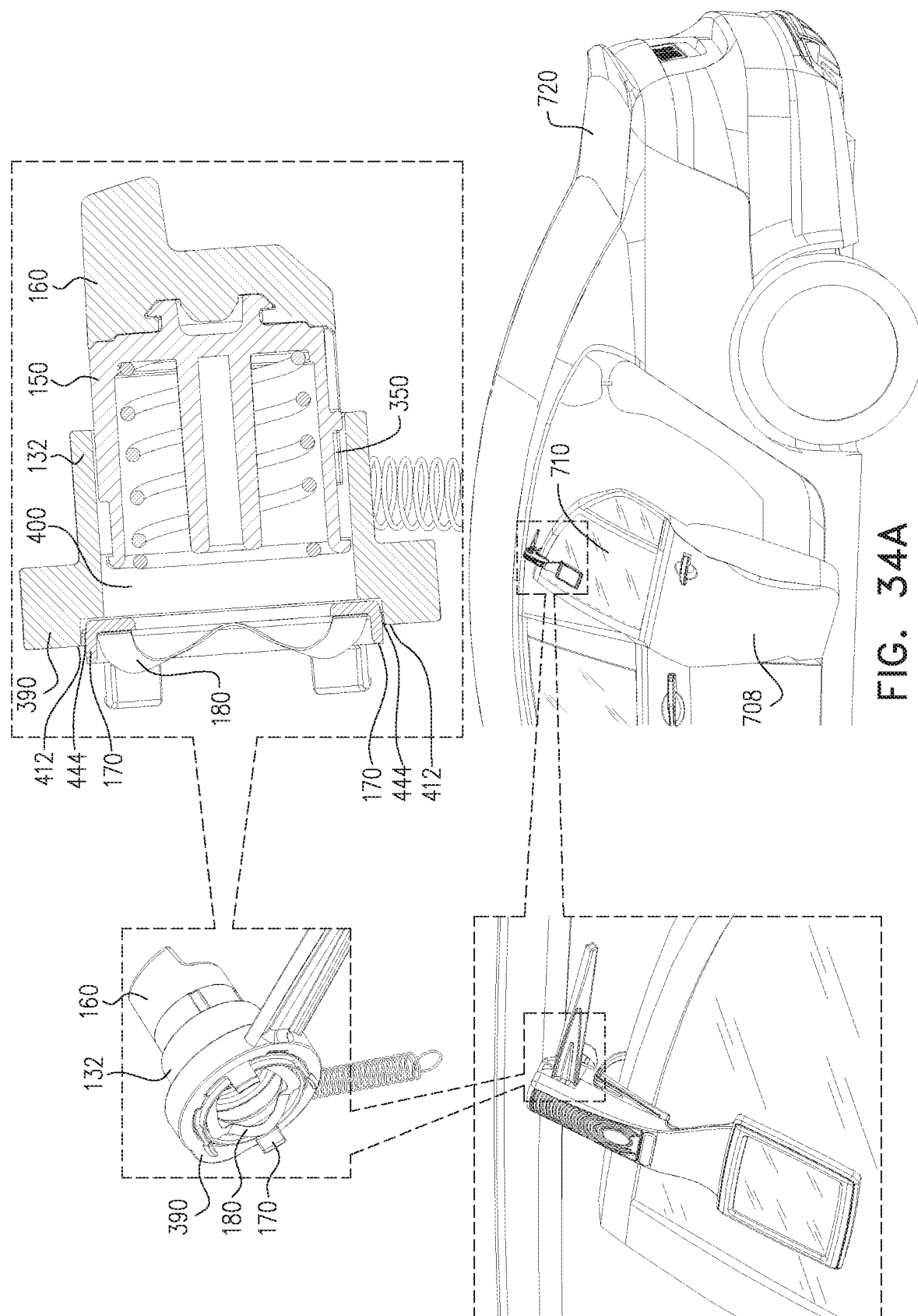
Figure 34B:
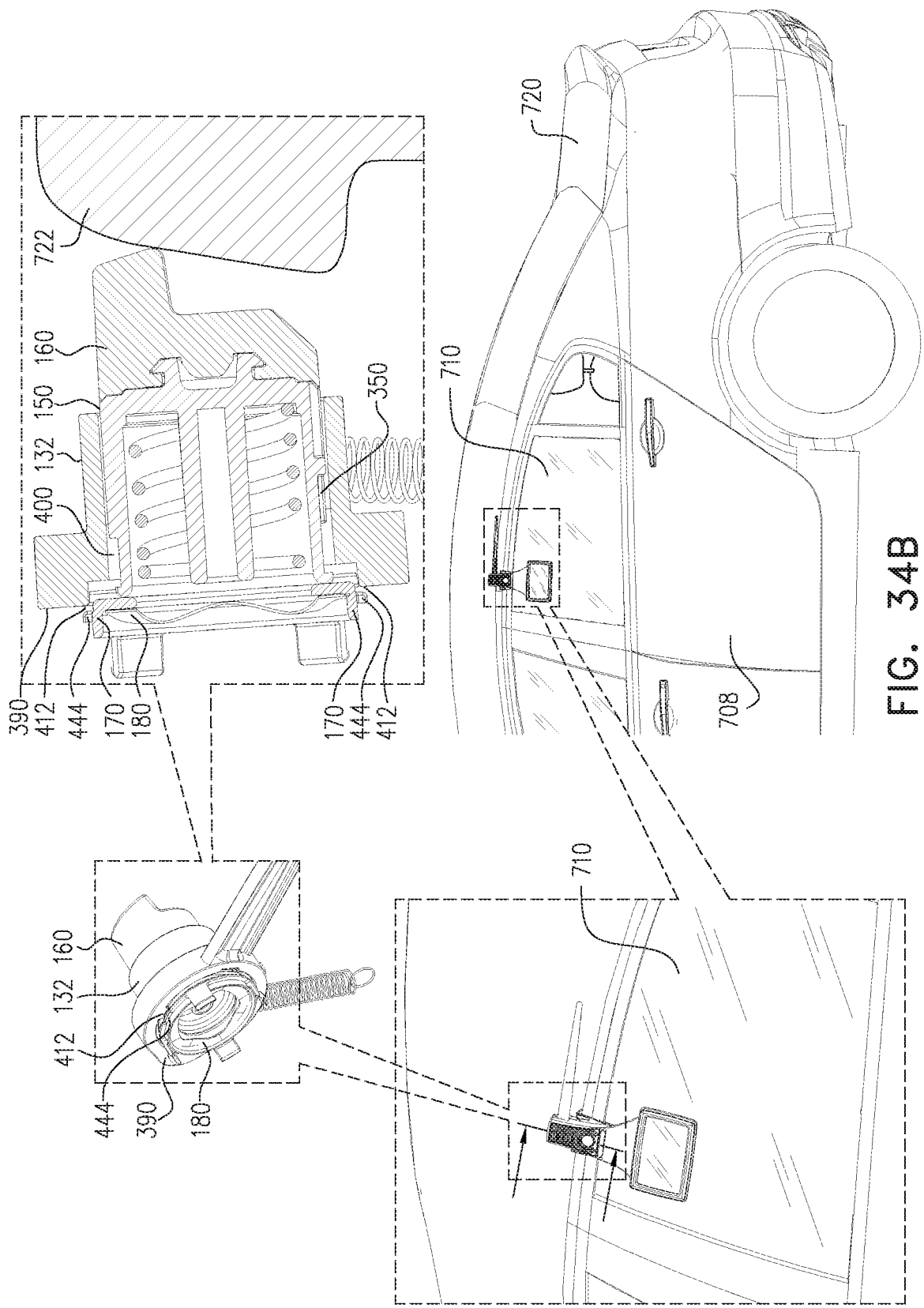
Figure 34C:
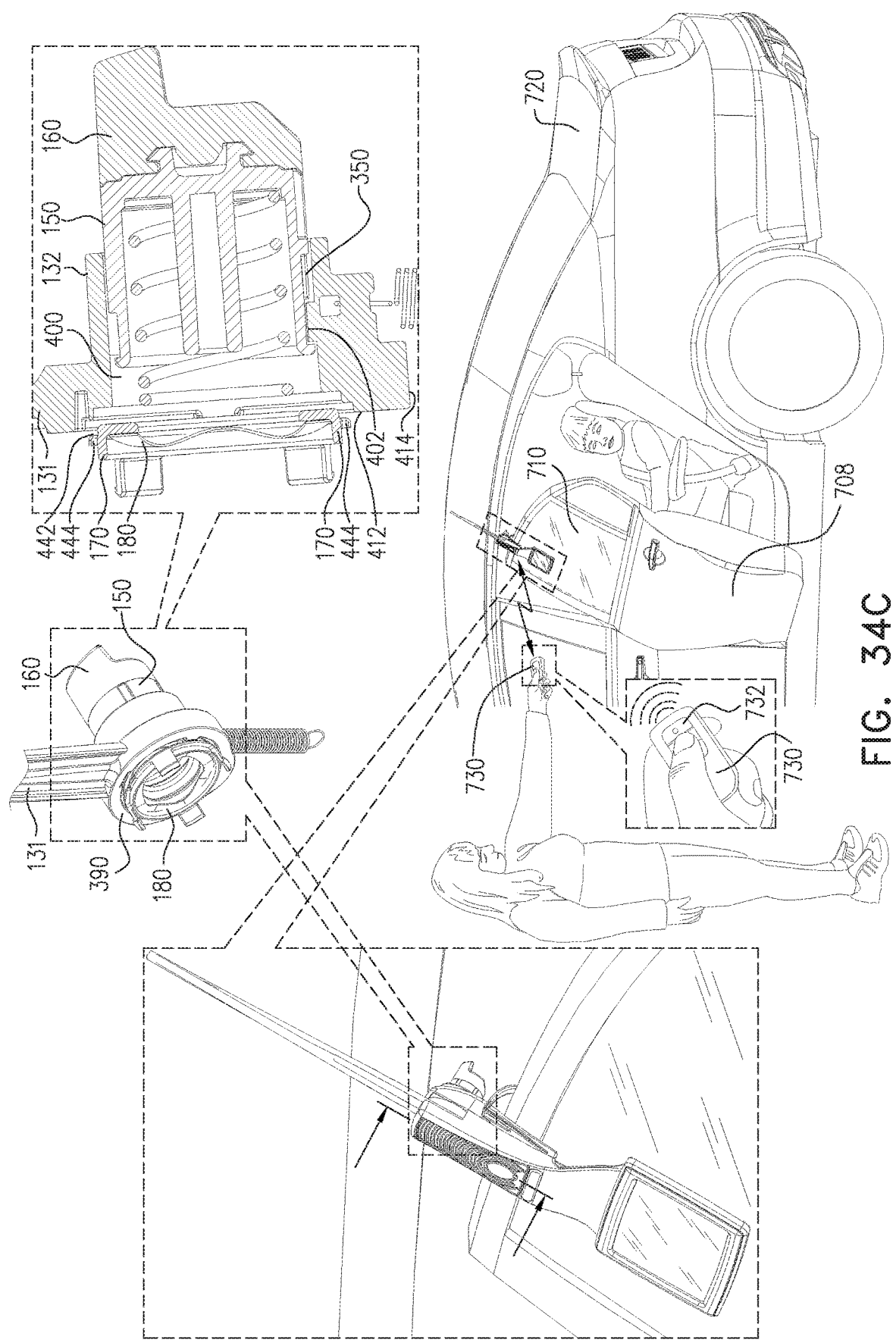
Figure 34E:
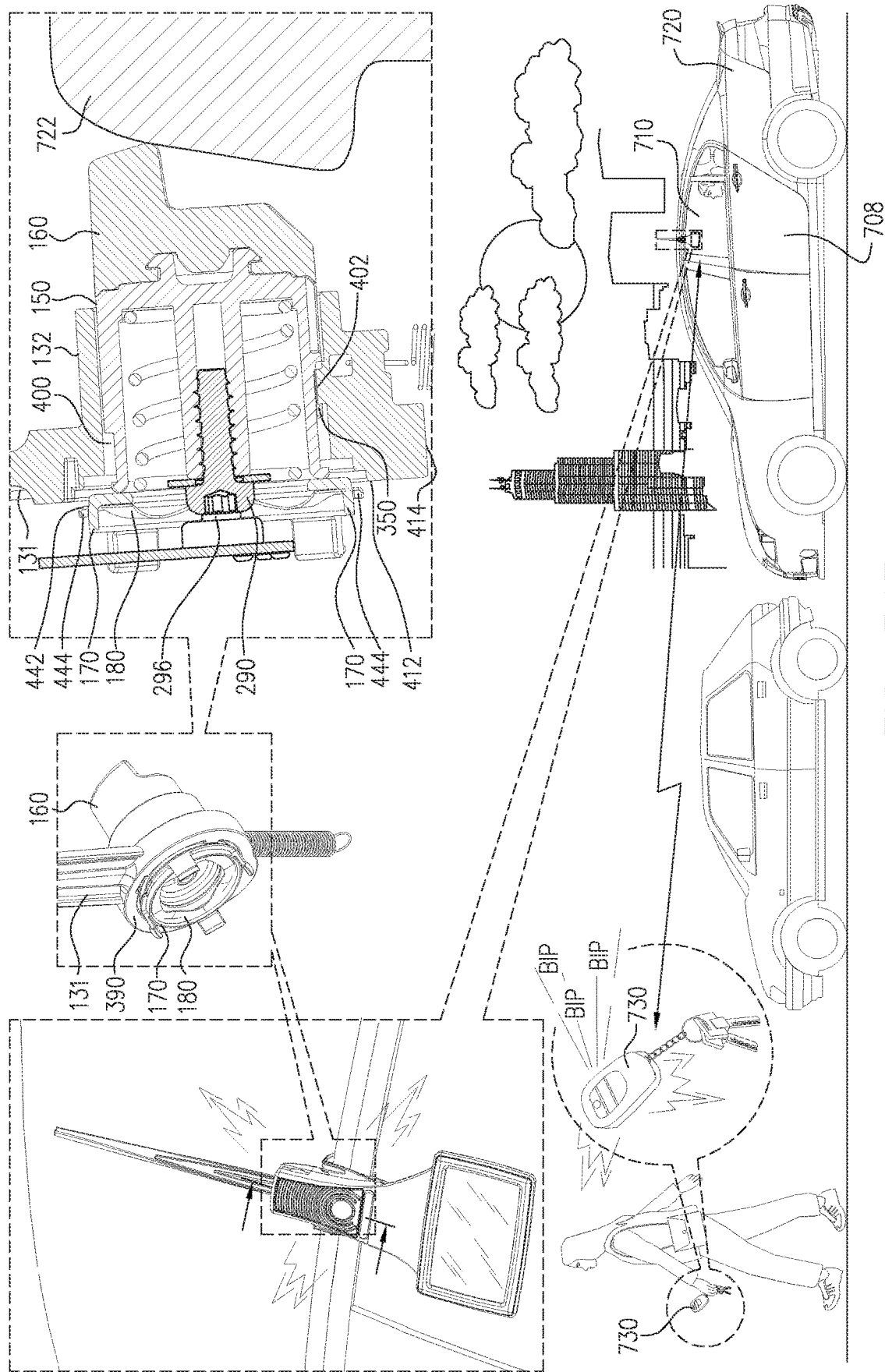
Figure 34F:
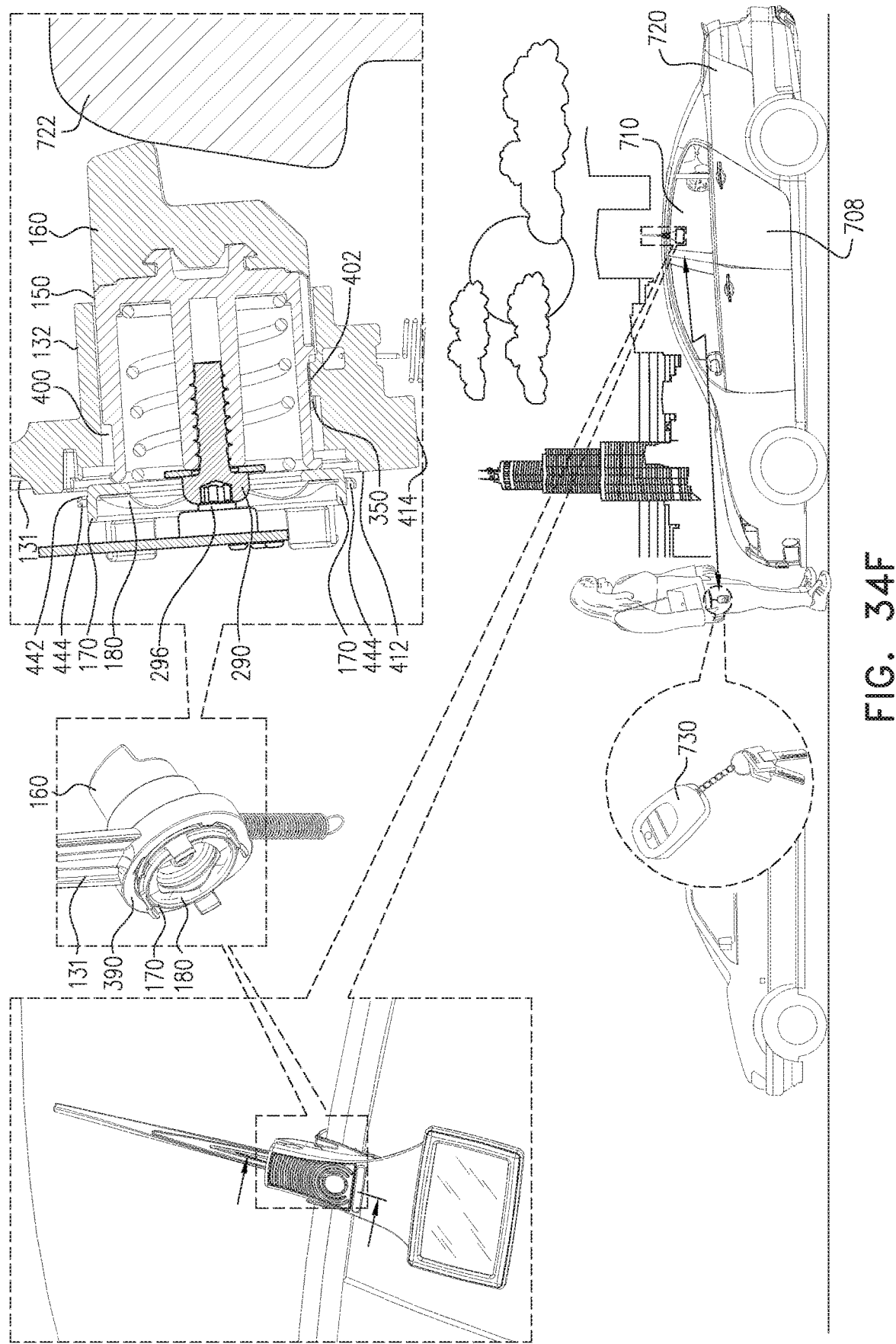
Figure 34G:
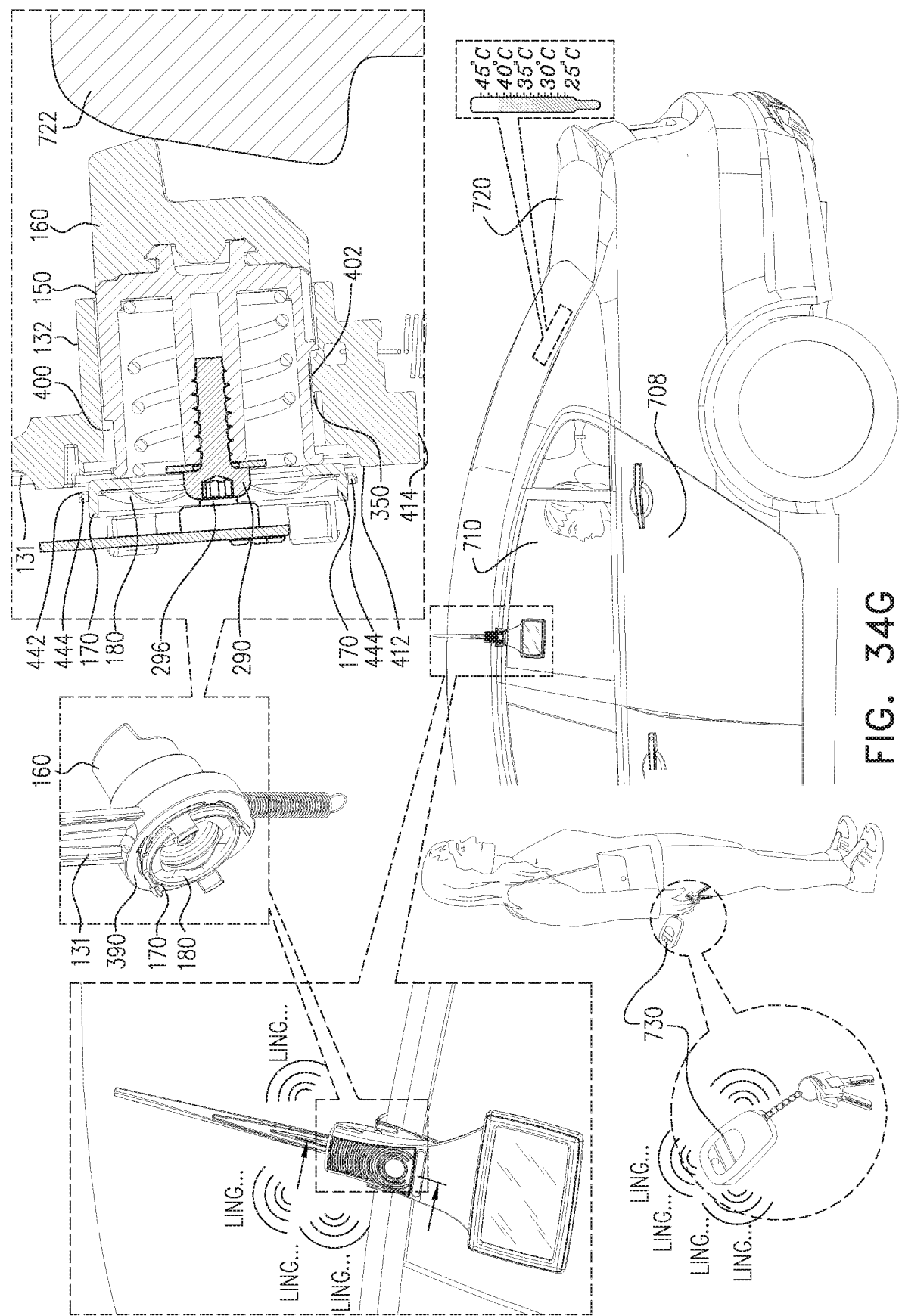
Figure 35:
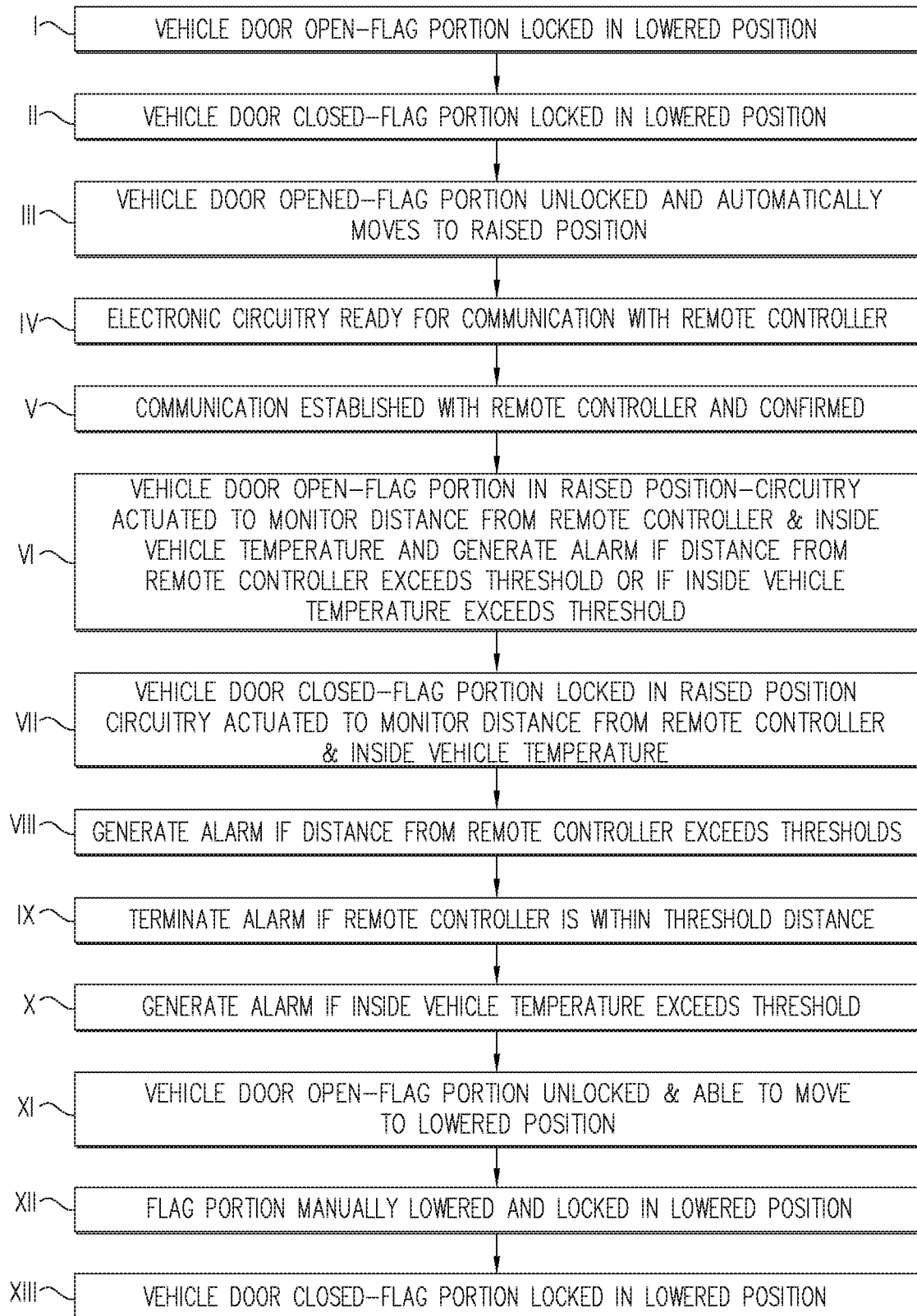
FIG. 35 is a simplified flow chart indicating various operative stages of the vehicle-mountable child protective device of FIGS. 1-34H.

Reference is now made to FIGS. 34A, 34B, 34C, 34D, 34E, 34F, 34G and 34H, which are simplified pictorial illustrations of the vehicle-mountable child protective device of FIGS. 1-28C in various operative orientations, and to FIG. 35, which is a simplified flow chart indicating various operative stages of the vehicle-mountable child protective device of FIGS. 1-34H.

As seen in FIG. 34A, in a first, pre-operational stage, indicated by I in FIG. 35, the vehicle-mountable child protective device 100 is mounted onto the window 710 of vehicle door 708 of a vehicle 720, as seen in FIGS. 33A-33D. Flexible retaining element 200 is folded over the door frame 714 of vehicle 720 and retained by engagement with undercut hook 534. The flag portion 131 is in one of the two lowered orientations shown in FIGS. 28A and 28C. As seen in FIG. 34A, the vehicle door 708 is open and flag positioning vehicle engagement element 160 does not engage the vehicle 720. The electronic circuitry of the vehicle-mountable child protective device 100 is in an OFF or sleep state.

As seen in FIG. 34B, in a second stage, indicated by II in FIG. 35, the door 708 of the vehicle 720, onto which the vehicle-mountable child protective device 100 is mounted, is closed.

The closing of door 708 causes flag positioning vehicle engagement element 160 to engage a surface 722 of the vehicle 720, causing the flag portion 131 to be locked in the lowered operative orientation, as described hereinabove with reference to FIGS. 30A & 30B, by locking engagement between radially inwardly extending protrusion 402 formed on circular cylindrical inner surface 400 of flag base 132 and recess 350 of outer cylindrical wall 330 of flag positioning element 150, against the urging of second flag engagement element 180. Closing of the door 708 causes microswitch 290 to be engaged, thus preparing the electronic circuitry of the vehicle-mountable child protective device 100 for actuation.

As seen in FIG. 34C, at a third stage, indicated by III in FIG. 35, the door 708 of the vehicle 720, onto which the vehicle-mountable child protective device 100 is mounted, is opened, resulting in disengagement of the flag positioning vehicle engagement element 160 from the vehicle and causing the flag portion 131 to automatically move to its raised operative orientation, as described hereinabove with reference to FIGS. 31A and 31B.

Microswitch 290 is disengaged, indicating that the door 708 is now open, and microswitch 264 is engaged as a result of the flag portion 131 being in its raised operative orientation. An LED, preferably a green LED, is preferably provided on first housing element 110 and is illuminated to indicate that the flag portion is now raised and vehicle-mountable child protective device 100 is operating properly.

Additionally, at a next stage, as indicated by IV in FIG. 35, the electronic circuitry of vehicle-mounted child protective device 100 is ready for communication with a remote controller, here indicated by reference numeral 730. It is appreciated that the remote controller may be any suitable remote controller and may also be embodied in an app installed on a cellular telephone or other mobile device. It is appreciated that either or both of the vehicle-mounted child protective device 100 and remote controller 730 or cellular telephone or other mobile device may also be operative to communicate with emergency services and/or emergency personnel in the event an alert condition remains in effect for longer than a predetermined time duration, typically 60 seconds.

Preferably, at a next stage, indicated by V in FIG. 35, communication, such as short range RF communication, between remote controller 730 and vehicle-mounted child protective device 100 is established at this stage, either automatically or by a user pressing a button 732 of remote controller 730 or via the app installed on a cellular telephone or other mobile device. Preferably, a sound is emitted by the remote controller 730 or the mobile device to confirm the integrity of communications between the vehicle-mounted child protective device 100 and remote controller 730 or mobile device. The integrity of communications is repeatedly verified between the vehicle-mounted child protective device 100 and remote controller 730 and failure of communications between the vehicle-mounted child protective device 100 and remote controller 730 results in a sound, light and vibration alert generated by the remote controller 730.

Additionally, at this stage, the door 708 of the vehicle 720, onto which the vehicle-mountable child protective device 100 is mounted, remains open and flag portion 131 remains in the raised operative orientation, described hereinabove with reference to FIGS. 31A and 31B. The electronic circuitry repeatedly monitors the separation distance of the remote controller 730 from the vehicle-mounted child protective device 100, preferably every 3-4 seconds. Additionally, as described hereinabove, the vehicle-mountable child protective device 100 also preferably includes a temperature sensor (not shown), located on circuit board 240, and the electronic circuitry also monitors the temperature inside the vehicle.

When the door 708 is open and flag portion 131 is in the raised operative orientation shown in FIG. 34C, a next stage, indicated by VI in FIG. 35, occurs in the event that the remote controller 730 or mobile device is separated from the vehicle-mounted child protective device 100 by more than a predetermined distance, typically 5 meters, causing an interruption of communication between the remote controller 730 and the vehicle-mounted child protective device 100. When such an interruption occurs for more than a predetermined time duration, typically 3-5 seconds, the remote controller 730 emits a sound and light warning which continues until the remote controller is again within the predetermined distance from the vehicle. The remote controller 730 also preferably provides a tactile warning.

Additionally, as described hereinabove, the vehicle-mountable child protective device 100 also preferably includes a temperature sensor (not shown), located on circuit board 240, and the electronic circuitry also monitors the temperature inside the vehicle. When the temperature inside the vehicle 720 exceeds a predetermined upper bound, typically 45 degrees C., for more than a predetermined time duration, typically 3-5 seconds, the remote controller 730 emits a sound and light warning which continues until the temperature is below the predetermined upper bound or the flag portion 131 is lowered. The remote controller 730 also preferably provides a tactile warning. The temperature exceedance warnings may be different from the separate distance warnings.

At a next stage, indicated by VII in FIG. 35 and illustrated in FIG. 34D, the door 708 of the vehicle 720, onto which the vehicle-mountable child protective device 100 is mounted, is subsequently closed, causing flag positioning vehicle engagement element 160 to engage the vehicle 720 causing the flag portion 131 to be locked in the raised operative orientation, as described hereinabove with reference to FIGS. 32A and 32B. Closing of the door 708 also causes microswitch 290 to be engaged and the electronic circuitry of the vehicle-mountable child protective device 100 to be fully actuated. The electronic circuitry repeatedly monitors the separation distance of the remote controller 730 from the vehicle-mounted child protective device 100, preferably every 3-4 seconds.

Additionally, as described hereinabove, the vehicle-mountable child protective device 100 also preferably includes a temperature sensor (not shown), located on circuit board 240, and the electronic circuitry also monitors the temperature inside the vehicle. When the temperature inside the vehicle 720 exceeds a predetermined upper bound, typically 45 degrees C., for more than a predetermined time duration, typically 3-5 seconds, the remote controller 730 emits a sound and light warning which continues until the temperature is below the predetermined upper bound or the flag portion 131 is lowered. The remote controller 730 also preferably provides a tactile warning. The temperature exceedance warnings may be different from the separate distance warnings.

When the door 708 is closed and flag portion 131 is in the raised operative orientation shown in FIG. 34D, a next stage, indicated by VIII in FIG. 35, occurs in the event that the remote controller 730 is separated from the vehicle-mounted child protective device 100 by more than a predetermined distance, typically 5 meters, as illustrated in FIG. 34E, causing an interruption of communication between the remote controller 730 and the vehicle-mounted child protective device 100. When such an interruption occurs for more than a predetermined time duration, typically 3-5 seconds, at least one of, and preferably both of, the remote controller 730 and the vehicle-mounted child protective device 100 emit a sound and light warning which continues until the remote controller 730 is again within the predetermined distance from the vehicle. The remote controller 730 also preferably provides a tactile warning. The sound and light alert generated by the vehicle-mounted child protective device 100 preferably employs buzzer 284 and one of the LEDs provided on first housing element 110.

A next stage, indicated by IX in FIG. 35, occurs when the remote controller 730 is moved so that it is within the predetermined distance of the vehicle-mounted child protective device 100, as seen in FIG. 34F, and RF communication between the remote controller 730 and the vehicle-mounted child protective device 100 are re-established. The sound, light and tactile warnings are terminated as described above.

When the door 708 is closed and flag portion 131 is in the raised operative orientation shown in FIG. 34D, another stage, indicated by X in FIG. 35, occurs when the temperature inside the vehicle 720 exceeds a predetermined upper bound, typically 45 degrees C. as illustrated in FIG. 34G. When such a temperature exceedance occurs for more than a predetermined time duration, typically 3-5 seconds, at least one of, and preferably both of, the remote controller 730 and the vehicle-mounted child protective device 100 emit a sound and light warning which continues until the temperature is below the predetermined upper bound or the vehicle door 708 is again opened and the flag portion 131 is manually lowered. The remote controller 730 also preferably provides a tactile warning. The temperature exceedance warnings may be different from the separate distance warnings.

Another stage, indicated by XI in FIG. 35, occurs when the door 708 of the vehicle 720, onto which the vehicle-mountable child protective device 100 is mounted, is again opened, as seen in FIG. 34H, resulting in disengagement of the flag positioning vehicle engagement element 160 from the vehicle 720 and unlocking the flag portion 131, as described hereinabove with reference to FIGS. 29A and 29B, to enable it to be manually moved to its lowered operative orientation.

Another stage, indicated by XII in FIG. 35, occurs when the flag portion 131 is manually lowered to its lowered operative orientation, the vehicle-mountable child protective device 100 returns to the orientation described in the first stage above and the electronic circuitry of the vehicle-mountable child protective device 100 and of the remote controller 730 is deactuated. Temperature monitoring of the interior of the vehicle is terminated or does not provide a warning of temperature limit exceedance.

Following the manual lowering of flag portion 131 as shown in FIG. 34H, a next stage, indicated by XIII in FIG. 35, which may be identical to the second stage described hereinabove with reference to FIG. 34B and indicated by II in FIG. 35, occurs when the door 708 of the vehicle 720, onto which the vehicle-mountable child protective device 100 is mounted, is subsequently closed. Flag positioning vehicle engagement element 160 engages the vehicle 720 causing the flag portion 131 to be locked in a lowered operative orientation. Closing of the door 708 also causes microswitch 290 to be engaged and the electronic circuitry of the vehicle-mountable child protective device 100 to be ready for actuation.

It will be appreciated by persons skilled in the art that the present invention is not limited by what has been particularly shown and described hereabove. Rather the invention includes both combinations and subcombinations of features described hereinabove and modifications thereof which are not in the prior art.

The invention claimed is:

1. A vehicle-mountable child protective system comprising:
   a vehicle door mountable device including:
      a flag portion which is raisable to a raised position above a roof of a vehicle; and
      a flag positioning assembly operative to selectably lock said flag portion in said raised position when said vehicle door mountable device is mounted onto a vehicle door and said vehicle door is closed;
   a remote controller; and
   an electronic circuitry responsive to exceedance of a separation distance between said vehicle door mountable device and said remote controller for at least one of producing a warning alert at least at said remote controller and retaining said flag portion in said raised position until said vehicle door is opened.

2. The vehicle-mountable child protective system according to claim 1 and wherein:
   said vehicle door mountable device also comprises a vehicle interior temperature sensor; and
   said electronic circuitry is also responsive to exceedance of a threshold vehicle interior temperature for producing a warning alert at least at said remote controller.

3. The vehicle-mountable child protective system according to claim 1 and wherein:
   said vehicle door mountable device comprises:
      a housing which is mountable onto a vehicle door and includes a first housing element, which is at least partially located within the vehicle during operation of the device, and a second housing element, which is at least partially located outside the vehicle during operation of the device; and
      a flag element, including said flag portion and a flag base, rotatably mounted onto said first housing element for selectable rotational positioning thereof about an axis; and
   said flag positioning assembly is mounted onto said first housing element and located at least partially between said first and second housing elements and is operative for automatically rotating said flag base and thus said flag portion about said axis to said raised position outside of and above the vehicle upon opening of said vehicle door onto which said vehicle door mountable device is mounted.

4. The vehicle-mountable child protective system according to claim 3 and wherein said flag positioning assembly comprises:
   a flag positioning coil spring, which urges said flag portion to said raised position from a lowered operative orientation.

5. The vehicle-mountable child protective system according to claim 4 and wherein said flag positioning assembly is operative to enable said flag base and said flag portion to have two different principal lowered operative orientations, each typically at a rotational distance approximately 90 degrees from the raised position in opposite directions about said axis.

6. The vehicle-mountable child protective system according to claim 3 and wherein said flag positioning assembly preferably comprises:
   a flag positioning element which axially engages said first housing element and said flag base along said axis; and
   a flag positioning vehicle engagement element which engages said flag positioning element and is rotatable with respect thereto about said axis in order to conform to various vehicle configurations.

7. The vehicle-mountable child protective system according to claim 3 and wherein said flag positioning assembly preferably comprises:
   a first flag engagement element;
   a second flag engagement element; and
   a third flag engagement element, which functions as a base for said flag positioning assembly.

8. The vehicle-mountable child protective system according to claim 3 and wherein said vehicle door mountable device also comprises a flexible retaining element, which is mounted onto said first housing element and is employed for retaining said vehicle door mountable device onto said vehicle door.

9. The vehicle-mountable child protective system according to claim 3 and wherein said vehicle door mountable device also comprises a first microswitch responsive to closing of said vehicle door onto which said vehicle door mountable device is mounted and a second microswitch responsive to said flag portion being in said raised position.

10. The vehicle-mountable child protective system according to claim 6 and wherein said flag positioning element is a generally cylindrical side to side symmetric element having an outer cylindrical wall formed with a plurality of elongate recesses, a circumferential recess and a plurality of recesses, which extend from said circumferential recess.

11. The vehicle-mountable child protective system according to claim 6 and wherein said flag positioning vehicle engagement element is adapted for selectable rotational orientation relative to said flag positioning element, thereby to adapt the vehicle-mountable child protective device for use with various vehicle configurations.

12. The vehicle-mountable child protective system according to claim 1 and wherein said system has a plurality of operative orientations including:
   a first operative orientation in which said vehicle-mountable child protective device is in an unmounted or flag lowered, door-opened orientation wherein said flag is locked in a lowered position by a first locking mechanism; and
   a second operative orientation in which said vehicle-mounted child protective device is in a mounted and flag lowered, door-closed orientation wherein said flag is locked in said lowered position by a second locking mechanism, different from said first locking mechanism.

13. The vehicle-mountable child protective system according to claim 12 and wherein in said second operative orientation said flag is locked in said lowered position only by said second locking mechanism.

14. The vehicle-mountable child protective system according to claim 13 and wherein said plurality of operative orientations also includes:
   a third operative orientation in which said vehicle-mounted child protective device is in a mounted and flag raised, door-opened orientation in which said flag portion is in said raised position.

15. The vehicle-mountable child protective system according to claim 14 and wherein said plurality of operative orientations also includes:
   a fourth operative orientation in which said vehicle-mounted child protective device is in a mounted and flag raised, door-closed orientation wherein said flag is locked in said raised orientation.

16. The vehicle-mountable child protective system according to claim 15 and wherein in said fourth operative orientation said vehicle-mounted child protective device is in communication with said remote controller and integrity of said communication is being monitored.

17. The vehicle-mountable child protective system according to claim 16 and wherein said plurality of operative orientations also includes:
   a fifth operative orientation in which:
      said vehicle-mounted child protective device is no longer in communication with said remote controller due to exceedance of a maximum distance between said remote controller and said vehicle-mounted child protective device; and
      said remote controller and said vehicle-mounted child protective device both provide a human sensible warning.

18. The vehicle-mountable child protective system according to claim 16 and wherein said plurality of operative orientations also includes:
   a temperature exceedance operative orientation in which said vehicle-mounted child protective device senses exceedance of a predetermined temperature within said vehicle and at least said vehicle-mounted child protective device provides a human sensible warning of temperature exceedance.

19. A method for providing a warning of a child being left in a vehicle, the method comprising:
   mounting onto a door of a vehicle, a vehicle door mountable device including:
      a flag portion which is raisable to a raised position above a roof of said vehicle; and
      a flag positioning assembly operative to selectably lock said flag in said raised position when said vehicle door mountable device is mounted onto a vehicle door and said vehicle door is closed;
   establishing wireless communication via an electronic circuitry between said vehicle door mountable device and a remote controller; and
   responsive to exceedance of a separation distance between said vehicle door mountable device and said remote controller, producing a warning alert at least at said remote controller and retaining said flag portion in said raised position until said door of said vehicle is opened.

20. The method for providing a warning of a child being left in a vehicle according to claim 19 and wherein:
   said vehicle door mountable device also comprises a vehicle interior temperature sensor; and
   said method also comprises providing a warning alert of exceedance of a threshold interior temperature in said vehicle.

\* \* \* \* \*